US 6,389,029 B1

(12) United States Patent
McAlear

(10) Patent No.: US 6,389,029 B1
(45) Date of Patent: May 14, 2002

(54) LOCAL AREA NETWORK INCORPORATING UNIVERSAL SERIAL BUS PROTOCOL

(75) Inventor: James Allan McAlear, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/188,297

(22) Filed: Nov. 10, 1998

(51) Int. Cl.$^7$ .............................................. H04L 12/66
(52) U.S. Cl. ...................................... 370/402; 370/465
(58) Field of Search ................................ 370/254, 255, 370/257, 401, 400, 465, 666, 352, 353, 354, 355, 356, 389, 395, 402, 403, 404, 407, 411; 709/249, 250, 253

(56) References Cited

U.S. PATENT DOCUMENTS

| | | | |
|---|---|---|---|
| 4,493,021 A | 1/1985 | Agrawal et al. | 364/200 |
| 5,299,314 A | 3/1994 | Gates | 395/200 |
| 5,436,902 A | 7/1995 | McNamara et al. | 370/85.3 |
| 5,537,558 A | 7/1996 | Fletcher et al. | 395/309 |
| 5,581,556 A | 12/1996 | Ohie | 370/431 |
| 5,655,138 A | 8/1997 | Kikinis | 395/808 |
| 5,659,684 A | 8/1997 | Giovannoni et al. | 395/200.8 |
| 5,675,813 A | 10/1997 | Holmdahl | 395/750 |
| 5,892,764 A * | 4/1999 | Riemann et al. | 370/401 |
| 6,108,314 A * | 8/2000 | Jones | 370/294 |
| 6,167,043 A * | 12/2000 | Frantz | 370/356 |
| 6,249,527 B1 * | 6/2001 | Verthein et al. | 370/466 |

FOREIGN PATENT DOCUMENTS

| | | | |
|---|---|---|---|
| GB | 2325997 | 4/1998 | G06F/5/06 |
| WO | 9834174 | 2/1998 | G06F/13/00 |

OTHER PUBLICATIONS

W. Schulte, "Das Usb Protokoll", Funkschau, DE, Franzis–Verlag K.G. Munchen, vol. 71, No. 11, May 15, 1998, pp. 42–44 XP000784778 ISSN: 0016–2841 the whole document.

Universal Serial Bus Specification 1.0, published on Jan. 15, 1996, authorized by Compaq, Digital Equipment Corporation, IBM PC Company, Intel, Microsoft, NEC, Northern Telecom.

* cited by examiner

Primary Examiner—Ricky Ngo

(57) ABSTRACT

The invention relates to local area networks typically comprising a LAN hub, a plurality of outer hub devices connected to the LAN hub via a respective plurality of LAN links and a plurality of USB devices and/or LAN computers connected to the plurality of outer hub devices via a respective plurality of USB links. The outer end hubs communicate with the USB devices and LAN computers using USB protocol having time sensitive aspects. To satisfy the requirements of the USB protocol, the outer hub devices perform the time sensitive aspects of the USB protocol. The outer end hubs communicate with the LAN hub using a LAN protocol which permits the outer hub device to be further than 5 meters from the LAN hub. The LAN protocol is typically a variant of the USB protocol.

57 Claims, 31 Drawing Sheets

TOKENS

| PID | ADDR | ENDP | CRC5 |
|---|---|---|---|
| 8 bits | 7 | 4 | 5 |

PIDs: Out, In, Setup

SOF

| PID | FRAME # | CRC5 |
|---|---|---|
| 8 bits | 11 | 5 |

PIDs: SOF

DATA

| PID | DATA | CRC16 |
|---|---|---|
| 8 bits | 0-1023 BYTES | 16 |

PIDs: DATA0, DATA1

**FIG. 2C
PRIOR ART**

HANDSHAKE

| PID |
|---|
| 8 bits |

PIDs: ACK, NAK, STALL

**FIG. 2D
PRIOR ART**

SPECIAL - LOW SPEED PREAMBLE

| PID |
|---|
| 8 bits |

PIDs: PRE

**FIG. 2E
PRIOR ART**

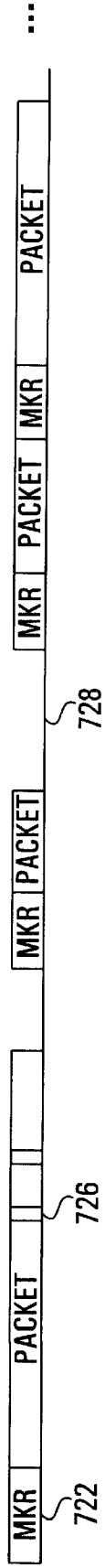
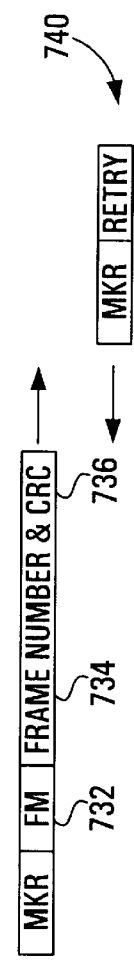
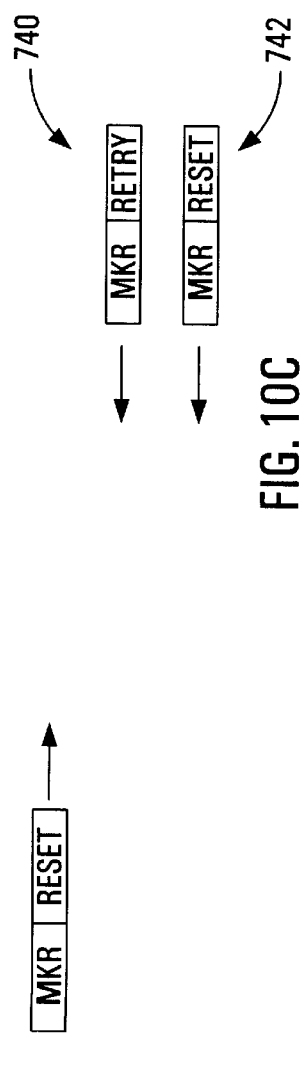
FIG. 10A
FIG. 10B
FIG. 10C

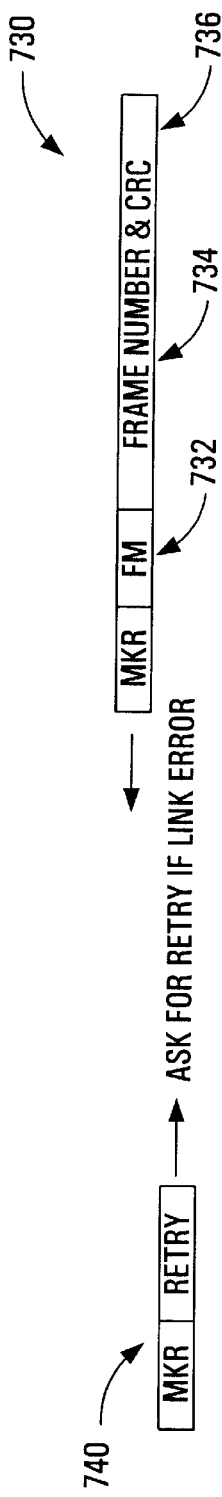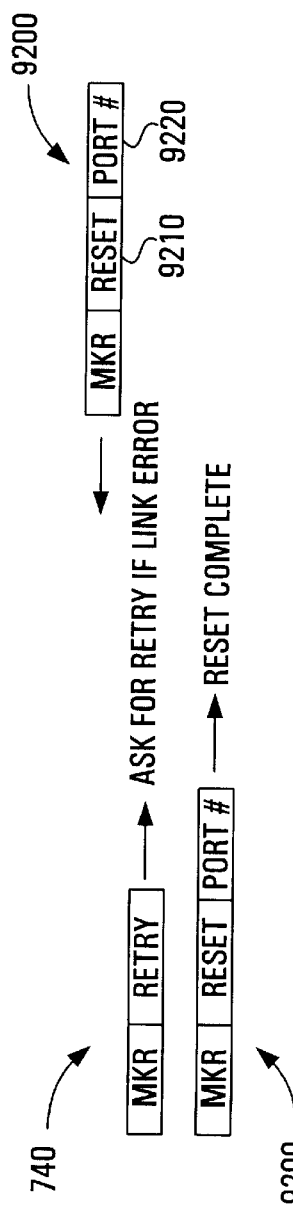
FIG. 15A
FIG. 15B
FIG. 15C

BANDWIDTH ALLOCATION & ADMINISTRATION TABLE

| LINE | UTILIZATION | DESCRIPTION |
|---|---|---|
| 1 | 15% | JOHN DOE 2ND FLOOR NW |
| 2 | 0% | JANE SMITH 2ND FLOOR NW |
| 3 | .45% | BILL JONES 2ND FLOOR NW |

FIG. 19

USB DEVICE & STATUS TABLE

| LINE | PORT ADDRESS | STATUS | ADDRESS | DESCRIPTION |
|---|---|---|---|---|
| 1 | 1 | ADDRESSED | 2 | BRAND X 17" MONITOR #3345 |
| 1 | 2 | CONFIGURED | 3 | BRAND Y TELEPHONE #764593 |
| 2 | 1 | DEFAULT | 0 | BRAND Y TELEPHONE #379766 |
| 2 | 2 | DISCONNECTED | - | - |

FIG. 20

| DEVICE ENDPOINT DESCRIPTION & SERVICE INTERVAL TABLE | | | | | | |
|---|---|---|---|---|---|---|
| LINE | DEVICE ADDRESS | ENDPOINT | BUFFER SIZE | TYPE | BUFFER LOCATION | TIME |
| 1 | 1 | 0 | 64 BYTES | CONTROL | 5A2EFF0 | . |
| 1 | 1 | 1 | 32 BYTES | BULK/OUT | 5A30000 | . |
| 1 | 1 | 2 | 256 BYTES | ISO/IN | 5A40FF0 | 1 ms |
| 1 | 1 | 3 | 16 BYTES | INT/IN | 5A4FF00 | 10 ms |
| ... | | | | | | |

FIG. 21

| TABLE OF INTERBUFFER FLOW ASSIGNMENTS | | | | |
|---|---|---|---|---|
| IN BUFFER | OUT BUFFER | SIZE | SERVICE TIME | % OF PROGRAM CLOCK CYCLE |
| 5A40FF0 | 634A00 | 256 | 1 ms | 0.2 |
| 6550000 | 4FA000 | 64 | . | 0.01% |
| ... | | | | |

FIG. 22

MASTER TABLE OF AVAILABLE BUFFER SPACE

| BUFFER ADDRESS | SIZE |
|---|---|
| 6A0000 | 1024 BYTES |
| 6AF000 | 256 BYTES |
| 6AF200 | 10 MBYTES |

FIG. 23

SESSION TABLE

| SESSION STATES | NETWORK DEVICE | LAN HUB LINE | IP/OTHER ADDRESS | HOST BUFFER ADDRESS | BUFFER SIZE | ATTACHED DEVICE LINE & ADDRESS |
|---|---|---|---|---|---|---|
| INITIATING | PC | 17 - ATTACHMENT UNIT | 47.8.3.118 | 5A0057 | 2048 | 1      2 |
| CLOSING | PC | 18 - NETWORK LINK-SHARED | 47.8.3.119 | 5A9000 | 2048 | 2      4 |
| ACTIVE | PBX | 20 - DED. LINK | -- (613 565-2222) | 5B0024 | 256 | 4      1 |
| ACTIVE | SERVER | 18 - NETWORK LINK-SHARED | 92.4.4.4 | 5B9004 | 2048 | 2      3 |
| : | : | : | : | : | : | :    : |

FIG. 24

LOCAL AREA NETWORK INCORPORATING UNIVERSAL SERIAL BUS PROTOCOL

FIELD OF INVENTION

The invention relates in general to local area networks and in particular to local area networks incorporating Universal Serial Bus (USB) capabilities.

BACKGROUND OF THE INVENTION

The computer industry has recently formulated a new serial bus standard for interfacing peripherals and devices to computers. The new serial bus standard is known as a Universal Serial Bus (USB). The USB is a four wire bus which supports isochronous and asynchronous communications, multiple sub-channels of varied payload sizes for fan out of up to 127 USB devices (including low power USB devices), integrated powering for low power USB devices, simple connectors and hot plug and play for easy addition and removal of USB devices by a user. The Universal Serial Bus has its own protocol, the USB protocol, which supports two transmission speeds, full speed (12 Mbs) for full speed USB devices and low speed (1.5 Mbs) for low speed USB devices.

FIG. 1 shows a computer network comprising a host computer, a Universal Serial Bus, and a plurality of USB devices. In particular, a USB interface (typically called a root hub interface or root hub device) from the host computer offers at least one USB port but typically offers a plurality of USB ports (e.g. 2 which share a specified bandwidth of the USB interface) to which the USB devices may connect over cables not exceeding 5 meters. Additional USB devices can be supported in the bandwidth through the use of a special type of USB device, a USB hub device. Up to five USB hub devices may be daisy chained. That is, a first USB hub device may be connected, to one of the USB ports of the USB interface with a cable not exceeding 5 meters. The first USB hub device typically provides a number of additional USB ports (e.g. 4) to which additional USB devices may be connected over cables not exceeding 5 meters. A second USB hub device may be connected to one of the USB ports of the first USB hub device by a cable not exceeding 5 meters. Up to 5 USB hub devices may be daisy chained in this way. The length of each cable segment cannot exceed 5 meters (i.e. the reach limitation of each cable segment is 5 meters). Only USB devices, other than a USB hub device, may be connected to the fifth USB hub device. Consequently, the furthest a USB device can be from the host computer is 30 meters (six 5 m cables). i.e. the total reach limitation is 30 meters according to the USB protocol. There are a variety of USB devices that can be connected to a Universal Serial Bus ranging from: printers, scanners, video cameras, keyboards, monitors, telephones, label printers, bar code readers, modems, disk drives, etc. Many of the new computers sold today, (such as personal computers (PC's) and the new iMac*), have at least one USB port.

\* Trade-mark

Many of the USB devices which can be connected to the host computer via the Universal Serial Bus can also be advantageously used for applications running over a communications network (such as a local area network (LAN) or a wide area network (WAN)), to allow remote computers, servers or even telephone switches to exploit their functionality. Communication software and hardware within the host computer can mediate the connection between the communications network and the Universal Serial Bus, but this solution has drawbacks. The host computer used to mediate the connection between the communications network and the Universal Serial Bus can suffer from common reliability problems caused by the host computer being crashed, the host computer being infected by a virus, the host computer being powered off or even the host computer being removed (e.g. a notebook PC being used as the host computer). Furthermore, for USB devices placed in conference rooms, reception areas, hotel rooms, etc., deploying at least one host computer (such as a PC) in every such room is usually not practical nor cost efficient. Furthermore, many devices, such as a telephone, do not inherently need or use the functionality of the host computer beyond the network connectivity it provides. The invention disclosed herein will address these drawbacks.

Each USB hub device (including the root hub interface or root hub device) has a hub controller for controlling the USB ports (also called sub-tending ports). The hub controller can be accessed via data transfers on the Universal Serial Bus between the host computer and the USB hub device.

The host computer runs Operating System software (OS) that includes USB host software, client software and device drivers. The USB host software manages the Universal Serial Bus. The client software is typically one or more software programs for one or more applications such as word processing, communications, spreadsheets or software programs (including device drivers) designed to interact with external devices such as printers, scanners, modems, etc. The client software and the USB host software interact with each other. (Discussed in more detail later).

Once a USB device (including a hub device) is first connected to a USB port, the USB host software assigns a unique USB device address to the USB device. A given USB device typically has a plurality of sub-functions contained within it. The host computer interacts with each sub-function by exchanging data with a corresponding unique end point within the USB device. Each end point has a unique end point number.

Every USB device has at least one end point, end point 0 (sometimes called control end point 0), which is a control end point for the device (e.g. the hub controller for a hub device is addressed through end point 0). Through interaction with the control end point 0, the USB host software in the host computer can determine what other end points are available on the USB device for interactions with client software as well as configure these end points or reset the USB device. All the other end points (i.e. all the end points other than the control end point 0) are sometimes called functional end points. A functional end point can either receive data from the host computer or transmit data to the host computer but not both. Only the control end point 0 can both receive data from the host computer and transmit data to the host computer.

Each USB port uses four wires, two data wires for data transmission and reception and two wires for carriage of power (one 5 volt source power wire and one ground wire).

Each USB hub device detects the connection or disconnection of USB devices from the USB hub device by sensing the amount of current flowing through each USB port. As mentioned earlier, two general types of USB devices can be connected to a USB hub device, low speed USB devices which operate at the low speed (1.5 Mbs) and full speed USB devices which operate at the full speed (12 Mbs). These different USB devices cause different current draw characteristics when attached to a USB port in order that a full speed USB device can be distinguished from a low speed USB device. When a low speed USB device is connected to a USB port, the USB port is sometimes called a low speed port. Similarly, when a full speed USB device is connected to a USB port, the USB port is sometimes called a full speed port.

Every USB hub device manages the status of each of its USB ports. When a USB device is first connected to one of the USB ports of a USB hub device, the USB hub device changes the status of the USB port from a disconnected state to an attached state. In the attached state, regular bus communication does not flow through the USB port to the USB device. When a USB device is disconnected from one of the USB ports of a USB hub device, the USB hub device changes the status of the USB port to the disconnected state. The USB host software polls each hub device periodically and the USB hub device indicates whether the status has changed for any of its USB ports. Once the USB host software has received indication of a status change for one or more USB ports, the USB host software will issue commands to the hub controller of the USB hub device (via its control end point 0) to determine the nature of the status change and react accordingly for each changed USB port in turn. For instance, the USB host software will respond to a new USB device connected to a USB port by sending a reset command, directed to the USB port of the USB hub device connected to the newly attached USB device. The USB device sends the reset command via the USB port to the newly attached USB device. The USB device will respond by placing itself in a default state. In the default state, the USB device responds to a USB device address 0. After the reset command has been completed, the USB hub device changes the status of the USB port from the attached state to a default state. Once a USB port is in the default state, regular bus communications can flow through the USB port to the USB device using USB device address 0. Next, the USB host software will issue a command to the USB device (using the USB device address 0) to assign a new, unique USB device address to the USB device. Once assigned, the host can now enable another recently connected USB device at another USB port with the USB device address 0. Once a USB device has been given a device address, the USB device still requires a configuration command before it can be used. When a USB device has a device address but is not configured, the USB device and the respective USB port are in an addressed state. In the addressed state, only the control end point 0 of the USB device can be addressed by the USB host software. The USB host software typically issues commands to the control end point 0 of the USB device requesting a description of the USB device's end points (buffer sizes, direction and service rates), a description of the USB device's manufacturer, model and serial number and even a description of the USB device (e.g. a brand X USB colour printer). These descriptions are made available to the client software by the USB host software. Once the client software needs to use a USB device, the configuration command is issued to the USB device by the USB host software, whereupon the USB device and the respective USB port will be placed in a configured state. A user typically interacts with the USB device through the mediation of client software. In the configured state, the device's functional end points become operational in addition to its control end point. (The only exception relates to USB hub devices which cannot be accessed by client software. Only the USB host software can access hub devices. Consequently, the USB host software issues the configuration command to each USB hub device independently of the client software).

Closing communication with a USB device, other than a USB hub device, in the configured state can be initiated by the client software. Any such request from the client software is intercepted by the USB host software. The USB host software sends a de-configuration command to the USB device. Upon receipt, the USB device and the respective USB port are placed in the addressed state. If the USB device is physically disconnected from the USB hub device (including the root hub device), the USB hub device changes the status of the USB port to the disconnected state. As mentioned earlier, the USB host software polls each USB hub device periodically. During these periodic polls, the USB device will indicate to the USB host software that the USB device has been disconnected from the USB port.

Information is carried on the Universal Serial Bus in packets ("USB packets"). Packets sent at the low speed are called low speed transmissions. Similarly, packets sent at the full speed are called full speed transmissions. Each USB packet transmitted on the Universal Serial Bus is delineated by sync fields (for clock recovery) at the start of each USB packet, followed by the USB packet, and ending with a special end of USB packet signalling on the Bus. Referring to FIGS. 2A, 2B, 2C, 2D and 2E, the USB protocol supports five different main types of USB packets: a token packet, a start of frame packet, a data packet, a handshake packet and a special low speed preamble packet. At the beginning of each USB packet is a packet identifier or PID. According to the USB protocol, there are ten different types of PID's.

USB packets are sent within a plurality of transmission frames. Each frame is one millisecond long. Referring to FIG. 2B, start of frame packets are issued from the USB host software according to a precise one millisecond schedule. Each start of frame packet consists of a start of frame PID, a frame number and a CRC for error checking.

Data is carried on the Universal Serial Bus through the use of USB transactions. A USB transaction involves transmission of up to three USB packets for full speed transmissions and four packets for low speed transmissions. The USB host software formats the data destined to the USB devices into USB packets according to the USB protocol. (Described in more detail below). Similarly, each USB device formats data destined to the host computer into USB packets according to the USB protocol. (Described in more detail below).

Data is either transferred ("a data transfer") from the host computer to a USB device (an "Out transaction" or an "USB Control Setup transaction") or from a USB device to the host computer (an "In transaction"). There are three types of token packets: an In token packet for In transactions, an Out token packet for Out transactions and a Setup-token packet for USB Control Setup transactions. Referring in particular to FIG. 2A, the PID of the token packet identifies the type of the token packet. (i.e. there are three different PID's for token packets: one for Out token packets, one for In token packets and one for Setup token packets). Each token packet also contains a field for the USB device address and a field for the end point number of the USB device to which the USB transaction is addressed. Finally, each token packet contains a field for a CRC check used for error checking. Information in the token packet (i.e. the type of token packet, the USB device address, the end point number and the CRC) is sometimes called a token.

Each USB transaction typically begins when the USB host software in the host computer, on a scheduled basis, sends a token packet. The USB device that is addressed selects itself by decoding the USB device address contained in the token packet.

Following the token packet, a data packet is typically sent either from the USB host software or the USB device depending on the type of the token packet. Referring to FIG. 2C, each data packet consists of a PID, data and a CRC for error checking. There are two PID's used for data packets: a Data 0 PID and a Data 1 PID. These two PID's provide for alternating 0,1 labelling of data packets for sequence error checking. (Isochronous transactions are not checked for sequence errors since all data packets use data 0 PID). A proper sequence of data packets occurs when no two consecutive data packets to or from the same end point number of the same USB device have the same PID. i.e. The first data packet sent to or from a USB device will use the data 0 PID, the second data packet sent to or from the same USB device will use the data 1 PID, the third data packet sent to or from same USB device will use data 0 PID, etc. If a USB device or the USB host software receives two consecutive data packets addressed to the same end point number with the same PID, a sequence error has occurred.

The data can be up to 1024 bytes for isochronous communications and up to 64 bytes for asynchronous communications. A data payload size is the number of bytes in the data. Specific data payload sizes are associated with each endpoint.

Referring to FIG. 2D, for asynchronous communications, the USB host software or the USB device that received the data packet responds with a handshake packet. There are three types of handshake packets: an acknowledgement handshake packet (or ACK handshake packet), a negative acknowledgment handshake packet (or NAK handshake packet) or a Stall handshake packet. The type of handshake packet is indicated by the PID in the handshake packet. (i.e. there are three different PID's for handshake packets: one for acknowledgement handshake packets, one for NAK handshake packets and one for Stall handshake packets).

As mentioned earlier, there are low speed USB devices and full speed USB devices which can be connected to the Universal Serial Bus. The hub controller in each USB hub device disables transmission on the low speed USB ports during full speed transmissions on the Universal Serial Bus and vice-versa for low speed transmissions on the Universal Serial Bus. Low speed transmissions are preceded by a special low speed preamble packet which informs the USB hub devices that a low speed transmission follows; upon receipt of this packet, the USB hub devices disable the full speed USB ports and enable the low speed USB ports until the USB hub devices detect the end of the low speed transmission upon which the USB hub devices disable the low speed USB ports and enable the full speed USB ports. Referring to FIG. 2E, the special low speed preamble packet consists of a special low speed preamble PID which identifies the packet as a low speed preamble packet.

Referring to FIGS. 3, 4, 5 and 6, there are four types of USB transactions: USB isochronous transactions, USB bulk or control data transactions, USB interrupt transactions and USB control setup transactions. Each functional endpoint of a USB device is associated with one of the above types of transactions. These figures illustrate the three different types of token packets: the In token packet (for In transactions), the Out token packet (for Out transactions), and the Setup token packet (for USB Control Setup transactions). It should be noted that interrupt and USB control setup transactions are just special instances of USB bulk or control data transactions. USB isochronous transactions are used for isochronous communications. USB bulk or control transactions, USB interrupt transactions and USB control Setup transactions (collectively called "USB asynchronous transactions") are used for asynchronous communications.

Data is transmitted from a transmit data buffer in the USB device (corresponding to an end point number) to a receive data buffer in the USB host software. Similarly, data is transmitted from a transmit data buffer in the USB host software to a receive data buffer (corresponding to an end point number) in the USB device. The USB host software schedules the transmission of the data between the transmit data buffers and the receive data buffers in the USB devices and the USB host software.

For each frame, the USB host software typically schedules the USB isochronous transactions first followed by the USB asynchronous transactions. In other words, the scheduling for the USB isochronous transactions is typically fixed. Other schedules are possible.

As shown in FIG. 3, USB isochronous transactions attempt to guarantee a data rate. When the USB host software wishes to send data to a USB device (an Out isochronous transaction), it issues an Out token packet and transmits a data packet within a USB time limit as prescribed by the USB protocol. Similarly, when the USB host software wishes to receive data from a USB device (an In isochronous transaction) it issues an In token packet to the USB device and waits for a data packet to be transmitted from the USB device to the host computer. If the In token packet was never received correctly by the USB device (i.e. a token error), the USB device never sends a data packet. The USB host software does not typically retry USB isochronous transactions containing errors. As shown in FIG. 3, with isochronous transactions, handshake packets are not involved.

In contrast, USB bulk or control data transactions are not sent at a guaranteed data rate but attempt to guarantee delivery by the use of handshake packets. A USB bulk transaction is used to transfer data such as data in a file transfer. A USB control transaction is used to send data to control end point zero of a USB device. Referring to FIG. 4, when the USB host software wishes to send data to a USB device (an Out bulk/control transaction), it issues an Out token packet and it sends a data packet within the USB time limit as prescribed by the USB protocol. If the data packet was received properly by the USB device, the USB device issues the acknowledgement handshake packet (an ACK handshake packet) within the strict USB time limit after receiving the data packet. If the USB device is not ready to accept data on the bus, the USB device issues the NAK handshake packet. It should be noted that the NAK handshake packet does not represent an error. If the USB device is in a condition that prevents normal operation of the USB device, the USB device issues the Stall handshake packet. If the USB host software does not receive the ACK handshake packet, the NAK handshake packet or the Stall handshake packet within the USB time limit after sending the data packet, the USB host software assumes that either a token or a data error has occurred. The USB host software will typically retry the USB transaction (as discussed in more detail below).

Similarly, if the USB host software wishes to receive data from a USB device (an In bulk/control transaction), it issues an In token packet. If the USB device receives the In token packet error-free and the USB device has data, the USB device sends a data packet to the computer within the USB time limit after receiving the In token packet. Upon error free receipt of the data packet, the USB host software issues the ACK handshake packet to the USB device. If the USB device does not receive the ACK handshake packet error free within the USB time limit after sending the data packet, it assumes a data error has occurred. The next time the host software issues an In token packet to the same end point number of the same USB device, the USB device will re-send the same data packet previously sent. The USB host software will recognize that the USB device has re-sent the same data packet by examining the data PID. If the USB host software receives two consecutive packets with the same data PID (i.e. both data packets have a Data 0 PID or a Data 1 PID), a sequence error has occurred. To fix the sequence error, the host software discards the duplicate data, sends an ACK handshake packet to the USB device and sends another In token packet to the USB device. If the USB host software never received the data packet error free, then the USB host software would have never sent an ACK handshake packet. The USB host software will resend the In token packet to the USB device. Upon error-free reception of the In token packet, the USB device re-sends the data packet. Since the USB host software never received the data packet error-free previously, the error free reception of the data packet resumes the proper sequence of data packets.

After receiving the In token packet, if the USB device is not ready to send data to the computer, the USB device issues the NAK handshake packet. After receiving the In token, if the USB device is a condition which prevents normal operation of the USB device, the USB device issues the Stall handshake packet to the host computer. If the USB host software does not receive the data packet, the NAK handshake packet or the stall handshake packet within the USB time limit after issuing the In token, the USB host software assumes that a token error has occurred. The USB host software then retries the transaction at a future time (as discussed in more detail below).

A USB Interrupt transaction is used to service a USB device that does not need a very high throughput (e.g. a keyboard or a mouse). Each USB Interrupt transaction attempts to guarantee delivery and uses a minimal service interval. Referring to FIG. 5, when the USB host software wishes to receive data from a USB device, such as a mouse, the USB host software issues an In token packet to the USB device. If the USB device has data to send, the USB device sends a data packet to the host computer within the USB time limit after receiving the In token packet. If the data packet is received error free by the USB host software, the USB host software issues the ACK handshake packet to the USB device within the USB time limit after receiving the data packet. If the device does not receive the ACK handshake packet, the USB device assumes that a data error has occurred. After the USB host software issues an In token packet, if the USB device is not ready to send data to the host computer, the USB device sends the NAK handshake packet to the host computer. After the USB host software issues an In token packet, if the USB device is in a condition which prevents normal operation of the USB device, the USB device issues the stall handshake packet to the computer. If the USB host software does not receive a data packet, the NAK handshake packet or the Stall handshake packet within the USB time limit after sending the In token packet, the USB host software assumes that a token error has occurred and retries the USB transaction at a future time (discussed in more detail below).

Referring to FIG. 6, a USB control setup transaction is used to initially configure a USB device. The USB host software sends a Setup token packet and sends a data packet to the USB device within the USB time limit after sending the Setup token packet. If the USB device receives the data packet error free, the USB device sends the ACK handshake packet to the computer within the USB time limit after receiving the data packet. If the USB host software does not receive the ACK handshake packet within the USB time limit after sending the data packet, it assumes that a token or data error has occurred and retries the transaction at a later time. (Discussed in more detail below). USB control setup transactions have highest priority for a USB device and as such should always be ready to accept the data packet. Consequently, a NAK handshake packet is not permitted.

Data errors are handled on the Universal Serial Bus in the following way. Isochronous transactions and asynchronous transactions are checked for errors using the CRC in each token packet and using the CRC in each data packet. Any asynchronous transaction which has errors are automatically retried by the USB host software for a maximum of three times. If an error still persists after three tries, the USB host software notifies the client software of the error. Isochronous transactions which have errors are not specified to be retried by the USB host software. The USB protocol also provides for alternating 0,1 labelling of the data packets along with corresponding ACK token packets to recover from possible corrupted handshake packets and to resume the proper sequence of data packets.

A USB port on a USB device is sometimes called a device USB port. Similarly, a USB port on a computer is sometimes called a host USB port. More generally, a host USB port is a USB port to which to USB device may be connected. A host USB device is a device, such as a host computer, with at least one host USB port controlled by USB host software.

Like many conventional protocols, the USB protocol is layered protocol comprising a number of layers. One of the layers is a physical layer which defines the electrical specifications of the Universal Serial Bus. Another layer is a data link layer which defines the types of transactions permissible on the Universal Serial Bus (i.e. the formats of the USB transactions). USB specification 1.0 authored by Compaq, DEC, IBM, Intel, Microsoft, NEC and Nortel and published on Jan. 15, 1996 defines the specifications and functionality of the Universal Serial Bus. The USB specification 1.0 is incorporated by reference herein.

In particular, the USB specification 1.0 defines the functionality required in the host software in order for the computer to interact with USB devices attached to the Universal Serial Bus. In general, the functionality of any host computer application using the Universal Serial Bus can be divided into four basic components:

(1) The functionality of the client software and device drivers,
(2) The functionality of the USB host software,
(3) The functionality of the physical and data link layers, and;
(4) The functionality of the USB devices.

There are time sensitive aspects of the USB protocol. As specified in the USB Specification 1.0, and as mentioned earlier, there is a USB time limit (or maximum delay) between an Out token packet and a data packet, the same USB time limit (or maximum delay) between the sending of the data packet and the reception of the ACK handshake packet, the NAK handshake packet or the stall handshake packet and the same USB time limit (or maximum delay) between the transmission of the In token packet and the reception of the data packet, NAK packet or Stall packet.

The above three cases are part of the time sensitive aspects of the USB protocol. The USB time limit (or maximum delay) is 7.5 bit times (0.625 microseconds for 12 Mbs transmissions and 5.0 microseconds for 1.5 Mbs transmissions).

However, no time limits are specified between USB transactions. Due to the USB time limits (and other processing limits in the USB devices), USB devices will not operate more than 30 meters from a host computer (by using daisy chaining of hub devices discussed earlier). Consequently, the Universal Serial Bus does not lend itself to local area network (LAN) applications which typically require that a plurality of devices be 100 meters or more from a server. (A server is a computer which manages the local area network).

SUMMARY OF THE INVENTION

An object of one aspect of the present invention is to provide a local area network incorporating Universal Serial Bus capabilities.

Another object of the present invention is to overcome the reach limitations of the USB protocol.

Another object of the present invention is to allow a USB device to interface to a LAN network and interact with remote computers, servers or telephone switches without the mediation of a local personal computer (PC).

In accordance with one aspect of the present invention, there is provided a computer network comprising a LAN hub, at least one network device connected to the LAN hub, at least one outer hub device connected to the LAN hub via a respective LAN link and at least one USB device or at least one LAN computer connected to the outer hub device via a respective USB link. The USB device or the LAN computer communicates with the outer hub device using the USB protocol. The outer hub device communicates with the LAN hub using the LAN protocol. The network device communicates with the LAN hub using the LAN protocol or a network protocol. For asynchronous communications, the outer hub device examines USB packets from the USB device or the LAN computer, generates handshake packets in response to the USB packets according to the USB protocol and ensures that the handshake packets are generated within a USB time limit prescribed by the USB protocol after receiving the USB packets. The outer hub device buffers data received from the LAN hub to be sent to the USB device in a data packet and ensures that the data packet follows an Out token packet within the USB time limit prescribed by the USB protocol. Furthermore, the outer hub device buffers data received from the LAN hub to be sent to the LAN computer in a data packet and ensures that the data packet is sent to the LAN computer within the USB time limit prescribed by the USB protocol after receiving an In token packet from the LAN computer.

In accordance with another aspect of the present invention, there is provided a computer network comprising a LAN hub, at least one outer hub device connected to the LAN hub via a respective LAN link, at least one other outer hub device connected to the LAN hub via a respective LAN link, at least one USB device or at least one LAN computer connected to the outer hub device via a respective USB link and at least one other LAN computer connected to the other outer hub device via a respective USB link. The USB device and the LAN computer communicates with the outer hub device using the USB protocol. The other LAN computer communicates with the other outer hub device using the USB protocol. The outer hub device and the other outer hub device communicates with the LAN hub using a LAN protocol. For asynchronous communications, the outer hub device examines USB packets from the USB device or the LAN computer, generates handshake packets in response to the USB packets according the USB protocol and ensures that the handshake packets are generated within a USB time limit prescribed by the USB protocol after receiving the USB packets. In addition, the outer hub device buffers data received from the LAN hub to be sent to the USB device in a data packet and ensures that the data packet follows an Out token packet within the USB time limit prescribed time limit prescribed by the USB protocol. Furthermore, the outer hub device buffers data received from the LAN hub to be sent to the LAN computer in a data packet and ensures that the data packet is sent to the LAN computer within the USB time limit prescribed by the USB protocol after receiving an In token packet from the LAN computer. For asynchronous communications, the other outer hub device examines USB packets from the other LAN computer, generates handshake packets in response to the USB packets according to the USB protocol and ensures that the handshake packets are generated within the USB time limit prescribed by the USB protocol after receiving the USB packets. In addition, the other outer hub device buffers data received from the LAN hub to be sent to the other LAN computer in a data packet and ensures that the data packet is sent to the other LAN computer within the USB time limit prescribed by the USB protocol after receiving an In token packet from the other LAN computer.

In accordance with another aspect of the present invention, there is provided an end hub for use in a computer network in which the end hub communicates with at least one USB device using the USB protocol and in which the end hub communicates with a LAN hub using a LAN protocol. The end hub comprises LAN hub communication means for communicating with the LAN hub, USB device communication means for communicating with the USB device and control logic means connected to the LAN hub communication means and to the USB device communication means. For asynchronous communications, the control logic means examines USB packets from the USB device, generates handshake packets in response to the USB packets according to the USB protocol and ensures that the handshake packets are generated within a USB time limit prescribed by the USB protocol after receiving the USB packets. In addition the control logic means buffers data received from the LAN hub to be sent to the USB device in a data packet and ensures that the data packet follows an Out token packet within the USB time limit prescribed by the USB protocol.

In accordance with the another aspect of the present invention, there is provided an attachment unit for use in a computer network in which the attachment unit communicates with at least one LAN computer using the USB protocol and in which the attachment unit communicates with a LAN hub using a LAN protocol. The attachment unit comprises LAN hub communication means for communicating with the LAN hub, USB computer communication means for communicating with the LAN computer and control logic means connected to the LAN hub communication means and to the USB computer communication means. For asynchronous communications, the control logic means examines USB packets from the LAN computer, generates handshake packets in response to the USB packets according to the USB protocol and ensures that the handshake packets are generated within a USB time limit prescribed by the USB protocol after receiving the USB packets. In addition, the control logic means buffers data received from the LAN hub to be sent to the LAN computer in a data packet and ensures that the data packet is sent to the LAN computer within the USB time limit prescribed by the USB protocol after receiving an In token packet from the LAN computer.

In accordance with another aspect of the present invention, there is provided an enhanced attachment unit for use in a computer network in which the enhanced attachment unit communicates with at least one LAN computer using the USB protocol and in which the attachment unit communicates with a LAN hub using a LAN protocol. The attachment unit comprises LAN hub communication means for communicating with the LAN hub, USB computer communication means for communicating with the LAN computer and control logic means connected to the LAN hub communication means and to the USB computer communication means. The control logic means contains logic to virtually connect at least one USB device. For asynchronous communications, the control logic means examines USB packets from the LAN computer, generates handshake packets in response to the USB packets according to the USB protocol and ensures that the handshake packets are generated within a USB time limit prescribed by the USB protocol after receiving the USB packets. In addition, the control logic means buffers data received from the LAN hub to be sent to the LAN computer in a data packet and ensures that the data packet is sent to the LAN computer within the USB time limit prescribed by the USB protocol after receiving an In token packet from the LAN computer.

In accordance with another aspect of the present invention, there is provided a composite end hub for use in a computer network in which the composite end hub communicates with a LAN computer and with at least one USB device using USB protocol and in which the attachment unit communicates with a LAN hub using a LAN protocol. The composite end hub comprises LAN hub communication means for communicating with the LAN hub, USB device communication means for communicating with the at least one USB device, USB computer communication means for communicating with the LAN computer and control logic means connected to the LAN hub communication means, to the USB device communication means and to the USB computer communication means. For asynchronous communications, the control logic means examines USB packets from the USB device or the LAN computer, generates handshake packets in response to the USB packets according to the USB protocol and ensures that the handshake packets are generated within a USB time limit prescribed by the USB protocol after receiving the USB packets. In addition, the control logic means buffers data received from the LAN hub to be sent to the USB device in a data packet and ensures that the data packet follows an Out token packet within the USB time limit prescribed by the USB protocol. Furthermore, the control logic means buffers data received from the LAN hub to be sent to the LAN computer in a data packet and ensures that the data packet is sent to the LAN computer within the USB time limit prescribed by the USB protocol after receiving an In token packet.

In accordance with another aspect of the present invention, there is provided a virtual modem bridge for use with a first USB host device and a second USB host device in which the virtual modem bridge communicates with the first USB host device and the second USB host device using the USB protocol. The virtual modem bridge comprises first USB host device communication means for communicating with the first USB host device, second USB host device communication means for communicating with the second USB host device and control logic means connected to the first USB host device communication means and to the second USB host device communication means. For asynchronous communications, the control logic means examines USB packets from the first USB host device or the second USB host device, generates handshake packets in response to the USB packets according to the USB protocol and ensures that the handshake packets are generated within a USB time limit prescribed by the USB protocol after receiving the USB packets. In addition, the control logic means buffers data received from the first USB host device to be sent to the second USB host device in a data packet and ensures that the data packet is sent to the second USB host device within the USB time limit prescribed by the USB protocol after receiving an In token packet from the second USB host device. Furthermore, the control logic means buffers data received from the second USB host device to be sent to the first USB host device in a data packet and ensures that the data packet is sent to the first USB host device within the USB time limit prescribed by the USB protocol after receiving an In token packet from the first USB host device.

In accordance with another aspect of the present invention, there is provided a method of increasing the distance between a host computer and a USB device where the host computer communicates with the USB device using the USB protocol, said method for sending data from the host computer to the USB device comprises transmitting an Out token packet and a data packet (collectively the "USB packets") from the host computer to a first outer hub device using the USB protocol; for asynchronous communications, examining the USB packets at the first outer hub device, generating an appropriate handshake packet at the first outer hub device according to the USB protocol and transmitting the handshake packet from the first outer hub device to the host computer within a USB time limit prescribed by the USB protocol after receiving the USB packets; for asynchronous communications, re-transmitting the USB packets from the host computer to the first outer hub device using the USB protocol if a NAK handshake packet is received by the host computer or if no handshake packet was received by the host computer within the USB time limit prescribed by the USB protocol; converting the USB packets into at least one LAN packet according to a LAN protocol at the first outer hub device; transmitting the LAN packet from the first outer hub device to a second outer hub device using the LAN protocol; reconstructing the USB packets from the LAN packet at the second outer hub device; transmitting the USB packets from the second outer hub device to the USB device using the USB protocol ensuring that the data packet follows the token packet within the USB time limit prescribed by the USB protocol; for asynchronous communications, examining the USB packets at the USB device, generating an appropriate handshake packet at the USB device according to the USB protocol and transmitting the handshake packet from the USB device to the second outer hub device within the USB time limit prescribed by the USB protocol after receiving the USB packets; for asynchronous communications, re-transmitting the USB packets using the USB protocol from the second outer hub device to the USB device ensuring that the data packet follows the token packet within the USB time limit prescribed by the USB protocol if a NAK handshake packet is received by the second outer hub device or if no handshake packet was received by the second outer hub device within the USB time limit prescribed by the USB protocol. In addition, said method for obtaining data from the USB device for the host computer comprises transmitting an In token packet from the host computer to a first outer hub device using the USB protocol; if the first outer hub device has data responsive to the In token packet performing the following steps: transmitting a USB data packet from the first outer hub device to the host computer using the USB protocol, and for asynchronous communications, examining the USB data packet at the host according to the USB protocol, generating an appropriate handshake packet at the host computer according to the USB protocol and transmitting the handshake packet from the host computer to the first outer hub device using the USB protocol within the USB time limit prescribed by the USB protocol after receiving the USB data packet; if the first outer hub device does not have data response to the In token packet, transmitting a NAK handshake packet from the first outer hub device to the host computer; if the first outer hub device has received a LAN packet indicating a stall, transmitting a stall handshake packet from the first outer hub device to the host computer; converting the In token packet into at least one LAN packet according to the LAN protocol at the first outer hub device; transmitting the LAN packet from the first outer hub device to a second outer hub device using the LAN protocol; reconstructing the In token packet from the LAN packet at the second outer hub device; transmitting the In token packet from the second outer hub device to the USB device using the USB protocol; if the USB device has data responsive to the In token packet, performing the following steps: transmitting the data in a data packet from the USB device to the second outer hub device using the USB protocol, for asynchronous communications, examining the data packet at the second outer hub device, generating an appropriate handshake packet at the second outer hub device according to the USB protocol and transmitting the handshake packet from the second outer hub device to the USB device using the USB protocol within the USB time limit prescribed by the USB protocol after receiving the USB data packet, and converting the data packet to at least one LAN packet according to the LAN protocol at the second outer hub device; if the USB device does not have data responsive to the IN token packet, transmitting a NAK handshake packet from the USB device to the second outer hub device using the USB protocol and converting the NAK handshake packet into at least one LAN packet according to the LAN protocol; if the USB device is in a stalled condition, transmitting a Stall handshake packet from the USB device to the second outer hub device using the USB protocol and converting the Stall handshake packet into at least one LAN packet according to the LAN protocol; transmitting the LAN packet from the second outer hub device to the first outer hub device using the LAN protocol; reconstructing the data packet, the NAK handshake packet or the Stall handshake packet from the LAN packet at the first outer hub device; and, storing the data packet, the NAK handshake packet or the stall handshake packet in the first outer hub device.

In accordance with another aspect of the present invention, there is provided a method of increasing the distances in a computer network between a host computer and a USB device where the host computer communicates with the USB device using USB protocol, said method for sending data from the host computer to the USB device comprises transmitting an Out token packet and a data packet (collectively the "USB packets") from the host computer to a first outer hub device using the USB protocol; for asynchronous communications, examining the USB packets at the first outer hub device, generating an appropriate handshake packet at the first outer hub device according to the USB protocol and transmitting the handshake packet from the first outer hub device to the host computer using the USB protocol within the USB time limit prescribed by the USB protocol after receiving the USB packets; for asynchronous communications, re-transmitting the USB packets from the host computer to the first outer hub device using the USB protocol if a NAK handshake packet is received by the host computer or if no handshake packet was received by the host computer within the USB time limit prescribed by the USB protocol; converting the USB packets into at least one LAN packet according to a LAN protocol at the first outer hub device; transmitting the LAN packet from the first outer hub device to a LAN hub using the LAN protocol; re-transmitting the LAN packet from the LAN hub to a second outer hub device using the LAN protocol; reconstructing the USB packets from the LAN packet at the second outer hub device; transmitting the USB packets from the second outer hub device to the USB device using the USB protocol ensuring that the data packet follows the Out token packet within the USB time limit prescribed by the USB protocol; for asynchronous communications, examining the USB packets at the USB device, generating an appropriate handshake packet at the USB device according to the USB protocol and transmitting the handshake packet from the USB device to the second outer hub device using the USB protocol within the USB time limit prescribed by the USB protocol after receiving the USB packets; and, for asynchronous communications, re-transmitting the USB packets from the second outer hub device to the USB device using the USB protocol ensuring that the data packet follows the token packet within the USB time limit prescribed by the USB protocol if a NAK handshake packet is received by the second outer hub device or if no handshake packet was received by the second outer hub device within the USB time limit prescribed by the USB protocol. And said method for obtaining data from the USB device for the host computer comprises transmitting an In token packet from the host computer to the first outer hub device using the USB protocol; if the first outer hub device has data responsive to the In token packet performing the following steps: transmitting a data packet from the first outer hub device to the host computer using the USB protocol, and, for asynchronous communications, examining the USB data packet at the host computer, generating an appropriate handshake packet at the host computer according to the USB protocol and transmitting the handshake packet from the host computer to the first outer hub device using the USB protocol within a USB time limit prescribed by the USB protocol after receiving the USB data packet; converting the In token packet into at least one LAN packet according to the LAN protocol at the first outer hub device; transmitting the LAN packet from the first outer hub device to the LAN hub using the LAN protocol; re-transmitting the LAN packet from the LAN hub to the second outer hub device using the LAN protocol; reconstructing the In token packet from the LAN packet at the second outer hub device; transmitting the In token packet from the second outer hub device to the USB device using the USB packet; if the USB device has data responsive to the In token packet, performing the following steps: transmitting the data in a data packet from the USB device to the second outer hub device using the USB protocol, for asynchronous communications, examining the data packet at the second outer hub device, generating an appropriate handshake packet at the second outer hub device according to the USB protocol and transmitting the handshake packet from the second outer hub device to the USB device using the USB protocol within the USB time limit prescribed by the USB protocol after receiving the data USB packet, and, converting the data packet to at least one LAN packet at the second outer hub device; if the USB device does not have data responsive to the IN token packet, transmitting a NAK handshake packet from the USB device to the second outer hub device using the USB protocol and converting the NAK handshake packet into at least one LAN packet according to the LAN protocol; if the USB device is in a stalled condition, transmitting a Stall handshake packet from the USB device to the second outer hub device using the USB protocol and converting the Stall handshake packet into at least one LAN packet according to the LAN protocol; transmitting the LAN packet from the second outer hub device to the LAN hub using the LAN protocol; re-transmitting the LAN packet from the LAN hub to the first outer hub device using the LAN protocol; reconstructing the data packet, the NAK handshake packet or the Stall handshake packet from the LAN packet at the first outer hub device; and, storing the data packet, the NAK handshake packet or the stall handshake packet in the first outer hub device.

In accordance with another aspect of the present invention, there is provided a method of increasing the distances in a computer network between a first host computer and a second host computer where the first host computer communicates with the second host computer using USB protocol, said method for sending data from the first host computer to the second host computer comprises transmitting a token packet and a data packet (collectively the "USB packets") from the first host computer to a first outer hub device using the USB protocol; for asynchronous communications, examining the USB packets at the first outer hub device, generating an appropriate handshake packet at the first outer hub device according to the USB protocol and transmitting the handshake packet from the first outer hub device to the first host computer using the USB protocol within a USB time limit prescribed by the USB protocol after receiving the USB packets; for asynchronous communications, re-transmitting the USB packets from the first host computer to the first outer hub device using the USB protocol if a NAK handshake packet is received by the first host computer or if no handshake packet was received by the first host computer within the USB time limit prescribed by the USB protocol; converting the USB packets into at least one LAN packet according to a LAN protocol at the first outer hub device; transmitting the LAN packet from the first outer hub device to a LAN hub using the LAN protocol; re-transmitting the LAN packet from the LAN hub to a second outer hub device using the LAN protocol; reconstructing the USB packets from the LAN packet at the second outer hub device; in response to an In token packet sent from the second host computer to the second outer hub device using the USB protocol, transmitting the USB data packet from the second outer hub device to the second host computer using the USB protocol within the USB time limit prescribed by the USB protocol after receiving the In token packet; and, for asynchronous communications, examining the USB data packet at the second host computer, generating an appropriate handshake packet at the second host computer according to the USB protocol and transmitting the handshake packet from the second host computer to the second outer hub device using the USB protocol within the USB time limit prescribed by the USB protocol after receiving the USB data packet.

In accordance with another aspect of the present invention, there is provided a method for allowing a first USB host device and a second USB host device to communicate with each other using USB protocol, said method for sending data from the first USB host device to the second USB host device comprises transmitting a token packet and a data packet (collectively the "USB packets") from the first USB host device to a virtual modem bridge using the USB protocol; for asynchronous communications, examining the USB packets at the virtual modem bridge, generating an appropriate handshake packet at the virtual modem bridge according to the USB protocol and transmitting the handshake packet from the virtual modem bridge to the first USB host device using the USB protocol within a USB time limit prescribed by the USB protocol after receiving the USB packets; for asynchronous communications, re-transmitting the USB packets from the first USB host computer to the virtual modem bridge using the USB protocol if a NAK handshake packet is received by the first USB host device or if no handshake packet was received by the first USB host device within the USB time limit prescribed by the USB protocol; in response to an In token packet sent from the second USB host device to the virtual modem bridge using the USB protocol, transmitting the USB data packet from the virtual modem bridge to the second USB host device using the USB protocol within the USB time limit prescribed by the USB protocol after receiving the In token packet; and, for asynchronous communications, examining the USB data packet at the second USB host device, generating an appropriate handshake packet at the second USB host device according to the USB protocol and transmitting the handshake packet from the second USB host device to the virtual modem bridge using the USB protocol within the USB time limit prescribed by the USB protocol after receiving the USB data packet.

BRIEF DESCRIPTION OF THE DRAWINGS

A detailed description of preferred embodiments of the invention follows with reference to the following drawings:

FIG. 2C is a diagram showing the format of a data packet used in the conventional USB protocol;

FIG. 2D is a diagram showing the format of a handshake packet used in the conventional USB protocol;

FIG. 2E is a diagram showing the format of a special low speed preamble packet used in the conventional USB protocol;

FIG. 10A is a diagram showing-in particular the physical layer of the preferred variant of the USB protocol;

FIG. 10B is a diagram showing the start of frame LAN packet and related packets according to the preferred variant of the USB protocol used for communications between the LAN hub and the end hub;

FIG. 10C is a diagram showing the reset LAN packet and related packets according to the preferred variant of the USB protocol used for communications between the LAN hub and the end hub;

FIG. 15A is a diagram showing the start of frame LAN packet and related packets according to the preferred variant of the USB protocol used for communications between the LAN hub and the enhanced attachment unit;

FIG. 15B is a diagram showing the reset LAN packet and related packets according to the preferred variant of the USB protocol used for communications between the LAN hub and the enhanced attachment unit;

FIG. 15C is a diagram showing a stall LAN packet according to the preferred variant of the USB protocol used for communications between the LAN hub and the enhanced attachment unit;

FIG. 19 is the bandwidth allocation table stored in the LAN hub;

FIG. 20 is the USB device and status table by line stored in the LAN hub;

FIG. 21 is the device endpoint description and service interval table stored in the LAN hub;

FIG. 22 is the table of inter-buffer flow assignments stored in the LAN hub;

FIG. 23 is the master table of available buffer space stored in the LAN hub;

FIG. 24 is a session table stored in the LAN hub.

DETAILED DESCRIPTION OF A PREFERRED EMBODIMENT OF THE INVENTION

Figures 1, 2A, 2B:
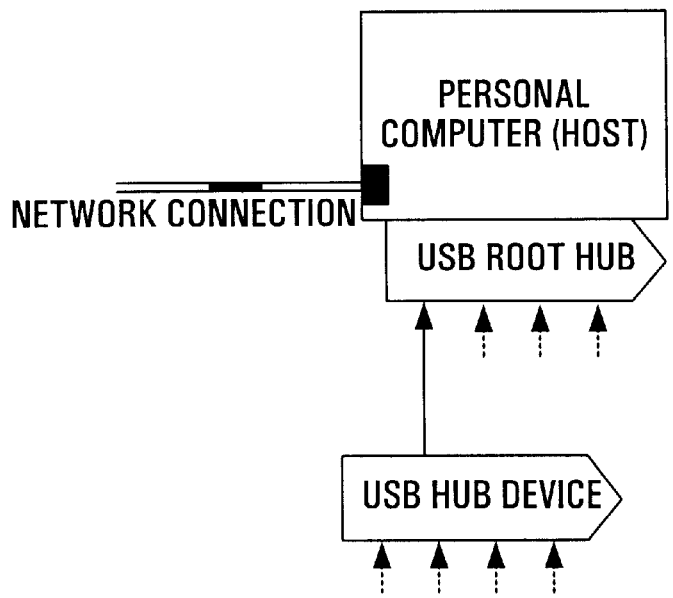
FIG. 1 is a block diagram of a conventional computer network using a Universal Serial Bus.
FIG. 2A is a diagram showing the format of a token packet used in the conventional USB protocol.
FIG. 2B is a diagram showing the format of a start of frame packet used in the conventional USB protocol.
Figure 3:
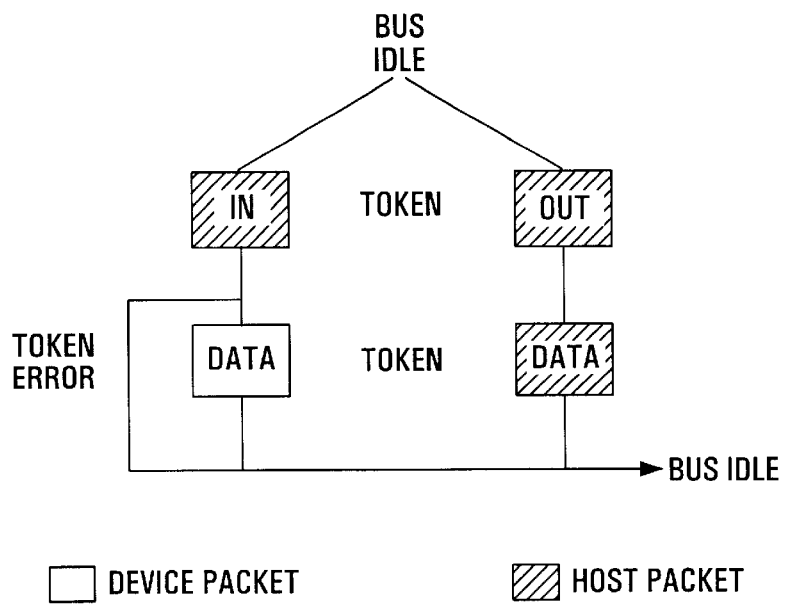
FIG. 3 is a block diagram showing conventional USB isochronous transactions.
Figure 4:
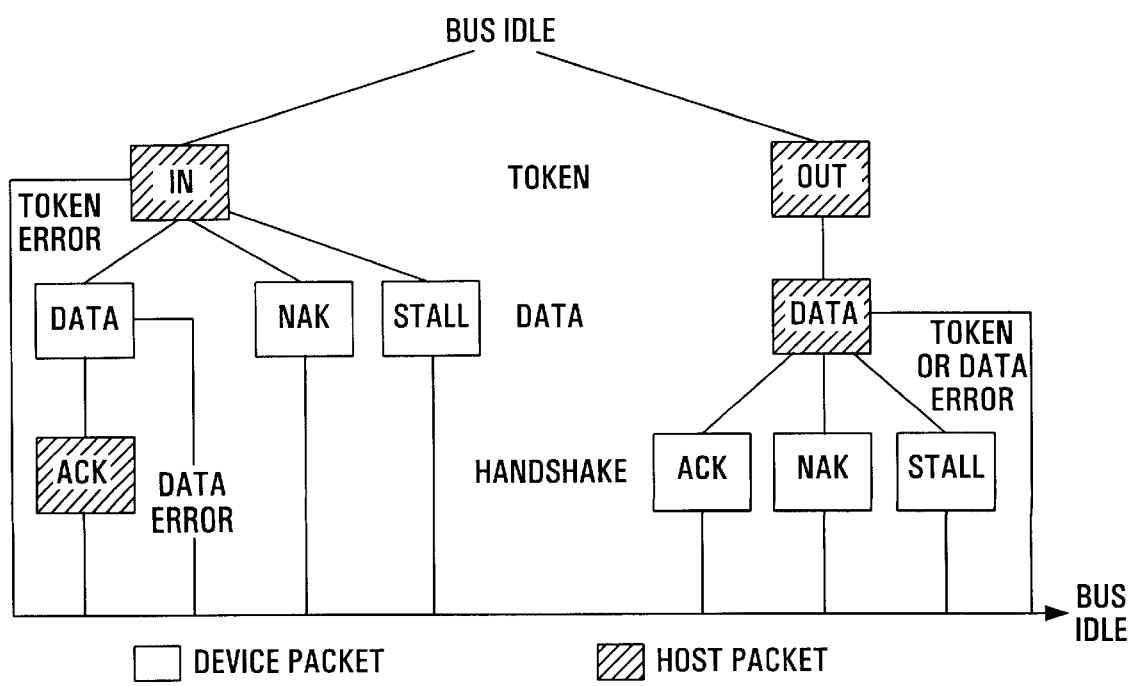
FIG. 4 is a block diagram showing conventional USB bulk/control data transactions.
Figure 5:
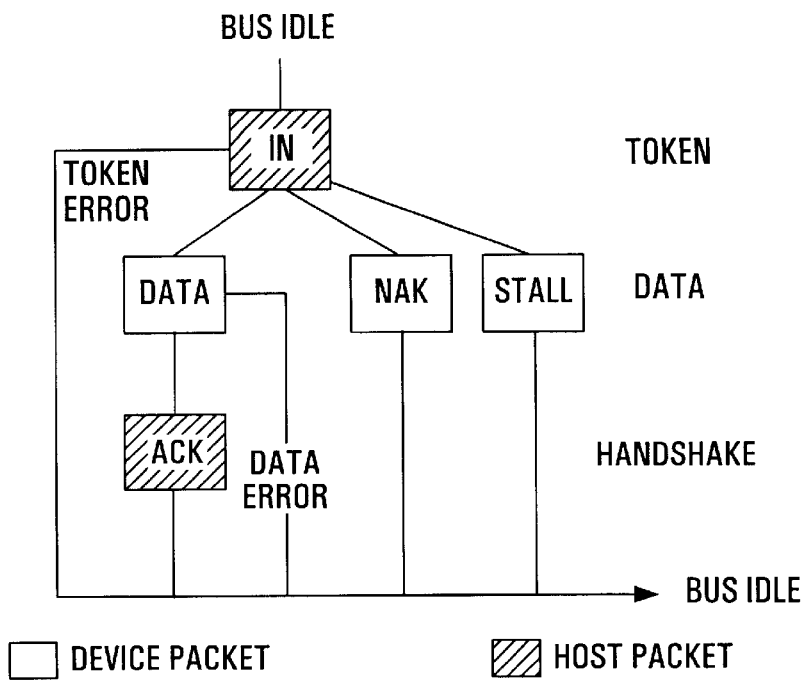
FIG. 5 is a block diagram showing conventional USB interrupt transactions.
Figure 6:
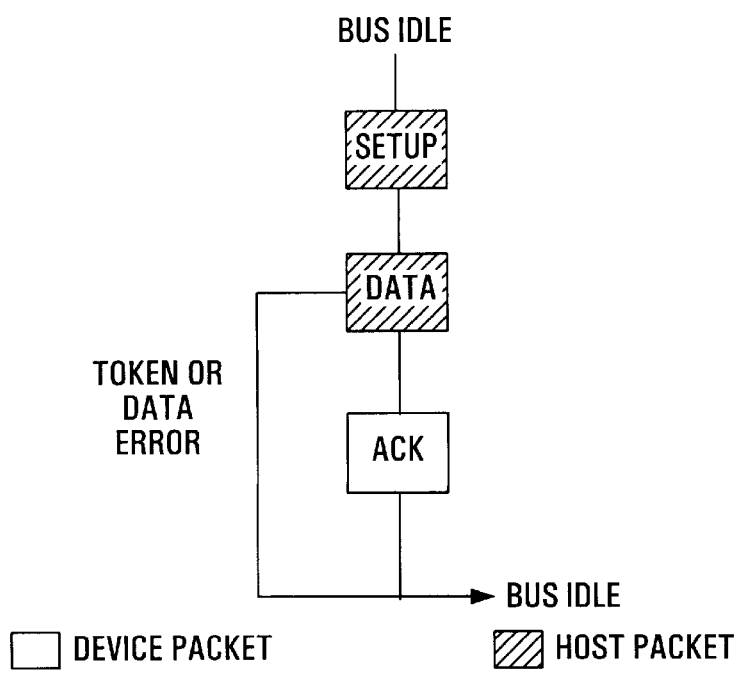
FIG. 6 is a block diagram showing conventional USB control setup transactions.
Figure 7:
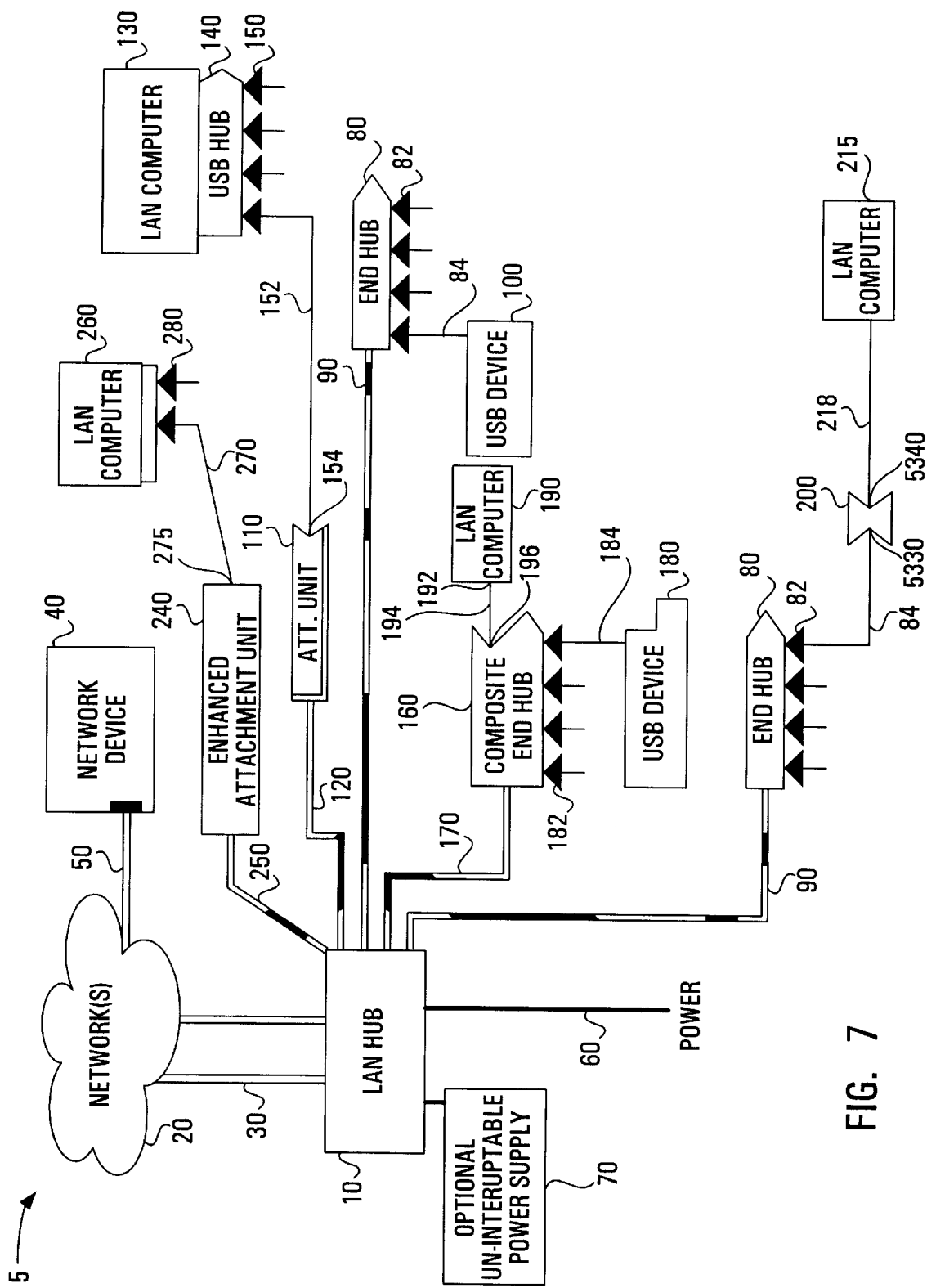
FIG. 7 is a block diagram showing network(s) connected to a local area network which incorporates Universal Serial Bus capabilities according to the preferred embodiment of the present invention.

FIG. 7 is an architecture diagram of a computer network 5 in accordance with a preferred embodiment of the present invention. A plurality of outer hub devices are connected to a LAN hub 10 via a plurality of LAN links. There are four types of outer hub devices, an end hub 80, an attachment unit 110, a composite end hub 160 and an enhanced attachment unit 240. Various combinations of these four types of outer hub devices are possible in the computer network 5.

In particular, FIG. 7 shows two end hubs 80 connected to the LAN hub 10 via two LAN links 90. Each end hub 80 has four host USB ports 82. A USB device 100, such as a USB telephone, is connected to one of the end hubs 80 via one of the host USB ports 82. In particular, the USB device 100 is connected to the host USB port 82 of the end hub 80 via a USB link 84. A virtual modem bridge 200 is connected to the other end hub 80. In particular, the virtual modem bridge 200 is connected to a host USB port 82 of the other end hub 80 via a USB link 210. A LAN computer 215, such as a PC, is connected to the virtual modem bridge 200 via a USB link 218. The end hubs 80 may have more or less than four host USB ports 82. However, each end hub 80 must have at least one host USB port 82. More or less than two end hubs 80 may be connected to the LAN hub 10 via respective LAN links 90.

An attachment unit 110 is connected to the LAN hub 10 via a LAN link 120. A LAN computer 130, such as a personal computer, is connected to the attachment unit 110. In particular, a USB link 152 from a device USB port 154 of the attachment unit 110 is connected to a host USB port 150 on the LAN computer 130. FIG. 7 shows the LAN computer 130 with a USB hub device 140 providing four host USB ports 150. (The LAN computer need not have a plurality of USB ports 150 but must have at least one USB port 150). A plurality of attachment units 110 may be connected to the LAN hub 10 via a plurality of LAN links 120 (not shown).

A composite end hub 160 is connected to the LAN hub 10 via a LAN link 170. Composite end hubs 160 combine the functionality of end hubs 80 and attachment units 110. The composite end hub 160 has four host USB ports 182. Up to four USB devices 180 are connected to the host USB ports 182 on the composite end hub 160 via respective USB links 184. A LAN computer 190, such as a personal computer (PC), is also connected to the composite end hub 160. A USB link 194 from a device USB port 196 of the composite end hub 160 is connected to a host USB port 192 of the LAN computer 190. The composite end hub 160 may have more or less than four USB host ports 182; however, each composite end hub 160 must have at least one host USB port 182 and one USB device port 196. A plurality of composite end hubs 160 may be connected to the LAN hub 10 via respective LAN links 170 (not shown).

An enhanced attachment unit 240 is connected to the LAN hub 10 via a LAN link 250. A LAN computer 260, such as a personal computer, is connected to the enhanced attachment unit 240. In particular a USB link 270 from a device USB port 275 of the enhanced attachment unit 240 is connected to a host USB port 280 of the LAN computer 260. A plurality of enhanced attachment units 240 may be connected to the LAN hub 10 via a plurality of LAN links 250 (not shown).

Main power is provided to the LAN hub 10 via power mains 60. An uninterrupted power supply 70 is connected to the LAN hub 10 to provide backup power in the event of a main power failure. The uninterrupted power supply 70 is optional.

Two networks 20 are connected to the LAN hub 10 via a two network links 30. More or less than two networks may be connected to the LAN hub 10 via respective network links 30 (not shown). In fact, for some applications, it is not necessary to have a network 20 connected at all to the LAN hub 10.

FIG. 7 also shows a network device 40 connected to the network 20 via a second network link 50. Typically a plurality of network devices 40 are connected to the network 20. The network devices 40 are typically remote computers, servers, PBX's, or telephone switches. Alternatively, each network device 40 may be connected directly to the LAN hub 10 via a dedicated network link (not shown).

The computer network 5 allows the LAN computers 130, the LAN computers 190, the LAN computers 260, the LAN computers 215 and the network devices 40 (such as remote computers) to access and utilize the USB devices 100 connected to each end hub 80 and the USB devices 180 connected to each composite end hub 160. Furthermore, the computer network 5 also permits each LAN computer 130, each LAN computer 190, each LAN computer 260, each LAN computer 215 and each network device 40 (such as remote computers) to communicate with each other. It is important to note that the LAN computers 130, the LAN computers 190, the LAN computers 260 and the LAN computers 215 are not computers that are part of the LAN hub 10 or specifically control the LAN hub 10.

Each LAN computer 130, 190, 215 and 260 runs Operating System (OS) software which includes USB host software, client software and device drivers. Each network device 40 typically also runs Operating System (OS) software which includes USB hot software, client software and device drivers. (However, some network devices 40, such as PBX's, need not run USB host software but only software which performs some of the functions of the USB host software).

The lengths of each LAN link 90, LAN link 120, LAN link 170 and LAN link 250 typically range up to 100 meters but may be extended up to 1,000 meters or more. The lengths of each USB link 84, USB link 152, USB link 184, USB link 194, USB link 210, USB link 218, and USB link 270 must not exceed 5 meters in accordance with the USB Specification 1.0. The end hubs 80, the attachment units 110, the composite end hubs 160, and the enhanced attachment units 240 perform a plurality of lower level functions of the USB protocol including the physical layer and the data link layer of the USB protocol and the time sensitive aspects of the USB protocol. (Discussed in more detail later). In addition, the end hubs 80 and the composite end hubs 160 also perform some of the traditional USB hub device functions including detecting and managing the connection and disconnection of USB devices. The attachment units 110, the composite end hubs 160 and the enhanced attachment units 240 also detect the connection and disconnection of the LAN computers 130, 190 and 260 respectively.

Figure 7A:
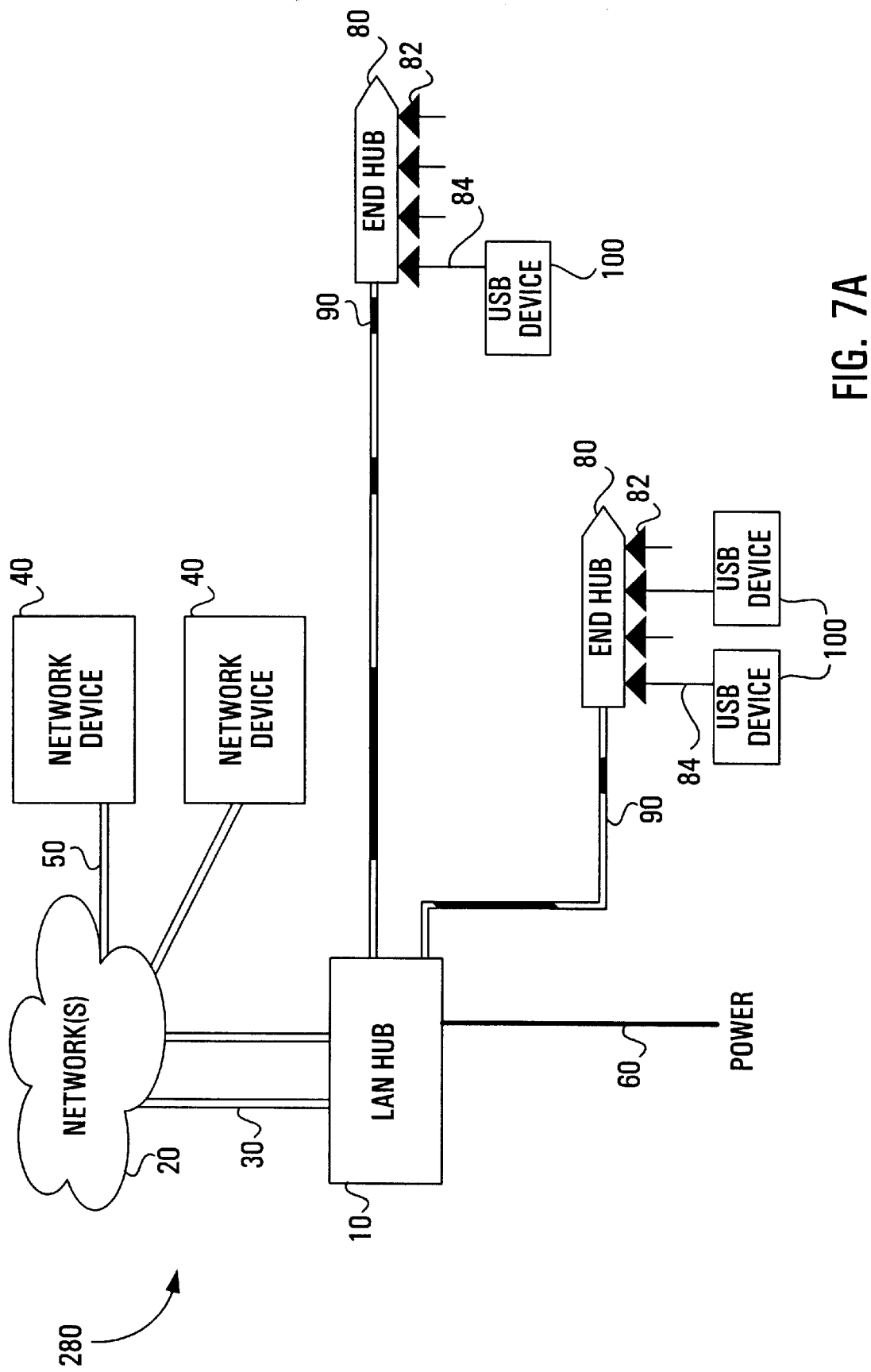
FIG. 7A is a block diagram showing network(s) connected to a local area network which incorporates Universal Serial Bus capabilities according to another embodiment of the present invention.

Variations of the computer network 5 are possible. Referring to FIG. 7A, a computer network 280 comprises a LAN hub 10 connected to two networks 20 via two first network links 30. More or less than two networks 20 may be connected to the LAN hub 10 via respective first network links 30. Two network devices 40 connected to the networks 20 via two respective second network links 50. (More or less network devices 40 may be connected). The computer network 280 also comprises two end hubs 80 connected to the LAN hub 10 via a LAN link 90. More or less than two end hubs 80 may be connected to the LAN hub 10; however, at least one end hub 80 must be connected to the LAN hub 10. One USB device 100 connected to one of the end hubs 80 and two USB devices 100 connected to the other end hub 80. (Typically, a plurality of USB devices 100 are connected to each end hub 80 via a plurality of USB links 84). In addition, main power is provided to the LAN hub 10 via cable mains 60.

Alternatively, the computer network 280 comprises at least one composite end hub 160 (instead of the end hub 80). The composite end hub is connected to the LAN hub 10 via a LAN link 170. A plurality of USB devices 180 are connected to the composite end hub via a plurality of USB links 184. A LAN computer 190 is connected to the composite end hub 160 via a USB link 194. (A LAN computer 190 need not be connected to the composite end hub 160).

Alternatively, the computer network 280 comprises at least one attachment unit 110 or at least one enhanced attachment unit 240 (instead of the end hub 80). The attachment unit 110 or the enhanced attachment unit 240 is connected to the LAN hub 10 via a LAN link: 120 or a LAN link 250 respectively. A LAN computer 130 is connected to the attachment unit 110 via a USB link 152. A LAN computer 260 is connected to the enhanced attachment unit 240 via a USB link 270.

Alternatively, the computer network 280 may comprise of various combinations of end hubs 80, composite end hubs 160, attachment units 110 and enhanced attachment units 240 connected to the LAN hub 10 via respective LAN links 90, 170, 120 and 250.

Figure 7B:
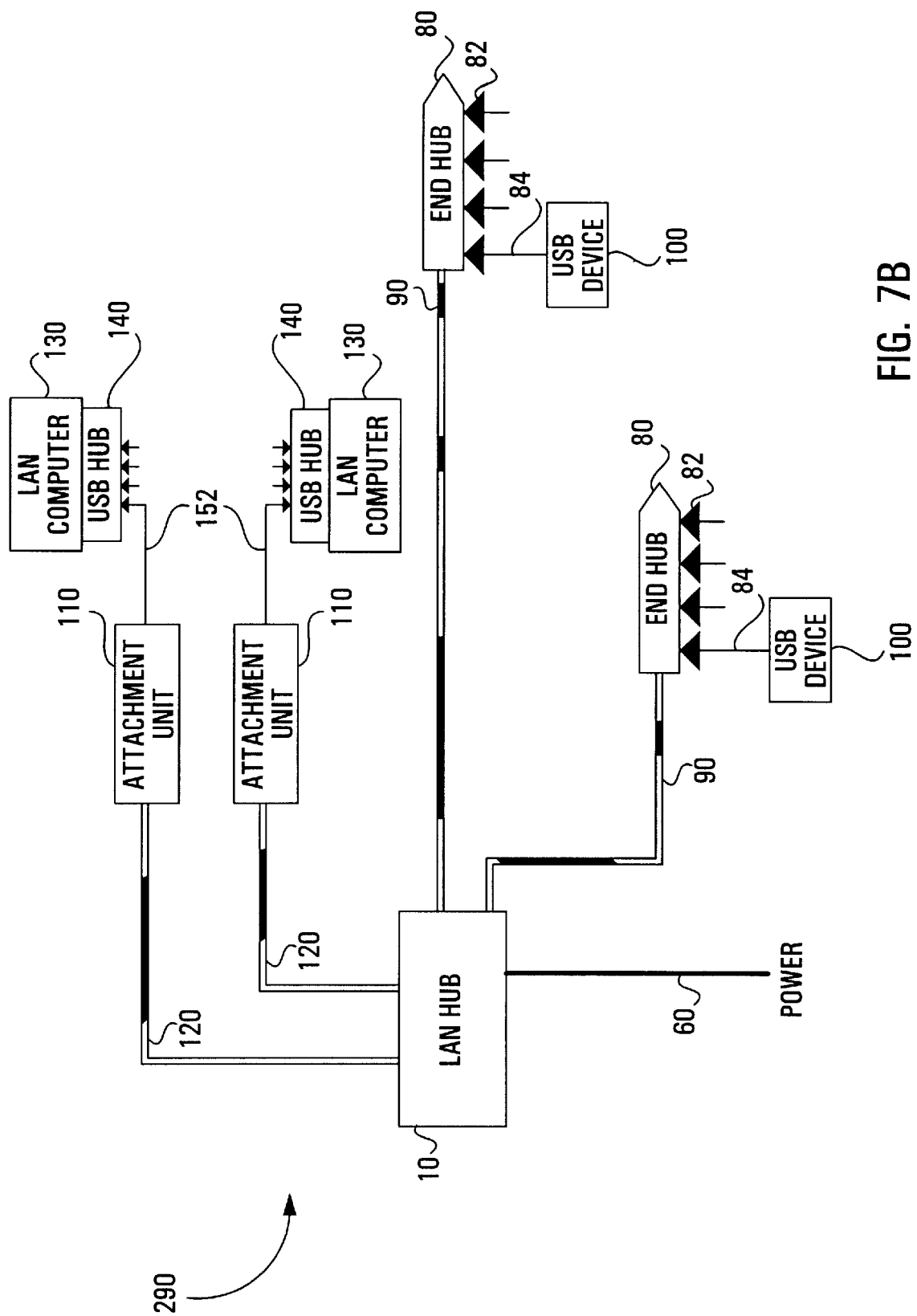
FIG. 7B is a block diagram showing a local area network which incorporates Universal Serial Bus capabilities according to another embodiment of the present invention.

FIG. 7B illustrates yet another variation of the computer network 5. A computer network 290 comprises two attachment units 110 connected to a LAN hub 10 via two LAN links 120. (At least one attachment unit 110 must be connected to the LAN hub 10). A LAN computer 130 is connected to each attachment unit 110 via a respective USB link 152. The computer network 290 further comprises two end hubs 80 connected to the LAN hub 10 via two LAN links 90. A USB device 100 is connected to each end hub 80. (Typically, a plurality of USB devices 100 are connected to the end hub 80 via a plurality of USB links 84). At least one end hub 80 must be connected to the LAN hub 10. In addition main power is provided to the LAN hub 10 via cable mains 60.

Optionally, a computer network 20 (or a plurality of computer networks 20) is connected to the LAN hub 10 via a first network link 30 (or a plurality of respective first network links 30). As discussed earlier, network devices 40 are typically connected to the one or more networks 20 via a plurality of second network links 50. (Not shown in FIG. 7B). Alternatively, the network devices 40 are connected to the LAN hub 10 via a dedicated link (not shown).

Alternatively, the attachment units 110 are replaced with at least one enhanced attachment unit 240 or at least one composite end hub 160. The enhanced attachment unit 240 is connected to the LAN hub 10 via a LAN link 250. Similarly, the composite end hub 160 is connected to the LAN hub 10 via a LAN link 170. A LAN computer 260 is connected to the enhanced attachment unit 240 via a USB link 270. Similarly, a LAN computer 190 is connected to the composite end hub 160 via a USB link 194 optionally, a plurality of USB devices 180 is connected to the composite end hub 160 via a plurality of USB links 184.

Alternatively, the end hubs 80 are replaced with at least one composite end hub 160. The composite end hub 160 is connected to the LAN hub 10 via a LAN link 170. A plurality of USB devices 180 are connected to the composite end hub 160 via a plurality of USB links 184. Optionally, a LAN computer 190 is connected to the composite end hub 160 via a USB link 194.

Figure 7C:
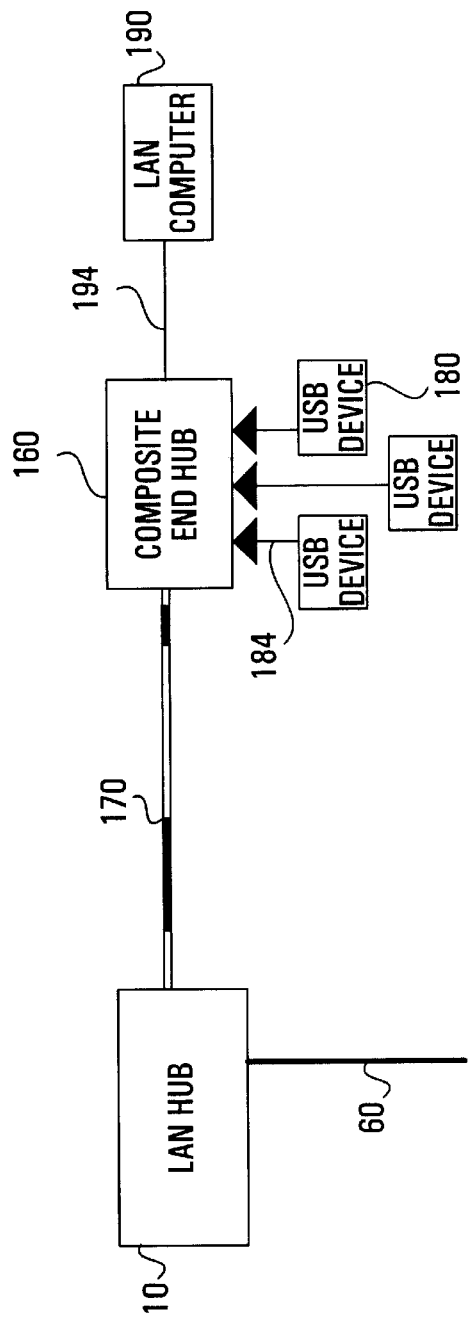
FIG. 7C is a block diagram showing a local area network which incorporates Universal Serial Bus capabilities according to yet another embodiment of the present invention.

FIG. 7C illustrates another variation of the computer network 5. A computer network 15 comprises one composite end hub 160 connected to a LAN hub 10 via a LAN link 170. A LAN computer 190 is connected to the composite end hub via a USB link 194. (At least one composite end hub 160 must be connected to the LAN hub 10). Three USB devices 180 are connected to the composite end hub 160 via three USB links 184. (More or less than three USB devices 180 may be connected to each composite end hub 160). In addition main power is provided to the LAN hub 10 via cable mains 60.

Optionally, a computer network 20 (or a plurality of computer networks 20) is connected to the LAN hub 10 via a first network link 30 (or a plurality of respective first network links 30). As discussed earlier, network devices 40 are typically connected to the one or more networks 20 via a plurality of second network links 50. (Not shown in FIG. 7C). Alternatively, the network devices 40 are connected to the LAN hub 10 via a dedicated link (not shown in FIG. 7C).

Figure 7D:
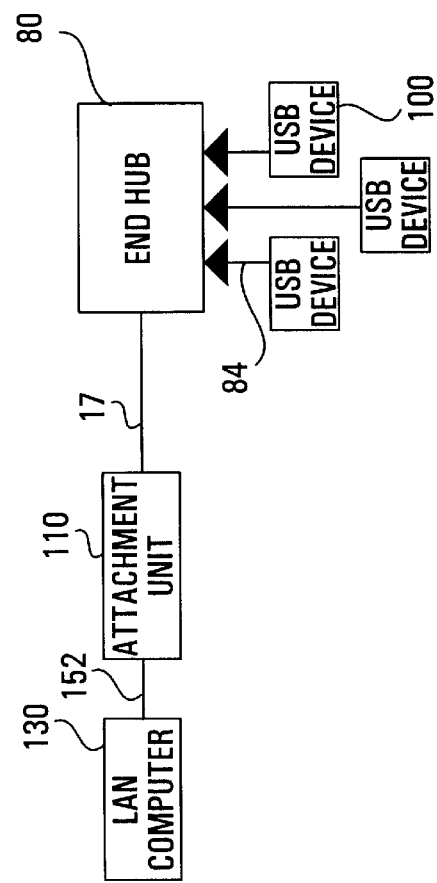
FIG. 7D is a block diagram of a computer, an attachment unit, an end hub, and a USB device according to another embodiment of the present invention.

FIG. 7D shows another embodiment of the present invention which does not use a LAN hub 10. A computer 130 is connected to an attachment unit 110 via a USB link 152. The attachment unit 110 is connected to an end hub 80 via a LAN link 17. Three USB devices 100 are connected to the end hub 80 via three USB links 84. (More or less than three USB devices 100 may be connected to the end hub 80). The attachment unit 110 and the end hub 80 communicate with each other over the LAN link 17 using a variant of the USB protocol (discussed later).

Alternatively, the attachment unit 110 is replaced with an enhanced attachment unit 240. A computer 260 is connected to the enhanced attachment unit 240 via a USB link 270. The length of the LAN link 17 typically ranges up to 100 meters but may be extended to 1,000 meters or more. The lengths of the USB links 152, 84 and 270 must not exceed 5 meters in accordance with the USB specification 1.0.

Figure 8:
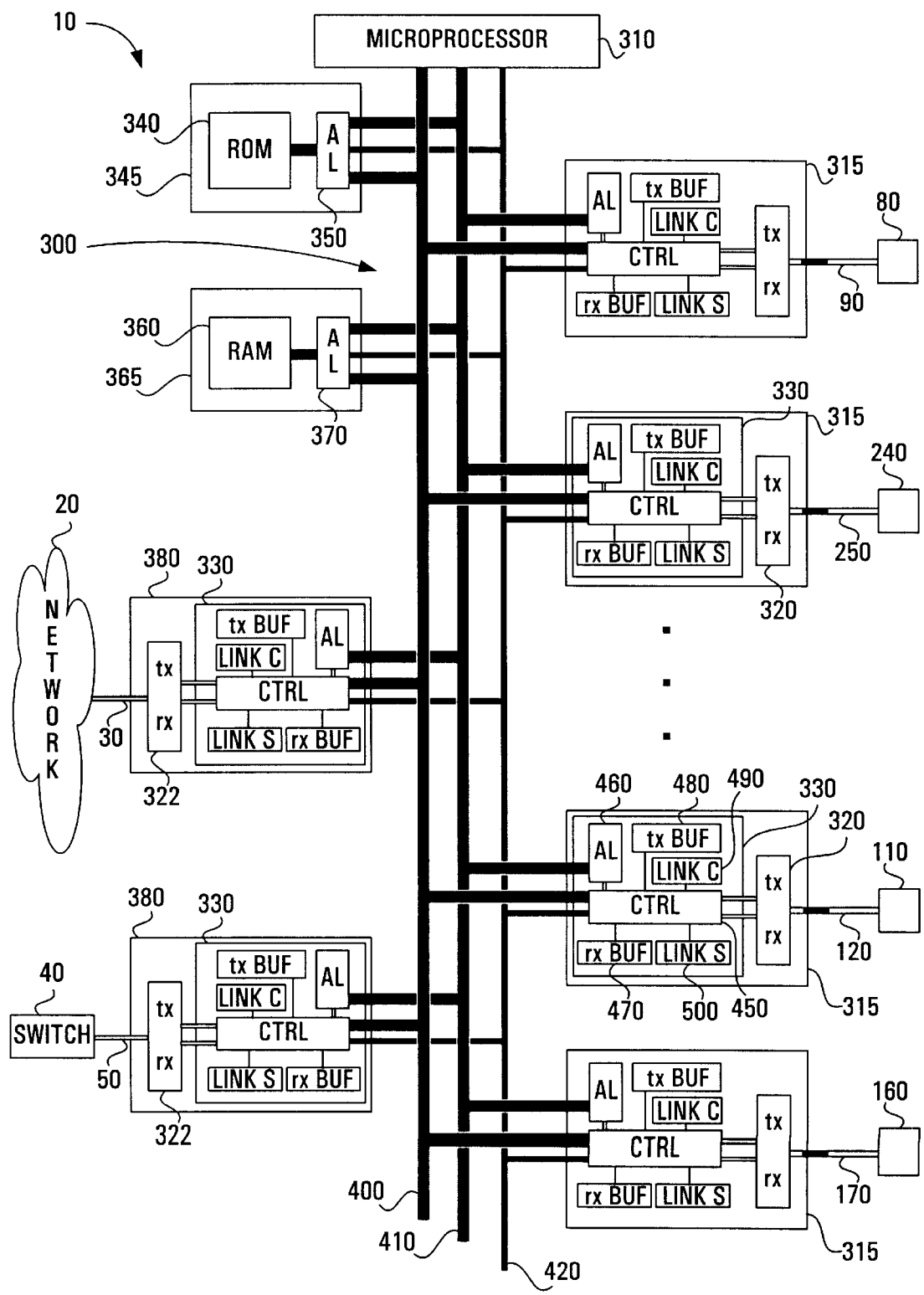
FIG. 8 is a block diagram of a LAN hub shown in FIGS. 7, 7A, 7B and 7C.

FIG. 8 is a block diagram of a LAN hub 10. A bus 300 is connected to a microprocessor 310. The bus 300 comprises a data bus 400, an address bus 410 and a bus control bus 420. The data bus 400, the address bus 410, and the bus control bus 420 each comprise a plurality of signal paths or lines. The microprocessor 310 can be virtually any type of microprocessor such as a 486, Pentium*, etc. A ROM unit 345, a RAM unit 365, and one or more LAN interface devices 315 are connected to the bus 300. Optionally, one or more network interface devices 380 are connected to the bus 300. Anything connected to the bus 300, other than the microprocessor 310, is a bus unit. (i.e. the ROM unit 345, the RAM unit 365, the LAN interface devices 315 and the network interface devices 380 are bus units).

*Trade-mark

Each LAN interface device 315 comprises a bus transceiver interface logic device 330 connected to a transceiver 320. Each bus transceiver interface logic device 330 is connected to the bus 300 (described in more detail below). Each transceiver 320 is connected to an end hub 80 via a LAN link 90, to a composite end hub 160 via a LAN link 170, to an attachment unit 110 via a LAN link 120 or to an enhanced attachment unit 240 via a LAN link 250.

Each Network interface device 380 typically comprises the bus-transceiver interface logic device 330 connected to a transceiver 322. Each bus transceiver interface device 330 is connected to the bus 300. Each transceiver 322 is connected to the a network 20 via a respective first network link 30 or directly to a network device 40, such as a telephone switch, via a dedicated network link. Depending on the physical layer of the protocol used on the network links 30, the transceiver 322 may be the same as the transceiver 320.

The ROM unit 345 comprises read-only memory (ROM) 340 connected to an address logic unit 350. The RAM unit 365 comprises random access memory (RAM) 360 and an address logic unit 370. The address logic unit 350 and the address logic unit 370 are connected to the data bus 400, address bus 410 and the bus control bus 420.

Each bus transceiver interface logic device 330 typically comprises a control unit 450, an address logic unit 460 connected to the control unit 450, a receive buffer 470 connected to the control unit 450, a transmit buffer 480 connected to the control unit 450, a link control register 490 connected to the control unit 450 and a link status register 500 connected to the control unit 450.

The address logic unit 460 is connected to the address bus 410. The control unit 450 is connected to the data bus 400 and to the bus control bus 420.

The bus units have a plurality of functions. (Discussed in more detail later). There is typically a unique bus address for each function of each bus unit. The microprocessor 310 sends a bus address on the address bus 410 to select one of the individual bus units and one of the functions (if applicable). The address logic units 460, 350 and 370 decode the bus address on the address bus 40 to enable the appropriate bus unit to gain access to the data bus 400. The data bus 400 allows a transfer of data between the bus units and the microprocessor 310. The bus control bus 420 provides a clock signal to all the bus units and also indicate whether data is being received by a bus unit or the microprocessor 310 (i.e. read) or being transmitted (i.e. written) by a bus unit or the microprocessor 310. The bus control bus 420 can also provide interrupt signalling to the microprocessor 310.

The main functions of the bus-transceiver interface logic devices 330 are to send data, receive data, send line condition data and receive line condition data. The address logic unit 460 allows these functions to be accessed as specific bus addresses on the address bus 410. The transmit buffer 480 stores data from the data bus 400 in a first in first out (FIFO) manner for output by the transceiver 320 (or the transceiver 322). The receive buffer 470 stores data received by the transceiver 320 (or the transceiver 322) also in a FIFO manner. Any data received or sent by the transceiver 320 (or the transceiver 322) is serial data. However, the data carried on the data bus 400 is parallel data. The control unit 450 moves the serial data between the transceiver 320 (or the transceiver 322) and the receive buffer 470 and the data between the transmit buffer 480 and the transceiver 320 (or the transceiver 322). In addition, the control unit 450 handles the conversion between serial and parallel data when data is being moved from the receive buffer 470 to the data bus 400 or from the data bus 400 to the transmit buffer 480.

The microprocessor 310 sends line condition data to the link control register 490 via the control unit 450. The control unit 450 also translates the line condition data in the link control register 490 into line conditions such as make line idle when transit buffer is emptied (signalling end of packet), insert stuff bytes when transmit buffers emptied (signalling continuation of packet), send start of packet, ACK, NAK, stall, send start of frame packet, etc., and sends an appropriate signal(s) to the transceiver 320 (or the transceiver 322).

The link status register 500 stores data relating to the line conditions such as: start of receive packet, received start of frame packet, idle line, received stuff byte, collision detected (if appropriate), line attached, line detached, transmit buffer full/ready, received buffer full/empty/overflow, etc. The transceiver 320 (or the transceiver 322) detects the actual line conditions and translates the actual line conditions into line condition data. The control unit 450 moves the line condition data into the link status register 500. The microprocessor 310 polls each link status register 500 to obtain the latest line condition data.

Optionally, high speed parallel connector interfaces can be extended from the bus 300 to connect to adjacent LAN hubs in a daisy chain fashion to allow multiple LAN hubs to combine operation as a single LAN (not shown in FIG. 8).

The ROM 340 stores software used by the microprocessor 310 (discussed in more detail later). Optionally, other forms of memory storage can be used to store the software such as an EPROM, hard drive, etc. The RAM 360 stores tables and parameters used by the microprocessor to execute the software. (Discussed in more detail below). The software typically includes a rudimentary LAN hub Operating System (LAN hub OS).

Referring in particular to FIG. 7A, one of the network devices 40, such as a remote computer, connects to the LAN hub 10 over the network 20 via the network link 30 to interact with one of the USB devices 100 attached to the respective end hub 80 or to one of the USB devices 180 attached to the respective composite end hub 160.

The network device 40 communicates with the network 20 using a conventional network protocol. The USB protocol is modified and encapsulated within the conventional network protocol according to a sub-protocol. The LAN hub 10 communicates with the network 20 using the conventional network protocol.

The conventional network protocol typically has headers containing an address of the LAN hub 10 and a protocol type field to indicate the type of encapsulated protocol (USB protocol in this case). Typically, a conventional network protocol carries data within packets ("network packets") as defined by the conventional network protocol. The conventional protocols typically used are IP and TCP. IP has an addressing scheme which ensures that packets are routed to their intended destination and also indicate their originating address. TCP ensures that the packets sent over different paths can be reassembled into the proper order, that lost packets are re-transmitted and that receive buffers do not overflow.

The USB host software in each network device 40 translates data from client software into USB packets. Network protocol software in each network device 40 encapsulates the USB packets within the conventional network protocol according to the sub-protocol. Similarly, the network protocol software in each network device 40 extracts the USB packets from the network packets sent from the LAN hub 10 according to the sub-protocol. The USB host software extracts information or data from the USB packets. The information and the data is typically carried to the client software.

The network device 40 sets up the network connection to the LAN hub 10 with attributes required to support the appropriate requirements for the client software. (e.g. Isochronous communications through a PSTN or a dedicated line, or "Internet style" asynchronous communications for communications with LAN computers, etc.).

Every LAN link between an outer hub device and the LAN hub 10 is assigned a unique LAN link number starting from 1. (i.e. Each LAN link 90, LAN link 120, LAN link 170 and LAN link 250 are assigned a unique LAN link number starting from 1). LAN link number 0 is a special LAN link number assigned to the LAN hub 10.

A LAN protocol is used for communications on LAN link 90 (or LAN link 170). The LAN protocol is a variant of the USB protocol. (discussed in more detail later). Information is sent in packets called LAN packets.

If the network device 40 is connected directly to the LAN hub 10 via a dedicated network link, a conventional protocol less complex than TCP and IP can be used or even the LAN protocol can be used. (e.g. a LAN hub could be connected directly to a telephone server such as a PBX or KEY system).

Whenever a network device 40 sends data to a USB device 100 or 180 via the LAN hub 10 (an Out LAN transaction), the sub-protocol typically works the following way: A first field indicates what version of USB transfer protocol is being used. A second field addresses the LAN link number of the USB outer hub to which the desired USB device is connected. After a non zero line number is a third field indicating the type of USB transaction (i.e. isochronous or asynchronous) and whether options are specified. The type of USB transaction indicates whether the USB data transfer expects a handshake or not. If no options are specified, a fourth field for an out token follows. This field is identical to the Out token to be used on the USB link and indicates the type of token, the USB device address and end point number to which data is to be sent. A fifth field indicates the length of data to follow in bytes (i.e. the total length including the PID, Data and CRC). Finally the data follows, first with a data PID which indicates 0/1 data sequencing, the data itself and a CRC. After the data field, the packet may terminate or additional transactions to the same USB device 100 or 180 may be appended starting with the second field above: the LAN link number. If options are specified in a third field, then option fields are inserted between the third and fourth fields described above. Three option fields can specify: a preferred time before next out transaction of the same type of USB transaction and destination, a minimal time for next USB transaction of the same type of USB transaction and a maximum time before the next USB transaction of the same type of USB transaction. These times refer to the timing of transactions on the Universal Serial Bus. This timing information-is not required for isochronous transactions for which the scheduling is fixed.

Network packets containing the fields and data described above are received by the transceiver 322 of the network interface device 380 serving the network 20 to which the network device 40 is connected. The control unit 450 moves the network packets into the receive buffer 470. The microprocessor 310 moves the network packets from the receive buffer 470 via control unit 450 into the RAM 360. The microprocessor 310 extracts the sub-protocol from the conventional protocol (e.g. TCP/IP) in RAM 360 being used by the network 20. The microprocessor 310 creates LAN packets from the sub-protocol according to the LAN protocol. (discussed in more detail later). The microprocessor moves the LAN packets from the RAM 360 into the transmit buffer 480 of the LAN interface device 315 associated with the destined USB device 100, 180. The LAN interface device 315 moves the LAN packets from the transmit buffer 480 to the transceiver 320 for transmission to the outer hub associated with the addressed USB device 100, 180 (discussed in more detail later).

LAN packets from an outer hub device are received by the transceiver 320 of the LAN interface device 315 associated with the outer hub device and placed in the received buffer 470 of the bus-transceiver interface logic device 330. The microprocessor 310 moves the LAN packets in the received buffer 470 of the bus-transceiver interface logic device 330 via control unit 430 into the RAM 360. The microprocessor 310 converts the LAN packets into USB packets. The microprocessor 310 encapsulates the USB packets within network packets of the conventional network protocol according to the sub-protocol. The microprocessor 310 moves the network packets from the RAM 360 into the transmit buffer 480 of the network interface device 380 serving the network 20 via the control unit 450 of the network interface device 380.

Whenever one of the network devices 40 wishes to obtain data from one of the USB devices 100 or 180 via LAN hub 10 (an In LAN transaction), the sub-protocol works the following way: As before, the first field is a protocol version number, the second field address is the LAN link number of the USB outer hub to which the desired USB device 100 or 180 is connected. The third field indicates the type of USB transaction and whether the USB transaction is a single or composite transaction and whether options are requested. If the USB transaction is a single transaction and no options are indicated, then the fourth field is an In token to be used on the USB link which indicates the type of token (i.e. In token), the USB device address and the end point number. The In token is identical to the In token used on the USB link. A fifth field indicates a maximum data size for the transaction. A sixth field indicates a number of In token retries that should be attempted on the LAN link in the event of that a NAK handshake packet is received. After this field, the packet may be terminated or appended with another transaction, starting with field two above. If field three indicates a composite transaction, then additional fields are inserted between fields three and four. The composite transaction is used to issue repeated In tokens to the USB device's end point to completely clear the end point's buffer. Two fields are inserted for composite transactions: a field indicating a maximum number of successful In LAN transactions on the LAN link until In tokens are stopped and data is transferred back to the network device 40, and a minimum number of consecutive NAK handshake packets that trigger a halt of new In tokens and available data is sent back to the network device 40. In general, a stall handshake packet or reaching the maximum error retries will also halt the issuance of new In tokens and the available data and a stall/error indication will be passed back to the network device 40. If options are specified in field three above, then three fields are inserted before field four above indicating: an optimal time before next In USB transaction of the same type of USB transaction and destination, a minimal time for next USB transaction of the same type of USB transaction and a maximum time before next USB transaction of the same type of USB transaction. These times refer to the timing of USB transactions on the Universal Serial Bus. This timing information is not needed for isochronous transactions for which the scheduling is fixed.

Upon receipt of an In token packet, the USB device 80 (or USB device 180) sends data to the end hub 80 (or composite end hub 160) which further relays it back to the LAN hub 10. The protocol between the end hub 80 (or composite end hub 160) and the LAN hub 10 is covered in FIGS 10A to 10I (described in more detail later). The data is encapsulated within the conventional network protocol using the sub protocol by the microprocessor 310 in the LAN hub 10 and is sent to the network device 40 in a network packet. The sub-protocol works the following way: the first field of the conventional network protocol indicates the USB transfer protocol version number. The second field indicates the line number to which the USB device 100 is attached. The third field indicates the token from which a response from the end hub 80 was generated. The fourth field indicates the data length of the response. The fifth field is the response with a PID (indicating data or ACK handshake packet or stall handshake packet), data and CRC (if appropriate). At this point the packet may be terminated, or new transactions can be added starting with the second field above. In general, response LAN packets 762 containing a NAK are not typically transmitted back to the remote computer or network device 40 via a network packet (unless during session setup this has been specified by addressing line 0).

Figure 9:
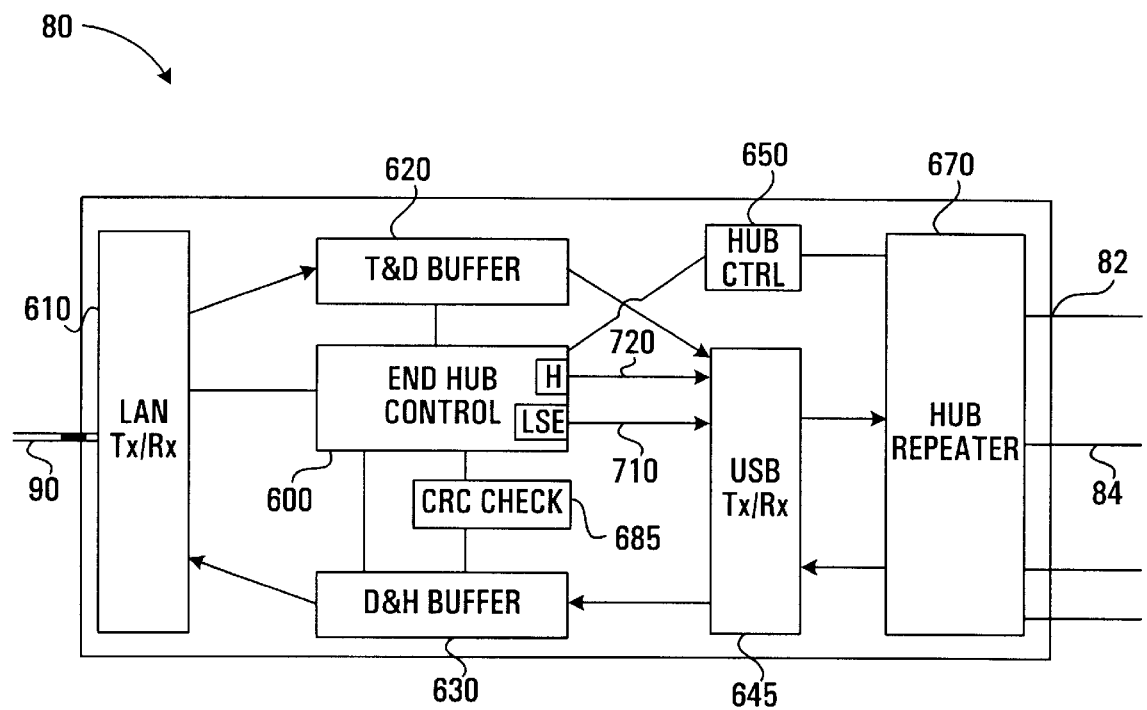
FIG. 9 is a block diagram of an end hub shown in FIGS. 7, 7A, 7B and 7D.

FIG. 9 is a block diagram of an end hub 80. Each end hub 80 comprises LAN hub communication means for communicating with the LAN hub 10, USB device communication means for communicating with the USB devices 100 and control logic means connected to the LAN hub communication means and to the USB device communication means. The LAN hub communication means is a LAN transceiver 610. The USB device communication means comprises a USB transceiver 645 and a hub repeater 670 connected to the USB transceiver 645. The hub repeater 670 has a plurality of USB ports 700. The control logic means comprise an end hub control unit 600 connected to the LAN transceiver 610, a token and data buffer 620 connected to the end hub control unit 600, to the USB transceiver 645 and to the LAN transceiver 610, a CRC check unit 685 connected to the end hub control unit 600, a data and handshake buffer 630 connected to the end hub control unit 600, to the CRC check unit 685, to the USB transceiver 645 and to the LAN transceiver 610, a hub control unit 650 connected to the end hub control unit 600 and to the hub repeater 670. In addition, a low speed enable line 710 is connected to the end hub control unit 600 and to the USB transceiver 645. A handshake line 720 is connected to the hub controller unit 600 and the USB transceiver 645.

Compared to the way the LAN hub 10 communicates with the network 20 using a conventional network protocol, the LAN hub 10 communicates with the outer hubs in a similar but simpler way since the connections to the outer hubs are dedicated links, not a more complex network. A single transaction at a time is transmitted from the LAN hub 10 over the LAN link associated-with the outer hub and then through to the USB device.

As mentioned earlier, the LAN protocol used for communications on each LAN link 90 (or LAN link 170) is a variant of the USB protocol. A preferred variant of the USB protocol is a layered protocol with a physical layer and a data link layer. According to preferred embodiment of the present invention, FIGS. 10A, B, C ,D ,E, G, H, I illustrate the preferred variant of the USB protocol. The physical layer implements line markers 722 at the start of each LAN packet 724. The physical layer may also implement optional stuff symbols 726. When there is no activity on the LAN link 90, the physical layer also implements an idle line 728. The LAN packets are sent within frames. The preferred variant of the USB protocol also provides for start of frame LAN packets. The LAN hub 10 sends the start of frame LAN packets every one millisecond (the "framing time"). The start of frame LAN packets provide framing markers at the beginning of each frame.

Referring to FIG. 10B, each start of frame LAN packet 730 consists of a start of frame packet identifier (PID) 732, a frame number 734 and a CRC 736 for error checking. The end hub 80 receives the start of frame LAN packets 730 computes the CRC for each start of frame LAN packet 730 and compares the computed CRC with the CRC 736 carried in each start of frame LAN packet 730. If the computed CRC and the CRC 736 do not match, a framing marker error has occurred and the end hub 80 sends a retry LAN packet 740 to the LAN hub 10. Upon error free reception of the retry LAN packet 740, the LAN hub 10 will not retry the start of frame LAN packet but will issue a new one at the next framing time. Redundant fields and special physical layers signalling may be used to help prevent framing marker errors depending on the physical attributes of the LAN link 90 (or LAN link 170). If the start of frame packet was received correctly by the end hub 80, the end hub 80 immediately issues it via each USB port as a standard start of frame packet according to the USB protocol.

Referring to FIG. 10C, the LAN hub 10 sends a reset outer hub LAN packet 742 to the end hub 80 when the end hub 80 is first connected to the LAN hub 10 via the LAN link 90. The LAN hub 10 may also send the reset outer hub LAN packet 742 if the LAN hub 10 fails to respond correctly to commands sent by the LAN hub 10. After the end hub 80 has reset itself, the end hub 80 sends the reset outer hub LAN packet 742 to the LAN hub 10 to confirm the reset. If the reset outer hub LAN packet 742 is not received error free at the end hub 80, the end hub 80 sends the retry LAN packet 740 to the LAN hub 10. If the LAN hub 10 receives the LAN retry packet 740 or does not receive the reset outer hub LAN packet 742 within a LAN time limit specified by the preferred LAN protocol, the LAN hub 10 will send another reset outer hub LAN packet 742 to the end hub 80.

The LAN time limit depends on the length of the LAN links 90, 120, 170 and 250 used, the speed of the LAN links 90, 120, 170 and 250, the length of the response (e.g. number of bits), and the amount of processing time required for the LAN hub 10 and the outer hub device to process LAN packets. In the preferred embodiment, the LAN links 90, 120, 170 and 250 operate at 12 Mbits/sec and, as a result, the LAN time limit (or LAN time out) is typcially 1 ms.

Figure 10D:
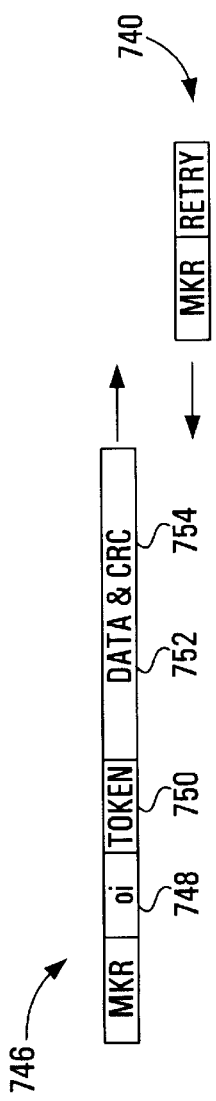
FIG. 10D is a diagram showing an Out Isochronous transaction according to the preferred variant of the USB protocol used for communications between the LAN hub and the end hub.

Referring to FIG. 10D, an Out isochronous LAN transaction (i.e. to send data from the LAN hub 10 to the end hub 80 using isochronous communications) is commenced when the LAN hub 10 sends an Out LAN packet 746 to the end hub 80. Each Out LAN packet 746 consists of a field 748 indicating the type of transaction (i.e. out isochronous transaction in this case), an Out token 750, data 752 and a CRC 754. The Out token 750 is the same as the Out token used in the USB protocol. The Out token 750 contains the USB device address and the end point number of the USB device to which the isochronous LAN transaction is directed. The end hub 80 computes the CRC for each Out LAN packet 746 received and compares the computed CRC with the CRC 754 contained in each Out LAN packet 746. If the computed CRC does not match the CRC 754, a link error has occurred and the end hub 80 sends the retry LAN packet 740 to the LAN hub 10. If there is time to retry the Out isochronous LAN transaction within the same frame, the LAN hub 10 will typically re-send the Out LAN packet 746 to the end hub 80. If the Out LAN packet is received correctly by the end hub 80, the end hub 80 creates, from the Out LAN packet, an Out token packet and a data packet according to the USB protocol and sends the Out token packet and the data packet to the USB device 100 via the respective USB port. The end hub ensures that the data packet follows the Out token packet within the USB time limit. (Note: While it is not permissible for USB Out isochronous transactions to be retried according to the USB protocol, there is no such theoretical restriction on retrying Out LAN packets on the LAN links 90).

Figure 10E:
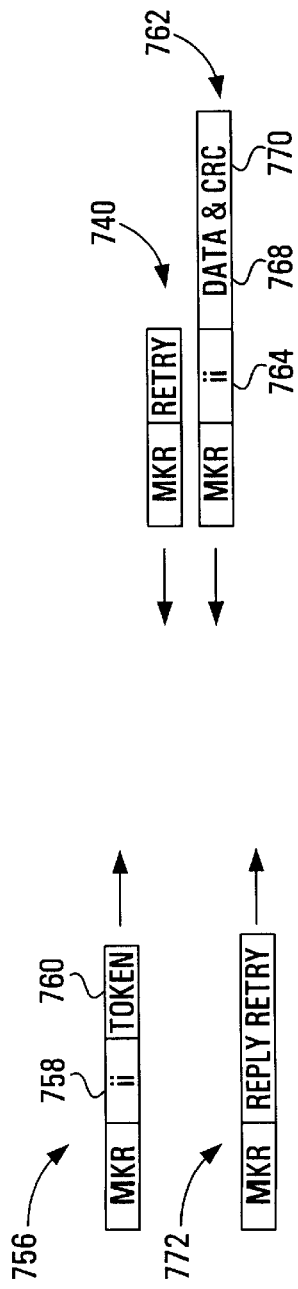
FIG. 10E is a diagram showing an In isochronous transaction according to the preferred variant of the USB protocol used for communications between the LAN hub and the end hub.

Referring to FIG. 10E, an In isochronous LAN transaction (to receive data using isochronous communication at the LAN hub 10 from the end hub 80) is commenced when the LAN hub 10 sends an In LAN packet 756 to the end hub 80. Each In LAN packet 756 consists of a field 758 indicating the type of transaction (i.e. in isochronous in this case), and an In token 760. The In token 760 is the same as the In token used in the USB protocol. The In token 760 contains the USB device address and the end point number of the USB device 100 to which the In isochronous transaction is directed.

The end hub 80 extracts the In token from the In LAN packet 750 and creates an In token packet containing the In token according to the USB protocol. The end hub 80 sends the In token packet to the USB device 100 via the respective USB port 82. The USB device 100 sends a data packet to the end hub 80. Upon error free reception of the data packet, the end hub 80 creates a response LAN packet 762 containing the data and sends the response LAN packet 762 to the LAN hub 10. The response LAN packet 762 consists of a field 764 indicating the type of transaction (in isochronous in this case), data 768 and a CRC 770. If the end hub 80 does not receive the In LAN packet 756 error free, the end hub 80 sends the retry LAN packet 740 to the LAN hub 10. If there is time to retry the In LAN packet within the same one millisecond frame, the LAN hub 10 will re-send the In LAN packet 756. (Since In packets contain no data, they are very short and thus retries are easily accommodated within the 1 ms schedule). The LAN hub 10 computes the CRC for the received response LAN packet and compares the computed CRC with the CRC 770. If the computed CRC does not match the CRC 770, a link error has occurred and the LAN hub 10 will send a reply retry LAN packet 772 to the end hub 80, only if there is time to resend the response LAN packet 762 within the same one millisecond frame. (The response packet contains data which makes for longer packets which are more difficult to fit into the 1 ms schedule.) Referring to FIG. 10H, an Out bulk/control LAN transaction (i.e. to send data from the LAN hub 10 to the end hub 80 using asynchronous communications) is commenced when the LAN hub 10 sends an Out LAN packet 746. As mentioned earlier, each Out LAN packet 746 typically comprises the field 748 indicating the type of transaction (i.e. out bulk or control transaction in this case), an Out token 750, data 752 (including the data PID and the CRC) and a LAN packet CRC 754. The Out token 750 is the same as the Out token used in the USB protocol. The Out token 750 contains the USB device address and the end point number of the USB device to which the Out bulk/control LAN transaction is directed. The end hub 80 computes the CRC for each Out LAN packet 746 received and compares the computed CRC with the LAN packet CRC 754. If the computed CRC does not match the LAN packet CRC 754, the end hub 80 sends the retry LAN packet 740 to the LAN hub 10. If the computed CRC and the LAN packet CRC 754 match, the end hub 80 creates an Out token packet and a data packet from the Out token 750 and the data 752 respectively according to the USB protocol, sends the Out token packet and data packet to the USB device 100 via the USB port 82 and waits for a handshake packet. The end hub 80 ensures that the data packet follows the Out token packet within the USB time limit. Upon error free reception of the handshake packet, the end hub 80 creates a handshake LAN packet 780 and sends the handshake LAN packet 780 to the LAN hub 10. The handshake LAN packet 780 consists of a field 782 containing the type of transaction received (i.e. bulk/control transaction in this case) and a field 785 containing either an acknowledgement, (or ACK), a NAK, a Stall or a nil. If the USB device 100 sent an acknowledgment (ACK) handshake packet, the handshake LAN packet contains an ACK. If the USB device 100 sent a NAK handshake packet, the handshake LAN packet contains a NAK. If the USB device 100 indicates a problem regarding the end point of the USB device 100 (with a Stall handshake) to which the bulk/control LAN transaction was directed, the end hub 80 sends the handshake LAN packet 780 containing the Stall. If the LAN device 100 does not reply within the USB time limit, the end hub 80 sends a handshake LAN packet 780 containing a nil. If the LAN hub 10 receives the retry LAN packet 740 or the handshake LAN packet 780 containing a nil, the LAN hub 10 re-sends the Out LAN packet 774 to the end hub 80 up to three times at a future time until it receives the handshake LAN packet 780 containing an ACK. If the LAN hub 10 receives the handshake LAN packet 780 containing a NAK, the LAN hub 10 re-sends the Out LAN packet 774 to the end hub 80 at a future time unit1 it receives the handshake LAN packet 780 containing an ACK. (NAK's can be retried indefinitely).

Figure 10F:
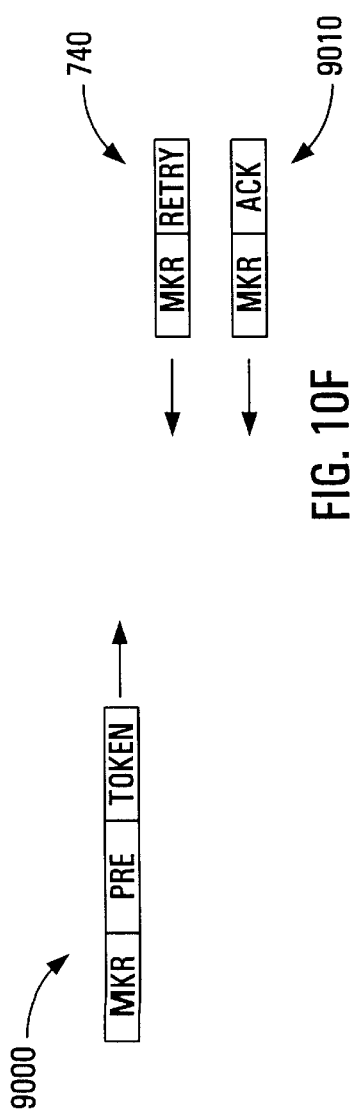
FIG. 10F is a diagram showing a special low speed preamble LAN packet and related packets according to the preferred variant of the USB protocol used for communications between the LAN hub and the end hub.
Figure 10G:
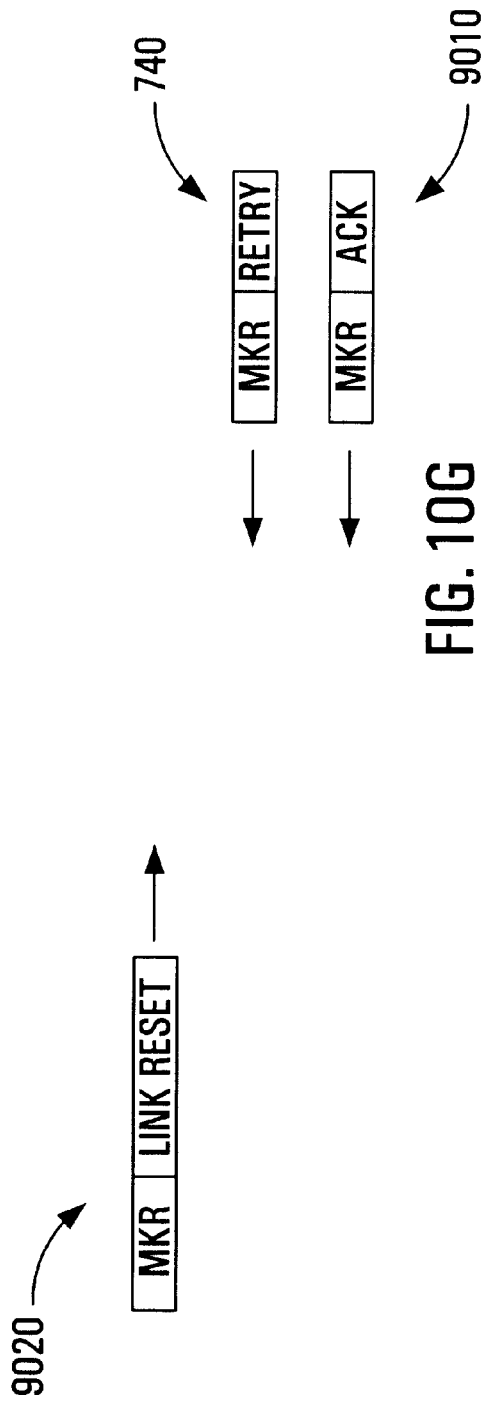
FIG. 10G is a diagram showing the packets used in a link reset according to the preferred variant of the USB protocol used for communications between the LAN hub and the end hub.
Figure 10H:
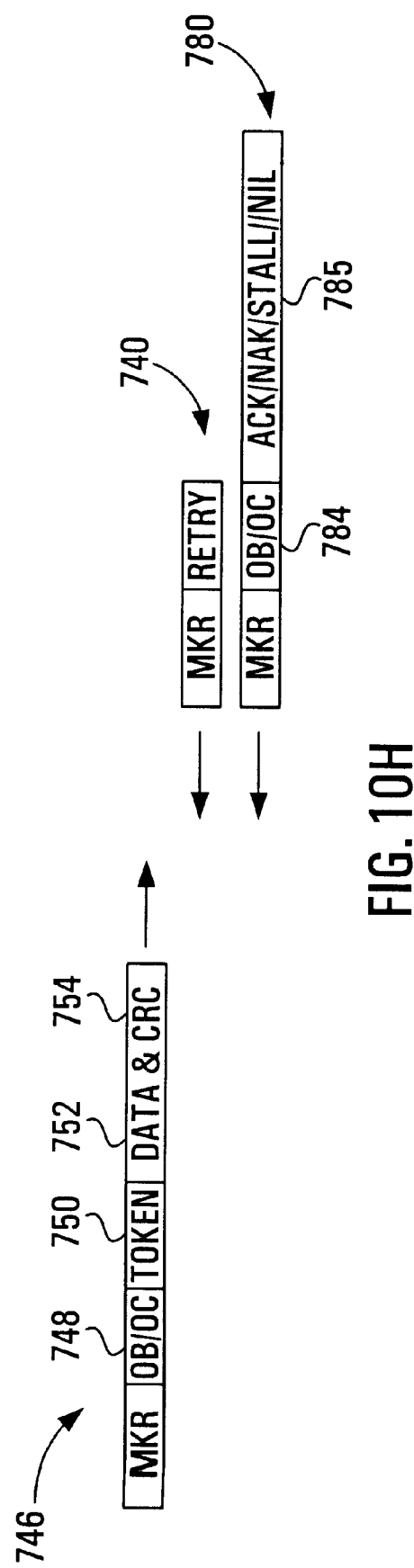
FIG. 10H is a diagram showing the packets used in an Out bulk/control LAN transaction according to the preferred variant of the USB protocol used for communications between the LAN hub and the end hub.
Figure 10I:
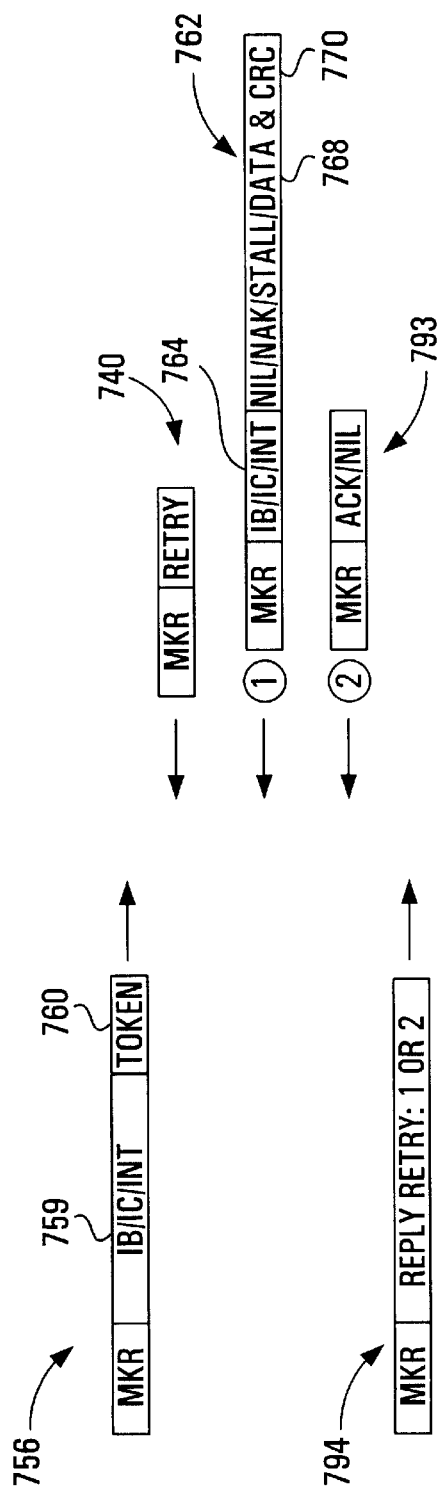
FIG. 10I is a diagram showing the packets used in an In bulk/control/interrupt LAN transaction according to the preferred variant of the USB protocol used for communications between the LAN hub and the end hub.

Referring to FIG. 10I, an In bulk/control/interrupt LAN transaction (i.e. to obtain data from an end point of a USB device using asynchronous communications) is commenced when the LAN hub 10 sends an In LAN packet 756 to the end hub 80. The In LAN packet 756 contains the field 758 indicating the type of transaction (i.e. in bulk/control/interrupt in this case) and an In token 760. The In token 760 is the same as the In token used in the USB protocol. If the end hub 80 does not receive the In LAN packet 756 error free, the end hub 80 sends the retry LAN packet 740 to the LAN hub 10. Upon receipt of the retry LAN packet 740, the LAN hub 10 re-sends the In LAN packet 756 at a future time. Upon error free reception of the In LAN packet 756, the end hub 80 sends the In token 760 to the USB device 100 via the respective USB port 82 to request data from the end point number of the USB device address using the USB protocol.

If the USB device returns data to the end hub 80 using the USB protocol, the end hub 80 sends an ACK handshake packet to the USB device according to the USB protocol, sends a response LAN packet 762 to the LAN hub 10 containing the data and a CRC and sends an ACK handshake LAN packet 793 containing an ACK to the LAN hub 10. (The end hub 80 ensures that the ACK handshake packet is sent to the USB device 100 within the USB time limit after receiving the data packet). If the USB device returns a NAK handshake packet to the end hub 80 using the USB protocol, the end hub 80 sends a response LAN packet 762 to the LAN hub 10 containing a NAK. If the USB device is in a condition that prevents normal operation of the USB device (i.e. the USB device sends a Stall handshake packet), the end hub 80 sends a response LAN packet 762 to the LAN hub 10 containing the Stall.

If no response is received from the USB device 100 within the USB time limit, a response LAN packet 762 indicating a nil response is sent to the LAN hub 10. The In LAN transaction will be retried at a future time.

If the LAN hub 10 only received one LAN packet that was corrupted (i.e. either the response LAN packet 762 or the acknowledgment handshake LAN packet 793 with an error or errors) but not two consecutive LAN packets, the LAN hub 10 assumes that the end hub 80 sent a retry LAN packet 740 that was corrupted and retries the whole In LAN transaction at a future time. If both the response LAN packet 762 and the acknowledgement handshake LAN packet 793 are received at the LAN hub 10 but one or both of the packets are in error, the reply retry LAN packet 794 is sent to the end hub 80 to instruct the end hub 80 to resend either or both packets for up to three attempts, scheduling permitting, otherwise the whole In LAN transaction is retried at a future time.

Referring to FIG. 10F, if the Out control LAN transaction or the In control/interrupt LAN transaction is addressed to a low speed USB device, a low speed preamble LAN packet 9000 precedes the respective In LAN packet 756, or Out LAN packet 756. (According to the USB protocol, low speed USB devices do not support isochronous communications or bulk transactions). Upon error free receipt of the low speed preamble LAN token 9000, the end hub 80 sends an acknowledgement LAN packet 9010. If the end hub 80 did not receive the low speed preamble LAN token 9000 error free, the end hub 80 sends the retry LAN packet 740 to the LAN hub 10. Upon receipt of the retry LAN packet 740, the LAN hub 10 resends the low speed preamble LAN packet 9000 to the end hub 80. Low speed transmissions only follow if an acknowledgement handshake LAN packet 9010 was successfully received by the LAN hub 10.

Referring to FIG. 10G, the LAN hub 10 will send a link reset packet 9020 to the end hub 80 if the LAN link 90 is corrupted. A corrupted response from the end hub 80 from a low speed preamble packet 9000 will cause the LAN hub 10 to also send a link reset LAN packet 9020. Upon successful reception by the end hub 80 of the link reset packet 9020, the end hub 80 will send a acknowledgement handshake LAN, packet 9010 to the LAN hub 10. If the end hub 80 does not receive the link reset packet 9020 error free, the end hub 80 will send the retry LAN packet 740 to the LAN hub 10. It should also be noted that the LAN hub 10 will send link reset LAN packets 9020 until the LAN hub 10 receives an acknowledgement handshake LAN packet 9010.

Referring in particular to FIGS. 8 and 9, any data from the LAN hub 10 to the end hub 80 is transferred pursuant to an Out LAN transaction. An Out LAN transaction is either an isochronous Out LAN transaction or a Bulk/Control Out LAN transaction. An Out LAN transaction is performed as follows. An Out LAN packet 746 (which encapsulates the USB device address and the end point of the USB device) is transmitted byte by byte from the LAN hub 10 over the USB link 90 to the end hub 80. The LAN hub 10 does not delete the Out LAN packet 746 from the RAM 360 until later. (Described in more detail below). If the USB device for which the data in the Out LAN packet 746 is destined is a low speed USB device, then a special low speed preamble LAN packet 9000 precedes the Out LAN packet. Optionally, additional error detection/correction may be part of an Out LAN packet. The Out LAN packet 746 is fed into the token and data buffer 620 of the end hub 80 from the LAN transceiver 610. The type of transaction and the transmission speed (i.e. low speed or full speed) is stored in the end hub control unit 600. When the token and data buffer 620 contains the complete Out LAN packet 746, the end hub control unit 600 creates the Out token packet and the data packet according to the USB protocol. The Out token packet and the data packet are moved by the end hub control unit 600 to the USB transceiver 645 which implements the electrical layer of the USB protocol including signalling start of packet, end of packet, bit stuffing, idle line, etc. If the transmission mode is low speed, then the end hub control unit 600 sends a signal to the USB transceiver 645 via low speed enable line 700. It is an important note that the data packet sent on the USB bus must follow the Out token packet within a time-out interval as specified by the USB protocol for a valid out transaction. The USB transceiver 645 block feeds the Out token packet and the data packet to the hub repeater 670. The end hub control unit 600 indicates to the hub control unit 650 the transmission speed. The hub control unit 650 communicates with the hub repeater 670 and activates, during full speed transmissions mode, all the USB ports 700 to which USB high speed devices are connected and activates, during low speed, transmissions mode, all the USB ports 700 to which low speed USB devices 100 are connected.

If the transaction is not an isochronous transaction, the handshake packet will be returned from the USB device through the respective USB port 700 to the hub repeater 670. The handshake packet is carried from the hub repeater 670 to the USB transceiver 645. The USB transceiver 645 receives the handshake packet and carries the handshake packet to the data and handshake buffer 630. The control unit creates the handshake LAN packet 780 from the handshake packet and stores the handshake LAN packet 780 in the data and handshake buffer 630. The end hub control unit 600 moves the handshake LAN packet 780 from the data and handshake buffer 630 to the LAN transceiver 610 for transmission back to the LAN hub 10.

For asynchronous out transactions, if the LAN hub 10 receives a corrupted response or a LAN handshake packet 780 containing a NAK or a nil, the LAN hub 10 will retry the Out LAN packet at a future point in time unless specific limits on retry (typically three for a nil or a corrupt response) has been exceeded. (There are typically no limits on retry for NAK's).

A successful handshake LAN packet 780 containing an ACK received by the LAN hub 10 will clear the Out LAN packet 746 from the RAM 360. A LAN handshake packet 780 containing a stall received the LAN hub 10 will be relayed to the network device 40. The client software in the network device 40 is typically notified of the Stall. Upon completion of the Out LAN transaction, the USB line 90 is idle and the LAN hub 10 may issue the next transaction to the end hub 80.

Referring in particular to FIG. 9, an In LAN transaction (i.e. either on In isochronous LAN transaction or an In Bulk/Control/Interrupt LAN transaction) is performed as follows: An In LAN packet 756 (which encapsulates the USB device address and the end point of the USB device and which indicates the type of transaction) is transmitted byte by byte from the LAN hub 10 over the line 90 to the end hub 80 associated with the USB device 100. The LAN hub 10 does not delete the In LAN packet 756 from the RAM 360 until later. (described in more detail below). If the USB device 100 from which data is requested it is a low speed USB device, then the special low speed preamble LAN packet 9000 precedes the In LAN packet 756. Optionally, additional error detection/correction fields may be part of the In LAN packet 756. The In LAN packet 756 is fed into the token and data buffer 620 of the end hub 80. The type of transaction and the transmission speed (i.e. low speed or full speed) is stored in the end hub control unit 600. When the token and data buffer 620 contains the complete In LAN packet 756, the end hub control unit 600 creates the In token packet according to the USB protocol.

The end hub control unit 700 moves the In token packet to the USB transceiver 645 which implements the electrical layer of the USB protocol including signalling the start of packet, end of packet, bit stuffing, idle line, etc. If the transmission speed is low speed, then the end hub control unit 600 sends a low speed signal to the USB transceiver 645 via low speed enable line 700. Upon receipt of the low speed enable signal, the USB transceiver 645 ensures that the special low speed preamble packet is sent before the In token packet. The USB transceiver 645 block feeds the In token packet to the hub repeater 670. The end hub control unit 600 indicates to the hub control unit 650 the transmission speed. The hub control unit 650 communicates with the hub repeater 670 and activates, during the full speed transmissions, all the USB ports 700 to which USB full speed USB devices are connected and activates during the low speed transmissions, all the USB ports 700 to which low speed USB devises 100 are connected. Upon receipt of the In token packet, the USB device 100 sends a data packet, a NAK handshake packet or a stall handshake packet to the hub repeater 670 through the respective USB port 700. If a data packet was sent, the data packet is carried from the hub repeater 670 to the USB transceiver 645. The USB transceiver 645 receives the data packet and carries the data packet to the data and handshake buffer 630.

If the In transaction is an In isochronous transaction, the end hub control unit 600 creates the response LAN packet 762 containing the data in the data packet and moves the response LAN packet to the LAN transceiver 610 for transmission to the LAN hub 10. The transceiver 320 of the LAN interface device 315 associated with the end hub 80 receives the response LAN packet 672. The control unit 450 of the LAN interface device 315 moves the response LAN packet 762 from the transceiver 320 to the receive buffer 470. The microprocessor moves a copy of the response LAN packet 762 to the RAM 360 via the bus 300. The microprocessor computes the CRC for the response LAN packet and compares the computed CRC with the CRC 770 carried in the response LAN packet. If the computed CRC and the CRC 770 do not match, the microprocessor will create and send the reply retry LAN packet 772 to the USB device only if there is enough spare time to re-send the response LAN packet 762 within the same 1 ms time frame. The end hub 10 only clears its data and handshake buffer 630 if it does not receive a reply retry LAN packet 772 (or a corrupted/unreadable packet) as the next LAN packet from the LAN hub 10.

If the In transaction was not an In isochronous transaction, the data packet is carried to the CRC check unit 685. The CRC check unit 685 computes a check sum corresponding to the data in the data packet and compares the check sum carried with the data packet. If the check sums agree, an ACK handshake packet is generated by the end hub control unit 600 and sent to the USB transceiver 645 via the handshake line 710. If the transmission speed is low speed, the end hub control unit 600 continues to hold the low speed enable signal to the USB transceiver 645 until the ACK USB handshake packet is completed. The ACK handshake packet is carried from the USB transceiver 645 to the hub repeater 670. The ACK handshake packet 793 is carried from the hub repeater 670 through the USB port 700 to the USB device 100.

The end hub control unit 600 creates the response LAN packet 762 containing the data from the data packet, and creates the handshake LAN packet 793 containing an ACK and places these two LAN packets in the data and handshake buffer 630 one after the other. The end hub control unit 600 moves the response LAN packet 762 and the handshake LAN packet 793 to the LAN transceiver 610 for transmission back to the LAN hub 10.

The response LAN packet 762 and the handshake LAN packet 793 are received by the transceiver 320 of the LAN interface device 315 that is associated with the LAN hub 80. The control unit 450 moves the response LAN packet 762 and the handshake LAN packet 793 from the transceiver 320 to the packet receive buffer 470. The microprocessor 310 moves the response LAN packet 762 and the handshake LAN packet 793 from the receive buffer 470 to the RAM 360 via the bus 300. The microprocessor 310 computes a check sum from the LAN data packet. The microprocessor 310 also compares the computed check sum with the check sum carried in the response LAN packet 762. If the check sums do not agree, the microprocessor 310 generates a reply retry LAN packet 794 which is transmitted from the LAN interface device 315 to the end hub 80 via line 90. The reply retry LAN packet 794 instructs the control unit 600 of the end hub 80 to repeat the transmission of the response LAN packet 762 and perhaps the handshake LAN packet 793 to the LAN hub 10. The retry reply LAN packet may also instruct the end hub control unit 600 to repeat the transmission of the handshake LAN packet 793 if the handshake LAN packet 793 was not received properly at the LAN hub 10. The response LAN packet 762 and/or the handshake LAN packet 793 are retried until a specified number of retries is exceeded (e.g. 3) after which the LAN hub 10 will send a corrupted line condition to the network device 40.

If no data packet was ever received from the USB device 100 within the USB time limit after sending the In token packet or if the computed check sum does not match the check sum carried in the data packet, then the end hub control unit 600 of the end hub 80 generates a nil handshake LAN packet 793 which is carried to the LAN transceiver 610 via data and handshake buffer 630. The LAN transceiver 610 sends the nil handshake LAN packet 793 to the LAN hub 10.

The generation of the ACK handshake packet is required at the end hub 80 since the USB protocol has strict limits between the end of a data packet and the start of a ACK handshake packet (or NAK handshake packet). The typical length of the LAN link 90 prevents an ACK handshake packet (or a NAK handshake packet) generated by the LAN hub 10 from being received in time at the USB device 100 (through the end hub 80).

If a NAK handshake packet or a stall handshake packet is sent from the USB device 100, the NAK handshake packet or the stall handshake packet is carried to the hub repeater 670 through the USB port 700. The NAK handshake packet or the stall handshake packet is carried from the hub repeater 670 to the USB transceiver 645. The USB transceiver 645 receives the NAK handshake packet or the Stall handshake packet and carries the NAK handshake packet or the Stall handshake packet to the data and handshake buffer 630. The end hub control unit 600 creates the response LAN packet 762 containing a NAK or stall and places the response LAN packet 762 in the data and handshake buffer 630. The end hub control unit 600 moves the response LAN packet 762 to the LAN transceiver 610 for transmission back to the LAN hub 10 via line 90. If the response LAN packet 762 containing the NAK is received correctly at the LAN hub 10, the In transaction will be retried until a specified number of retries has been exceeded (e.g. 3). If the response LAN packet 762 containing the stall is received correctly at the LAN hub 10, the remote computer or network device 40 will be informed of a stall condition. If no response is received at the LAN hub 10 or a response is not received correctly at the LAN hub 10, the LAN hub 10 will send a reply retry LAN packet 794 to the end hub 80 to repeat the response LAN packet 762 until a specified number of retries has been exceeded (e.g. 3). If the retry limit has been exceeded, the LAN hub 10 will send a corrupted line condition to the network device 40.

The end hub 80 also performs some traditional USB hub functions, such as detecting the connection and disconnection of USB devices 100 to its USB ports 700. As with a conventional use of the USB protocol, the end hub 80 is periodically polled by the LAN hub 10 to report any change of the status of the USB ports 700. For example, if a USB port 82 detects a connection of a USB device 100, the end hub 80 will report this to the LAN hub 10 whereupon the LAN hub 10 will reset the USB device 100, assign a device address to the USB device 100 and interact with its control end point 0 to configure the USB device 100 for use (making a log of its speed, its device type, buffer sizes, directions of transfer and types of transfer, etc). In general, these traditional USB hub functions are addressed at a fixed, preset USB address (e.g. address 127) which the LAN hub 10 will not assign to any other USB device 100.

It should be noted that the hub controller 650 and hub repeater 670 shown in FIG. 9 are the standard sub-elements of a USB hub device as specified in the USB specification (USB hub device operation was described previously). It is the function of these elements to allow multiple USB devices 100 to connect to an end hub 80. Alternatively, an end hub 80 could omit the hub repeater 670 and the hub controller 650 and support a single USB device 100 on its own, but a standard USB hub device connected to it would allow for fan-out to support more USB devices.

With the hub controller 650 and hub repeater 670 embedded in the end hub 80 as shown in FIG. 9, these elements need to be controlled by the LAN hub 10. This control is achieved by having the hub controller 650 respond to a fixed, preset USB address (e.g. address 127) that will not be assigned (by the LAN hub 10) to any other USB device 100 off the end hub 80.

In this way, the USB hub functions can be controlled from the LAN hub 10 without having to add additional functionality to the LAN protocol, and the LAN hub OS software that controls the embedded hub controller 650 and hub repeater 670 can also be used to control any external USB hub devices attached to the end hub 80.

In general, the end hub 80 does not need to wait for an entire In LAN packet or Out LAN packet to arrive from the LAN hub 10 before starting to transmit a token packet or a token packet and a data packet on the USB link 84 if the LAN link 90 has a payload speed greater than or equal to the transmission speed of the USB link 84. If the payload speed of the LAN link 90 is greater than the transmission speed of the USB link 84, null stuff symbols can be inserted into the transmission from the LAN hub 10 to rate adapt for the USB transmission speed; otherwise the end hub 80 will require a buffer to store the excess packets before it can be timed for placement on the USB link 84. Payload speeds of the LAN link 90 less than the transmission speed of the USB link 84 are possible, but generally require that the whole packet/transactions be buffered into the end hub 80 before placed on the USB link 84. This approach leads to communication delays.

Similarly, if the first network link 30 has a payload speed greater than or equal to the payload speed of LAN link 90, then network packets can start to be passed to the end hub 80 via LAN link 90 without having the LAN hub 10 having to have received the whole network packet. This is not a particularly suitable policy for reception of non-isochronous transactions as the CRC checks of packets must be performed only at the end of the data packet and thus data integrity can not be guaranteed until the whole network packet has been received and can lead to the transmission of faulty data on the USB link 84. This policy is more suited to data originating from the end hub 80 to the LAN hub 10 and being ultimately transmitted to the network 20.

If the payload speed of the first network link 30.is slower than the transmission speed of LAN link 90, whole packets and transactions must be buffered from the first network link 30 before being transmitted on the LAN link 90, though data from the LAN link 90 can be moved directly to the first network link 30.

A response received by the LAN hub 10 from the end hub 80 (or a composite end hub 160) intended for a remote computer or a network device 40 on network 20 is transmitted or transferred to the remote computer or network device 40 from the LAN hub 10. The transfer of network packets from the LAN hub 10 to the remote computer or network device 40 proceeds as follows: The USB transfer protocol is encapsulated within the conventional network protocol using the sub-protocol by the microprocessor 310. The first field of the conventional network protocol indicates the USB transfer protocol version number. The second field indicates the line number to which the USB device 100 (or the USB device 180 in the case of a composite end hub 160) is attached. The third field indicates the token from which a response from the end hub 80 (or the composite end hub 160) was generated. The fourth field indicates the data length of the response. The fifth field is the response with a PID (indicating data or ACK handshake packet or stall handshake packet), data and CRC (if appropriate). At this point the packet may be terminated, or new transactions can be added starting with field 2 above. In general, response LAN packets 762 containing a NAK are not typically transmitted back to the remote computer or network device 40 via a network packet (unless during session setup this has been specified by addressing line 0).

In addition to the functions above, the LAN hub 10 performs a number of other duties. FIG. 21 shows a Device Endpoint Description & Service Interval Table utilized by the LAN hub 10. The LAN hub 10 maintains the Device Endpoint Description & Service Interval Table for every USB device 100, 180 indicating the LAN link number (or line) for the LAN link 90, 120, 170 or 250 associated with each USB device 100, 180, the assigned USB device address for each USB device 100, 180, the end point numbers for each USB device 100, 180, the buffer size for the end point, the type of transaction for the end point, the buffer location for the end point in RAM 360 (if assigned) and for end points handling isochronous/interrupt transactions, the timing schedule. In addition, maintained for every LAN link 90, 120, 170, and 250 is a bandwidth allocation table (see FIG. 19) which tallies the amount of committed bandwidth (or utilization) for each LAN link number (or line) to ensure that communications are not over-subscribed on each LAN link 90, 120, 170 and 250. Optionally, administration information may be tabulated for each USB link such as the nature or destination of the line (e.g. user A's office, mail room, Ethernet back bone connection). Furthermore, the LAN hub 10 also maintains a USB device and status table (see FIG. 20) which indicates the LAN link number 3110 (or line) and USB port number to which each USB device 100, 180 is connected, the assigned USB device address for each USB device 100, 180, the status of every USB device 100, 180 (or USB port) (e.g. default, configured, addressed, etc.) Optionally, this table may also include a description of the USB device 100, 180 (e.g. brand X 17 inch monitor number 3345). A master table of available buffer space (see FIG. 23) is also maintained to ensure buffers are not oversubscribed. The master table of available buffer space indicates the starting memory address (or buffer address) in RAM 360 of a contiguous available (or free) memory block and the amount of bytes (or size) of the contiguous available (or free) memory block. Also a table of inter-buffer flow assignments (see FIG. 22) is also maintained along with a calculation showing what capacity for buffer transfers is being used to prevent oversubscriptions. For example, the table of inter-buffer flow assignments shows that a contiguous block of memory starting at memory address 5A40ff0 in RAM 360 with a size of 256 bytes is moved to a new memory location in RAM 360 starting at memory address 634A00 every 1 ms consuming 0.2% of the available microprocessor time (in a 1 ms process).

These tables are used for session setup between remote computers or network devices 40, LAN computers 130 or LAN computers 190 and USB devices 100, 180. As stated previously remote computers or network devices 40, LAN computers 130 or LAN computers 190 can initiate sessions with USB devices by addressing line 0 (i.e. LAN hub 10). The session setup will initially start with a command by the remote computer or the network device 40 or LAN computer 130 or 190, to obtain a listing of available lines on the LAN hub 10 for the remote computer or network device 40 or LAN computer 130 or 190 to connect to and use the attached devices (e.g. choose to look at the available devices on the line going to a user's office).

The administration data of FIG. 19 and the device listing of FIG. 20 are typically forwarded to the remote computer or network device 40, LAN computer 130 or LAN computer 190 for user to select which USB devices 100, 180 on which LAN links to request connections with. These tables can be sent with an appropriate protocol such as File Transfer Protocol (FTP). FTP is a standard conventional protocol. Once the user/remote computer has selected a LAN link number and a particular USB device 100, 180 (by address number or USB port number), the remote computer or network device 40, LAN computer 130 or LAN computer 190 sends a session setup command to the end point 0 of the LAN hub 10. The session setup command indicates the LAN link number and USB device address to which the remote computer or network 40 or network device 40, LAN computer 130 or LAN computer 190 requests a connection. The LAN hub 10 first checks to see if the requested USB device 100 or 180 is free for a new connection. If so the request proceeds to the configuration stage. If the USB device 100, 180 is not free, a deny message is sent by the LAN hub 10 to the remote computer or network device 40 or network device 40, LAN computer 130 or LAN computer 190. The remote computer or network device 40, LAN computer 130 or LAN computer 190 may specify a default device configuration number, or it may wish to enquire of the device configurations available for the USB device 100, 180. (Default configuration numbers are stored in the USB device 100, 180. The LAN hub 10 may obtain these default configuration numbers from each USB device 100, 180 and store them in a table in the RAM 360).

The LAN hub 10 will pass USB device configuration requests to the end point 0 of the USB device 100, 180 and relay any response or responses to the remote computer or network device 40, LAN computer 130 or LAN computer 190. Before a device configuration is set, (through sending a set configuration control packet to the control end point 0 of the USB device 100, 180), the LAN hub 10 obtains from the USB device 100, 180 in the addressed state, a description of the end points of the USB device 100, 180 and their characteristics for the proposed configuration by interacting with the control endpoint 0 of the USB device 100, 180. A description of the end points of the USB device 100, 180 and their characteristics are used by the LAN hub 10 to gauge the resources needed to support this connection. The LAN hub 10 examines the buffer assignment table to see if buffer space is available for the connection. The LAN hub 10 also examines the bandwidth allocation and administration data table to see if the USB LAN link can support the requested connection, and the LAN hub 10 also checks the table of inter buffer flow assignments to see if the requested connection using the requested configuration can be supported.

If the LAN hub 10 determines that a new connection can be supported using the configuration, the LAN hub 10 signals the remote computer or network device 40, LAN computer 130 or LAN computer 190 of this fact. The LAN hub 10 also sets up the new buffer assignments and updates the appropriate tables with the new connection information. The LAN hub 10 also sends a configuration command to the USB device 100, 180 to place the USB device 100, 180 in the configured state.

Once a connection to a USB device is to be terminated, a stop session command is issued from the remote computer or network device 40, LAN computer 130 or LAN computer 190 to line 0 of the LAN hub 10 to close the connection and update the appropriate tables. Once a connection closed, the LAN hub 10 sends a reset or de-configuration command to the USB device (end point 0) to place it in the default or addressed state respectively for the next connection. Line 0 of the LAN hub 10 can also be addressed from a remote computer or network device 40, LAN computer 130 or LAN computer 190 for network administration purposes. For example a network administrator may enquire the status of the LAN hub 10 (requesting a copy of any or all tables). The network administrator may also perform a reset of the LAN hub 10 or any outer hub device if faulty operation is detected.

Referring to FIG. 24, a session table is used to track sessions between LAN computers 130, 190, 215, and 260, network devices 40 (such as servers, telephone switches, etc.) and USB devices 100, 180. The session table shows the session status (initiating, closing or active), the type of network device (e.g. LAN computer such as PC, telephone switch such as a PBX, a server, etc.), the LAN link number (or line), the IP or other address of the network device, a host buffer address, buffer size, and the LAN link number (or line) and USB device address to which the USB device 100, 180 is attached).

The LAN links 90, 120, 170 and 250 between the LAN hub 10 and the outer hubs can be satisfied by a number of embodiments. Each LAN link is typically described by a physical link, a transmission speed, a transmission format including any error detection/correction coding schemes. The physical link may be comprised of point to point or point to multi-point twisted pair metallic conductors, coaxial cables, fibre-optic cables, radio frequency wireless channels, over the air infra-red channels, etc. Where metallic media are used, power to operate the outer hubs and low power USB devices may also be carried on the cables on the same or separate wires as the signals. The transmissions on each LAN link 90, 120, 170 and 250 may be simplex or full duplex. Different transmission speeds can be accommodated with buffering. (Preferably, the speed on each LAN link 90, 120, 170 and 250 is 12 Mbits/sec). The transmission formats may be base band or frequency modulated. The desired characteristics of the LAN links 90, 120, 170 and 250 between the LAN hub 10 and the outer hub devices are an inherently reliable end to end transmission link with a very low bit error rate. Such a LAN link is required for isochronous transactions which do not typically correct for errors. High quality communication links will provide the best results for applications requiring isochronous transactions. If the physical link suffers from significant impairments due to the environment, forward error correction (FEC) on the LAN link may be utilized. In addition, physical layer line codes such as 4B/5B or 8B/10B as used for ATM 25 or fast Ethernet can provide good error robustness (as ATM also assumes an inherently reliable transmission medium and does not correct for errors at the protocol level). These error correction coding schemes also permit the insertion of special non-data symbols for timing controls, null symbols for rate matching, symbols to delimit packets from additional error detection data, symbols for flow control, retries, etc.

The above described embodiment of the invention is intended for the simplest, lowest first cost applications. Other embodiments can maximize performance. Performance issues arise out of the LAN hub 10 waiting for the indication of a complete USB transaction before initiating the next USB transaction. As a USB transaction completes at the respective outer hub device, notification is not received at the LAN hub 10 until a transmission delay over the respective LAN link 90, 120, 170 or 250 has been overcome. Furthermore, the next USB transaction does not appear on the respective USB link 90, 120, 170 or 250 until the transmission delay from the LAN hub 10 to the end hub 80 is overcome. For significant lengths of LAN links 90, 120, 170 and 250 the time gap between subsequent transactions can lead to lower that optimal utilization of the high speed transmission mode (12 Mbs) of the Universal Serial Bus protocol used on the USB links. Alternative embodiments can reduce these inter transaction times for optimal line utilization. (It should be noted that the Universal Serial Bus protocol does not specify any maximum time between adjacent transactions). In an extreme embodiment, all the functionality of the USB protocol previously allocated to the LAN hub 10 can be moved to the outer hub devices. Each such outer hub devices would also have a network interface device. In this way, the LAN links 90, 120, 170 and 250 are eliminated (and the transmission delays are also eliminated) resulting in little or no time between USB transactions (providing the network can deliver transactions fast enough). In a less extreme embodiment, a LAN hub 10 could utilize full duplex transmission on each LAN link 90, 120, 170 and 250 and initiate a new LAN transaction slightly before the previous LAN transaction has been received on the respective LAN link as completed with the outer hub device being capable of buffering some data for immediate placement on the respective USB link once the previous USB transaction has been completed. In the case of errors on the LAN link 90, 120, 170, or 250, retries can be performed on the LAN link 90, 120, 170 or 250 up to the LAN hub 10 while transactions occur down stream to the outer hub device (as buffer data can be placed on the respective USB link 84, 152, 184 or 270 and the respective LAN link is full duplex).

Figure 11A:
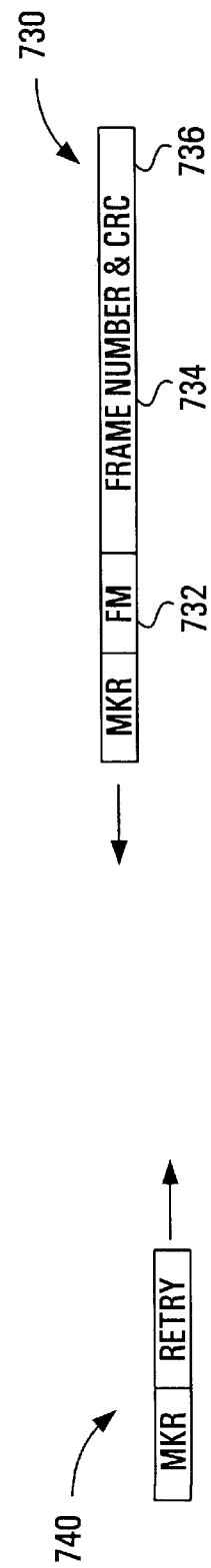
FIG. 11A is a diagram showing the start of frame LAN packet and related packet according to the preferred variant of the USB protocol used for communications between the LAN hub and the attachment unit.
Figure 11B:
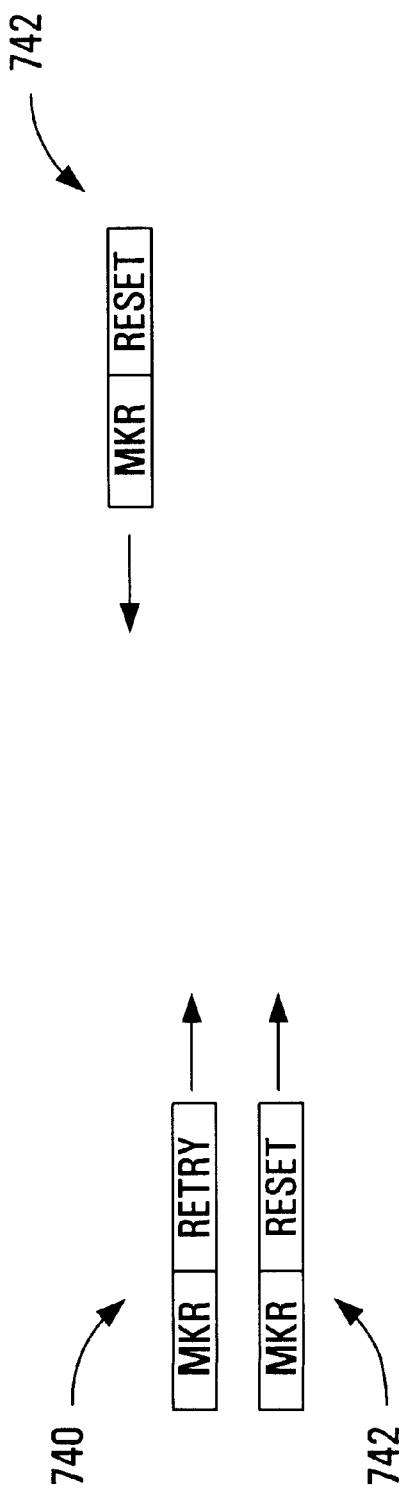
FIG. 11B is a diagram showing the LAN packets involved in resetting the LAN link according to the preferred variant of the USB protocol used for communications between the LAN hub and the attachment unit.
Figure 11C:
FIG. 11C is a diagram showing the LAN stall packet according to the preferred variant of the USB protocol used for communications between the LAN hub and the attachment unit.
Figure 11D:
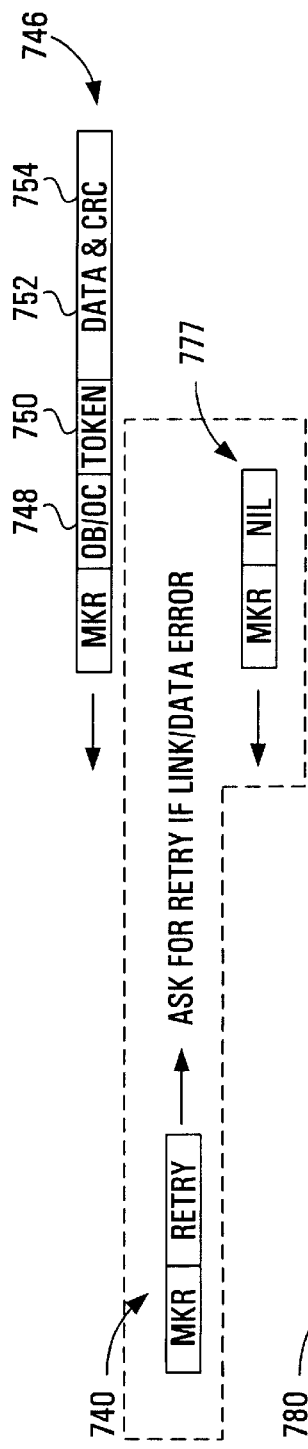
FIG. 11D is an diagram showing Out bulk/control LAN transactions from an attachment unit according to the preferred variant of the USB protocol used for communications between the LAN hub and the attachment unit.
Figure 11E:
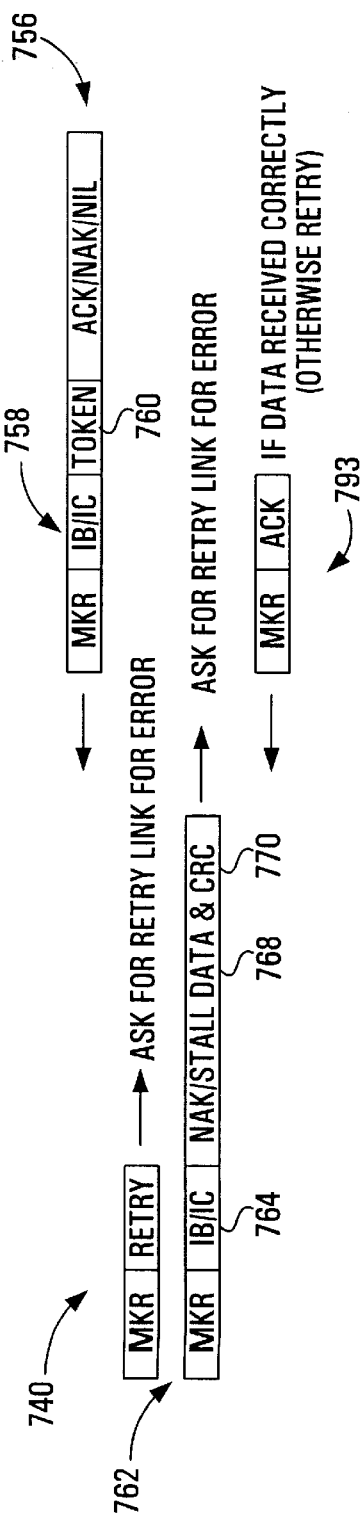
FIG. 11E is a diagram showing In bulk/control LAN transactions initiated by an attachment unit according to the preferred variant of the USB protocol used for communications between the LAN hub and the attachment unit.
Figure 11F:
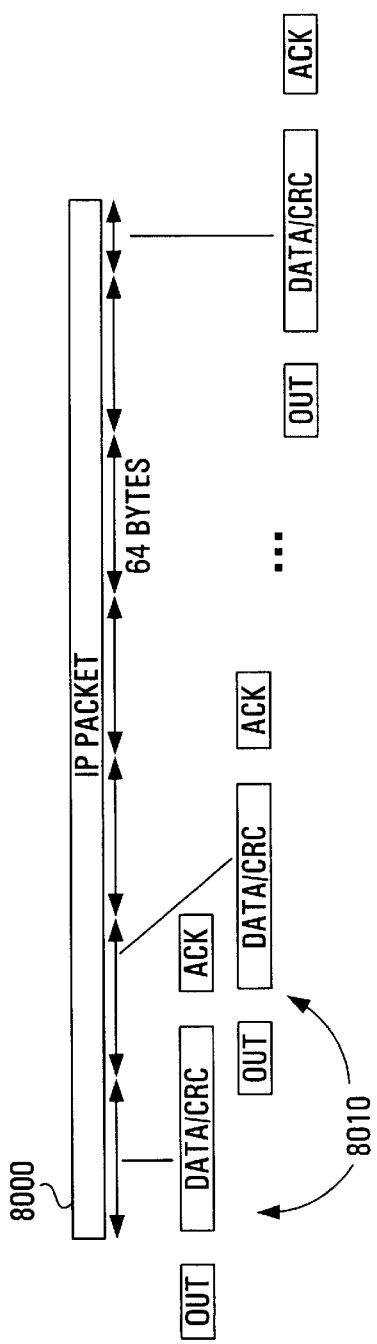
FIG. 11F is a diagram showing a LAN computer (or network device) sending an IP packet.
Figure 12:
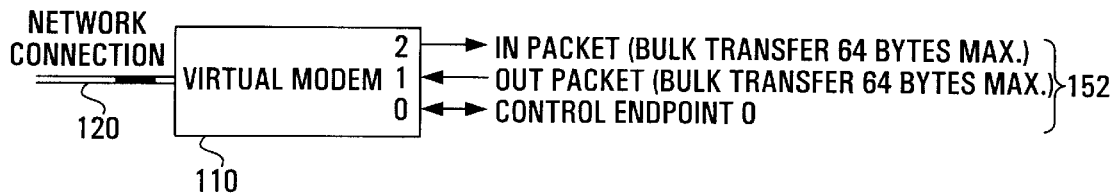
FIG. 12 is a block diagram of a virtual modem.

Another aspect of this invention relates attaching host computers 130 to the LAN hub 10, not over established networks 20, but through the mediation of attachment units 110 as shown in FIG. 7. In this arrangement, the LAN hub 10 appears as a USB device connected to a USB port 150 of the host computer 130. The attachment device 110 is defined to appear to the host computer 140 as a special kind of modem (i.e. virtual modem) or network interface unit and normally operates at the full speed (12 Mbs). FIG. 12 shows how the attachment unit 110 appears to the connected host computer 130. The attachment unit 110 typically has 3 end points, end point 0, end point 1 and end point 2. As usual, end point 0 (sometimes called control end point 0) is used to configured the attachment unit 110. End point 1 is typically defined as the end point which receives data from the host computer 130. End point 2 is typically defined as the end point which sends data from the attachment unit 110 to the host computer 130. End points 1 and 2 typically carry bulk transactions. According to the USB specification 1.0, each bulk transaction can not exceed 64 bytes. The attachment unit 110 has an In data buffer (or a receive buffer) to receive data sent to the end point 1. The attachment unit 110 also has an Out data buffer (or a transmit buffer) which stores data to be sent from the endpoint 1 of the attachment unit 110. (discussed in more detail later) When the LAN computer 130 wishes to communicate with another LAN computer 130 or with a LAN computer 190, 215, 260 or a network device 40 (such as a remote computer), the client software in the LAN computer 130 typically generates IP packets according to the IP protocol. (Other packet protocols such as Ethernet can be used). Referring to FIG. 11F, since each IP packet is typically greater than 64 bytes, the USB host software fragments the IP packet 8000 into a plurality of USB packets 8010. The USB packets 8010 are sent to the attachment unit 110. The LAN hub sends LAN packets (encapsulating the USB packets 8010) to the LAN hub 10. If the IP packet 8000 is destined to a network device 40, the LAN hub 10 reassembles the IP packet and forwards it to the network device 40 in one or more network packets. If the IP packet 8000 is destined to a LAN computer 190, 215 or 290 or another LAN computer 130, the LAN hub 10 forwards the LAN packets (encapsulating the USB packets 8010) to the respective outer hub device servicing the respective LAN computer 190, 215, 290 or 130.

Figure 11G:
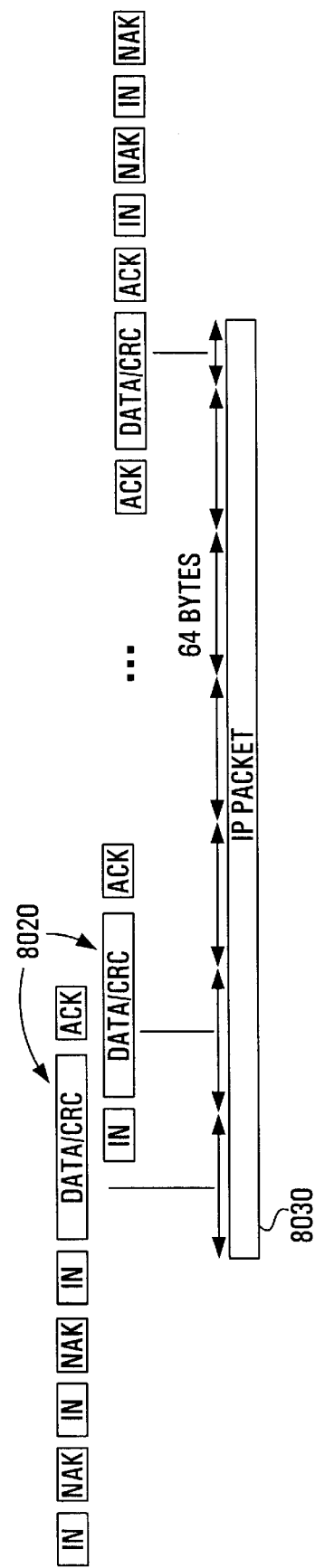
FIG. 11G is a diagram showing a LAN computer (or network device) receiving an IP packet.

Similarly, referring to FIG. 11G, when the LAN computer 130 receives USB packets 8020 sent from another LAN computer 130, a LAN computer 215, 190, or 260 or a network device 40 (such as a remote computer), the USB host software reconstructs an IP packet 8030 from the USB packets 8020.

The LAN computer 130 can also communicate with a USB device 100 or 180 by addressing the LAN hub 10 in the IP (or Ethernet) protocol and encapsulating the USB protocol within the IP (or Ethernet) protocol. (i.e. A plurality of USB packets destined to the USB device 100 or 180 ("USB device packets") are sent in a plurality of IP (or Ethernet) packets). Similarly, referring to FIG. 11F, since each IP packet is typically greater than 64 bytes, the USB host software fragments up the IP packet 8000 into a plurality of USB packets 8010. The USB packets 8010 are sent to the attachment unit 110. The attachment unit 110 sends LAN packets (encapsulating the USB packets 8010) to the LAN hub 10. The LAN hub 10 reconstructs the IP packet 8000 from the plurality of USB packets 8010. The LAN hub also extracts the USB protocol from the IP (or Ethernet) protocol (i.e. The USB device packets are extracted from the IP (or Ethernet) packets). The LAN hub 10 creates and forwards LAN packets encapsulating the USB device packets to the end hub 80 serving the USB device 100 (or the composite end hub 160 serving the USB device 180).

Similarly, when the LAN hub 10 receives LAN packets encapsulating USB device packets from the end hub 80 (or the composite end hub 160), the LAN hub 10 extracts the USB device packets from the LAN packets and creates IP packets 8030 encapsulating the USB device packets. Since each IP packet 8030 is typically greater than 64 bytes, the LAN hub 10 fragments the IP packet 8010 into a plurality of USB packets 8020 according to the LAN protocol. The LAN hub 10 creates LAN packets (encapsulating the USB packets 8020) and sends the LAN packets to the attachment unit 110. The attachment unit 110 receives the LAN packets and forwards USB packets 8020 to the LAN computer 130. Referring to FIG. 11G, when the LAN computer 130 receives USB packets 8020 from the LAN hub 10, the USB host software reconstructs an IP packet 8030 from the USB packets 8020.

A LAN protocol is used for communications on each LAN link 120 between the LAN hub 10 and each attachment unit 110. FIGS. 11A, 11B, 11C, 11D and 11E illustrate various permissible LAN transactions between the LAN hub 10 and each attachment unit 110 according to the preferred LAN protocol. As mentioned earlier, the LAN packets are sent within frames. The preferred LAN protocol provides for start of frame LAN packets 730. Since the LAN computer 130 acts as a host computer (according to the USB protocol), it initiates a USB start of frame packet and upon receipt the attachment unit 110 sends the start of frame LAN packet 730 to the LAN hub 10 every one millisecond (the "framing time"). The start of frame LAN packet 730 is mainly used by the LAN hub 10 to note that the USB host software in the LAN computer 130 is active. Referring in particular to FIG. 11A, each start of frame LAN packet 730 consists of the packet identifier (PID) 732, a frame number 734 and a CRC 736. The LAN hub 10 receives each start of frame LAN packet 730, computes the CRC for each start of frame LAN packet 730 and compares the computed CRC with the CRC 736 carried in each start of frame LAN packet 730. If the computed CRC and the CRC 736 do not match, an error has occurred and the LAN hub 10 sends the retry LAN packet 740 to the attachment unit 110. The attachment unit 110 will not retry the start of frame LAN packet 730, though a new start of frame LAN packet 730 will be issued at the next framing time. Since a retry of the start of frame LAN packet 730 will not be attempted until the next framing time, redundant fields and special physical layer signalling may be used to help prevent start of frame errors depending on the physical attributes of the LAN link 120.

Referring to FIG. 11B, whenever the LAN computer 130 sends a USB reset signal to the attachment unit 110, the attachment unit 110 sends the reset LAN packet 742 to the LAN hub 10. If the LAN hub 10 receives a corrupted LAN packet (including a corrupted reset LAN packet 742) from the attachment unit, the LAN hub 10 sends the retry LAN packet 740 to the attachment unit 110. Once the LAN hub 10 receives the reset LAN packet 742 without errors, the LAN hub 10 sends the reset LAN packet 742 back to the attachment unit 110. Until the attachment unit 110 receives the reset LAN packet 742 from the LAN hub 10, the attachment unit 110 periodically sends the reset LAN packet 742. Furthermore, until the attachment unit 110 receives the reset LAN packet 742 from the LAN hub 10, the attachment unit 110 only replies to USB packets from the LAN computer 130 with Stall packets. Once the attachment unit 110 is reset, the attachment unit 110 will only respond to USB packets from the LAN computer 130 with a USB device address 0 and control endpoint 0.

Referring to FIG. 11C, if there is a system error (i.e. the LAN hub 10 is in a stall condition, e.g. the LAN hub 10 is not functioning properly) the LAN hub 10 will send a Stall LAN packet 774 to the attachment unit 110 in response to any LAN packet sent by the attachment unit 110. Once the attachment unit 110 receives a stall LAN packet 774 from the LAN hub 10, the attachment unit 110 will send a stall packet to the LAN computer 130 in response to any USB packet from the LAN computer 130. The USB host software in the LAN computer 130 typically informs the client software of the stall condition.

The LAN computer 130 typically communicates with the attachment unit 110 using asynchronous communications (with bulk transactions) according to the USB protocol. Similarly, the attachment unit 110 typically communicates with the LAN hub 10 using asynchronous communications. As mentioned earlier, each outer hub device (such as the attachment unit 110) has a receive buffer and a transmit buffer. If the transmit buffer in the attachment unit 110 is empty, the attachment unit 110 can receive an Out token packet and a data packet from the LAN computer 130 (otherwise the attachment unit 110 will reply with NAK's to Out tokens and data issued to it by the LAN computer 130). Referring to FIG. 11D, upon receipt of the Out token packet and the data packet, the attachment unit 110 creates and sends an Out LAN packet 746 to the LAN hub 10. As mentioned earlier, each Out LAN packet 746 typically consists of a field 748 indicating a type of transaction (i.e. bulk/control transaction in this case), an Out token 750, data 752 and a CRC 754. The Out token 750 is the same as the Out token received by the attachment unit 110 (from the LAN computer 130). That is the Out Token 750 contains the USB device address and the end point number of the attachment unit 110 (Out tokens and data addressed to other USB devices attached to the LAN computer 130 are not processed by the attachment unit 110).

The LAN hub 10 computes the CRC for each Out LAN packet 746 received and compares the computed CRC with the CRC 754. If the computed CRC and the CRC 754 match and the LAN hub 10 is ready to receive the data, the LAN hub 10 sends the handshake LAN packet 780 containing an acknowledgement (ACK). Upon successful receipt of the handshake LAN packet 780 containing an acknowledgement, the attachment unit 110 will clear the Out LAN packet 746 previously sent from its transmit buffer (discussed later) and be ready to receive the next Out token packet and data packet from the LAN computer 130.

If the computed CRC and the CRC 754 match but the LAN hub 10 is not ready to receive the data, the LAN hub 10 sends the handshake LAN packet 780 containing a NAK. If the computed CRC does not match the CRC 754, the LAN hub 10 sends the retry LAN packet 740 to the attachment unit 110. If the attachment unit 110 receives the retry LAN packet 740, the attachment unit 110 resends the Out LAN packet 746 to the LAN hub 10 up to 3 times until it receives the handshake LAN packet 780 containing an ACK or NAK. If there is a problem regarding the LAN hub 10, the LAN hub 10 sends the handshake LAN packet 780 containing a stall to the attachment unit 110. If the receive buffer 470 of the respective LAN interface device 315 of the LAN hub 10 is full, and thus it is unable to process the Out LAN packet 746, the LAN hub 10 will issue a NAK response. Upon the reception of a NAK response, the attachment unit 110 will enter a cycle of alternately retrying the Out LAN packet 746 and issuing In token packets 756 as described below (if the In data buffer of the attachment unit 110 is empty—as described below). This cycle continues until a non-NAK reply (i.e. a handshake LAN packet containing an ACK or a stall) is received correctly by the attachment unit 110.

If the LAN hub 10 receives two subsequent Out LAN packets, both with the same PID (i.e. both with the data 0 or data 1 PID), the LAN hub 10 assumes that the attachment unit 110 did not receive the last LAN hub 10 generated handshake LAN packet 780 containing an ACK, and issues another handshake LAN packet 780 with an ACK to resume the proper data sequence and discards the duplicate data.

If the attachment unit 110 began sending a new LAN transaction on the LAN link 120 before the associated USB transaction on the USB link 152 was complete (to keep system delays minimal), it is possible that the computed CRC and the CRC 754 will not match due to errors on the USB link 152. The LAN hub 10 will not be able to distinguish errors on the USB link 152 from errors on the LAN link 120 and will send a retry packet 740. If the error occurred on the USB link 152, the attachment unit 110 will send a nil LAN packet 777 to the LAN hub 10 to inform the LAN hub 10 to ignore the transaction (which will be retried by the LAN computer 130). If the error occurred on the LAN link 120, the Out LAN packet 740 is retried until successful and a handshake LAN packet 780 containing an ACK is received by the attachment unit (or until the maximum number of retries is exceeded).

Referring to FIG. 11E, whenever the LAN computer 130 wishes to obtain data it sends an In token packet to the attachment unit 110 according to the USB protocol. If the attachment unit 110 receives the In token packet correctly, the attachment unit 110 sends data in a data packet if it has data to send; otherwise, the attachment unit sends a NAK packet. In order to be able to reply to an In transaction issued by the LAN computer 130, the attachment unit 110 typically continuously attempts to fill its receive buffer by issuing In LAN packets 756. Referring to FIG. 11E, the In LAN packet 756 contains the field 758 indicating the type of transaction (i.e. bulk/control in this case) and an In token 760. If the LAN hub 10 does not receive the In LAN packet 756 error free, the LAN hub 10 sends the retry LAN packet 740 to the attachment unit 110. Upon receipt of the retry LAN packet 740, the attachment unit 110 resends the In LAN packet 756. Upon error free reception of the In LAN packet 756, the LAN hub 10 sends a response LAN packet 762 to the attachment unit 110. If the LAN hub 10 has any data to send to the attachment unit 110, the response LAN packet 762 will contain data. If the LAN hub 10 does not have any data to sent to the attachment unit 110 the response LAN packet 762 will contain a NAK. If the LAN hub 10 is in an error condition that prevents it from sending data, the response LAN packet 762 will contain a Stall. If the response LAN packet 762 contains data, the attachment unit 110 computes a CRC for the response LAN packet 762. The attachment unit 110 compares the computed CRC with the CRC 770 carried with the response LAN packet 762. If the computed CRC and the CRC 770 match, the attachment unit 110 sends an acknowledgement (ACK) handshake packet 793 to the LAN hub 10. If the computed CRC and the CRC 770 do not match, the attachment unit 110 does not send any response. If the LAN hub 10 does not receive an ACK handshake packet 793 error free, the LAN hub 10 will not clear its transmit buffer 480 and thus will resend the response LAN packet 762 in response to repeated In LAN packets 756. If the LAN computer 130 thus sees duplicate data, it will detect this from the alternate 0, 1 labelling of bulk/control data packets and discard the duplicate data until the proper data sequence resumes.

Whenever the LAN hub 10 or any of the outer hub devices (e.g. an attachment unit 110) sends a LAN packet containing an In token, Out token or Setup token, the LAN hub 10 or the outer end hub unit expects to receive a response within the LAN time limit. The amount of time the response is received by the LAN hub 10 or the outer hub device depends on the length of the LAN links 90, 120, 170 and 250 used, the speed of the LAN links 90, 120, 170 and 250, the length of the response (e.g. number of bits), and the amount of processing time required for the LAN hub 10 and the outer hub device to process the LAN packets. Consequently, the LAN time limit depends on these some factors. If the response (even a corrupted/errored response) is not received by the LAN hub 10 or the outer hub device (which sent the token) within the LAN time limit, there is a problem with the computer network such as a cut cable (used for the respective LAN link) or a malfunctioning LAN hub 10 or outer hub device. The computer network attempts to correct the problem by resetting LAN link used, the LAN hub 10 or outer hub device. (In the preferred embodiment, the LAN links operate at 12 Mbits/sec. Consequently, the LAN time limit is typically 1 ms).

Figure 13:
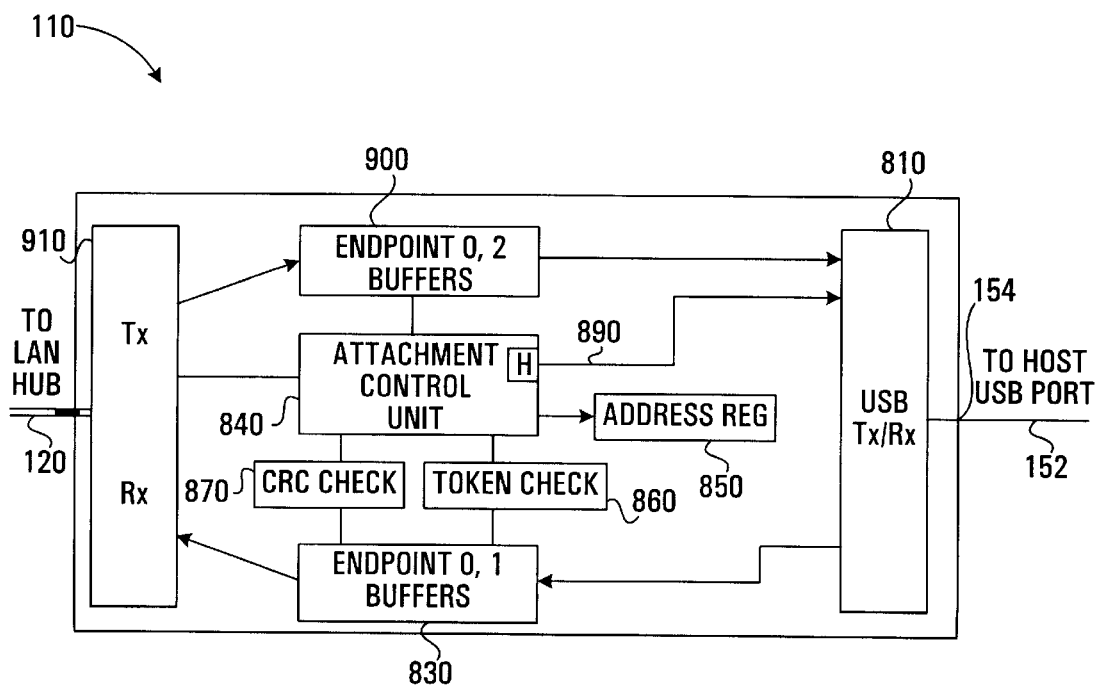
FIG. 13 is a block diagram of an attachment unit shown in FIGS. 7, 7B and 7D.

FIG. 13 shows a schematic diagram of the attachment unit 110. The attachment unit 110 comprises LAN hub communication means for communicating with the LAN hub 10, USB communication means for communicating with the LAN computer 130 and control logic means connected to the LAN hub communication means and to the USB computer communication means. The LAN hub communication means comprise a LAN transceiver 910. The USB computer communication means comprise a USB transceiver 810. The USB transceiver has a USB port 152. The LAN link 120 is connected to the LAN transceiver 910. The control logic means comprise an attachment control unit 840, combined endpoint 0 (in) and endpoint 2 buffers 900, combined endpoint 0 (out) and endpoint 1 buffers 830, a CRC check unit 870, a token check unit 860, and an address register 850. The combined endpoint 0 (in) and endpoint 2 buffers 900 are connected to the LAN transceiver 910, to the USB transceiver 810 and to the attachment control unit 840. The combined endpoint 0 (out) and endpoint 1 buffers 830 are connected to the LAN transceiver 910, to the USB transceiver 810 and to the attachment control unit 840. The CRC check unit 870 and the token check unit 860 are connected to the attachment control unit 840 and to the endpoint 0 (out) and endpoint 1 buffers 830. The address register 850 is connected to the attachment control unit 840. A handshake line 890 is connected to the attachment control unit 840 and to the USB transceiver 810. The USB link 152 is connected to the transceiver 810.

Shortly after the USB link 152 is connected to one of the USB ports 150 of the USB hub 140, the USB host software in the host computer 130 will detect the connection of a USB device during one of its regular polls of the USB hub 140. The USB host software will send a reset command to the attachment unit 110. The USB host software will begin addressing the attachment unit 110 using end point 0. The USB host software in the host computer 130 will typically issue a set device address command to control end point 0 of the attachment unit 110 to assign a unique USB device address to the attachment unit 110. The set device address command typically comprises a setup token packet and a data packet containing the address. The control setup token packet and the data packet are received by the USB transceiver 810 through the USB port 154. The USB transceiver 810 carries the setup token and the data packet to the end point 0 buffer 830. The attachment control unit 840 carries the setup token packet from the end point 0 buffer 830 to the token check unit 860. The attachment control unit 840 also carries the data packet in the end point 0 buffer 830 to the CRC check unit 870. The token check unit 860 determines whether the token packet received is valid. The CRC check unit 870 computes a check sum for the data packet received and compares the computed check sum with the check sum carried with the data. If the token packet is valid and if the check sums match, the attachment control unit 840 carries the data to the address register 850. In addition, the attachment control unit creates an ACK handshake packet and sends it to the USB transceiver 810 via the handshake line 890. The USB transceiver 810 sends the ACK handshake packet to the host computer 130. If the token packet is invalid or if the check sums do not match, the attachment unit 110 does not send any response to the LAN computer 130. If the LAN computer 130 does not receive an ACK handshake packet or receives a corrupted ACK handshake packet, the LAN computer 130 will resend the setup token packet and the data packet containing the USB device address.

Next the LAN computer 130 will typically issue a get description command to control end point 0 of the attachment unit 110 using the new USB device address. The attachment unit 110 will respond with a USB standard device description which identifies it as a virtual modem (this may require the use of vendor specific fields of the USB device description if such a virtual modem is not standardized). Upon recognition of an attached virtual modem, the host computer 130 will communicate with the corresponding modem client software in the LAN computer 130 to set up communications with the virtual modem (i.e. attachment unit 110). The client software will know the attributes of the attachment unit 110 to interact properly with the USB host software. The USB software will send a configuration command to control end point 0 of the attachment unit 110 to configure the attachment unit 110 for use. Notification of this configuration is passed on to the LAN hub 10 by the attachment unit 110 in a LAN packet. In its basic form a virtual modem has three end points as previously described. These end points and the description of these end points are provided to the host computer 130 by the attachment unit 110 (through replies to control get configuration commands issued to endpoint 0 of the attachment unit 110).

As mentioned earlier, when the LAN computer 130 wishes to communicate with another LAN computer 130 or with a LAN computer 190, 215, 260 or a network device 40 (such as a remote computer), the client software in the LAN computer 130 typically generates IP packets according to the IP protocol. (Other protocols such as the higher layers of Ethernet can be used). (Similarly, when the LAN computer wishes to interact with a USB device 100 or 180, the client software in the LAN computer 130 typically generates IP packets according to the IP protocol). Referring to FIG. 11F, since each IP packet is typically greater than 64 bytes, the USB host software fragments the IP packet 8000 into a plurality of USB packets 8010.

Each IP packet is buffered in memory of the host computer 130 and the client software within the host computer 130 breaks up the IP packet into 63 byte fragments. (see FIG. 11F) A one byte header is attached to each fragment. For the first fragment, the first byte header is uniquely specified as start of an IP packet fragment. Subsequent headers identify further fragments as continuation IP fragments. The last fragment is identified as an end of IP fragment. (The last fragment may not be the full 63 bytes of information). If an entire IP packet is less than 64 bytes in length, a header identifying datagram fragment is used to indicate the fragment is both a start and end fragment. These fragments are sent out in sequence within the USB protocol to the end point 1 buffer 830 of the attachment unit 110 using USB bulk transactions. As these fragments are received by the attachment unit 110, the attachment unit 110 checks the data integrity using the CRC check unit 870 and checks the integrity of the Out token using token check 860. The ACK handshake packet is returned to the host computer 130 if the integrity of the data and Out token is correct. As each fragment is correctly received by the attachment unit 110, it is forwarded to the LAN hub 10 in an Out LAN packet 746 using the variant of the USB protocol (i.e. the LAN protocol) for initial storage in a receive buffer 470 of a LAN interface device 315 associated with the attachment unit 110. The microprocessor 310 moves the Out LAN packet 746 to a buffer in the RAM 360. The LAN hub 10 sends a LAN packet 780 containing an ACK to the attachment unit 110 for a successful (error-free) reception of each Out LAN packet 746. If the handshake LAN packet 780 is received correctly by the attachment unit 110, the end point 1 buffer 830 is cleared and made ready for the next Out LAN transaction. If the handshake LAN packet 780 is not received correctly by the attachment unit 110, the Out LAN transaction is retried for a maximum of 3 times after which a stall packet will be transmitted to the host computer 130. If the IP packet was addressed to a network device 40, the LAN hub 10 typically reassembles the IP packet from the IP fragments and forwards the whole IP packet to the network device 40 using the conventional network protocol (which typically is IP carried on a specific physical lower layer protocol such as Ethernet). If the IP packet was addressed to a LAN computer connected to the LAN hub 10, the LAN hub 10 typically forwards the IP fragments (using the variant of the USB protocol) to the respective outer hub device.

To obtain any available data from the LAN hub 10, the attachment unit sends an In LAN packet to the LAN hub 10. Referring to FIG. 11G, the LAN hub 10 sends the first fragment to the end point 2 buffer 900 of the attachment unit 110 in response to the In LAN packet. The attachment control unit 840 of the attachment unit 110 computes a CRC for the response LAN packet. If the computed CRC and the CRC carried in the response LAN packet match, the attachment control unit 840 sets the status of the end point 2 buffer 900 to ready/full; if not it requests a retry from the LAN hub 10. If 3 retries are exceeded then there is a LAN link problem and the attachment unit 110 sends a response LAN packet 762 containing a Stall to the LAN hub 10 and in response to In token packets from the LAN computer 130 sends a Stall packet to the host computer 130. The host computer 130 is responsible for polling attachment unit with In tokens requesting data from end point 2 of the attachment unit 110. If the status of the bulk of the end point 2 buffer 900 is set to full/ready, the attachment unit 110 responds to the In token and sends data to the LAN computer 130. If the status of the buffer is not full/ready, it sends a NAK handshake packet. If the data was successfully received by the LAN computer 130, the LAN computer 130 sends an ACK handshake packet to the attachment unit 110. Upon receipt of the ACK handshake packet, the attachment control unit 840 clears the end point 2 buffer 900 and sends an In LAN packet 756 containing an In Token and an ACK to the LAN hub 10. Upon receipt of the In LAN packet 756, the LAN hub 10 sends the next IP fragment (using the variant of the USB protocol) to the attachment unit 110. If the In LAN packet 756 is received corrupted by the LAN hub 10, the In LAN packet 756 can be retried until 3 retries have been exceeded upon which a line problem has occurred and a stall handshake packet is generated.

Alternatively, another conventional protocol, such as Ethernet (at layers above the physical level), may be used instead of the IP protocol. (The Ethernet protocol sends information in Ethernet packets). The Ethernet packets are fragmented and reassembled in the same way as the IP packets. It is only required that unique one byte headers be assigned to these protocols for start, continuation, and end datagram fragments.

Figure 14:
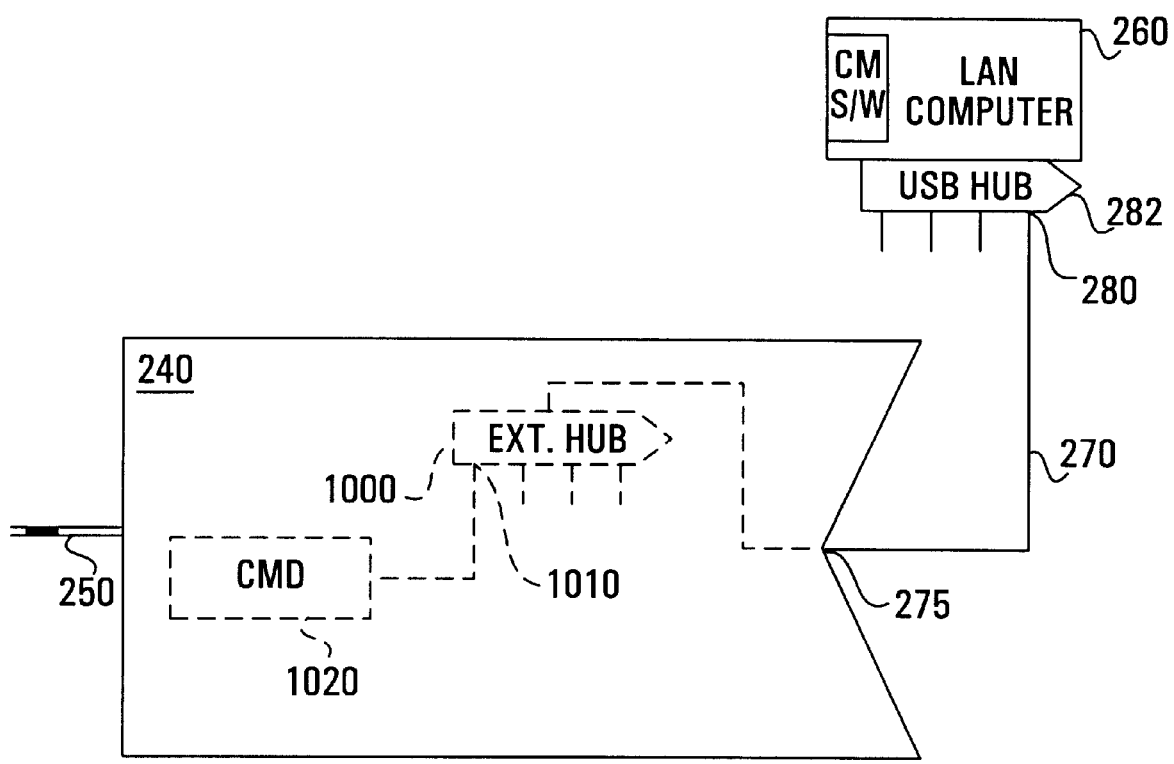
FIG. 14 is a block diagram showing how an enhanced attachment unit appears to a LAN computer.

In another aspect of the invention, there is an enhanced attachment unit which can go beyond simulating a virtual modem or network interface. The enhanced attachment unit 240 can actually simulate the attachment of remote USB devices to a LAN computer 260. Referring in particular to FIG. 14, a LAN computer 260 (or a host computer) is connected to the enhanced attachment unit 240 via the USB link 270 as previously described. In particular, the USB link 270 is connected to the USB port 280 of the LAN computer 260 and connected to the USB port 275 of the enhanced attachment unit 240. The enhanced attachment unit 240 is connected to the LAN hub 10 via LAN link 250. FIG. 14 shows how the LAN computer 260 sees the enhanced attachment unit 240. From the perspective of the LAN computer 260, the enhanced attachment unit 240 consists of a hub device 1000 with a plurality of USB ports 1010. In addition,.from the perspective of the host computer 260 there is one USB device, a communications manager virtual device (CMD) 1020, connected to one of the USB ports 1010 of the hub device 1000.

The LAN computer 260 contains host software. The host software 260 polls on a regular basis its USB ports 280 for any newly connected USB device. When the enhanced attachment unit 240 is first connected to the LAN computer 260, the host software in the LAN computer 260 will detect the presence of the enhanced attachment unit 240 during one of its regular polls. The enhanced attachment unit 240 has a control end point 0 just like any other USB device. Upon detection, the LAN computer 260 sends a reset command to the enhanced attachment unit 240. Once the enhanced attachment unit 240 is reset, the LAN computer 260 sends a control set-up packet and a data packet containing a unique non-zero USB device address for the enhanced attachment unit 240. Upon successful reception of these two packets, the enhanced attachment unit sends an ACK handshake packet to the LAN computer 260. Next, the LAN computer 260 sends a control get-description command to the enhanced attachment unit 240. The enhanced attachment unit 240 responds by identifying itself as a USB hub device 1000 with a plurality of USB ports 1010. The LAN computer 260 places the enhanced attachment unit 240 in the configured state by sending a configuration command to the enhanced attachment unit 240. The LAN computer 260 periodically polls the enhanced attachment unit 240 (appearing initially as a USB hub) for changes in its USB ports 1010. During the first poll, the enhanced attachment unit reports a change in its first USB port 1010. The LAN computer 260 sends a reset command informing the enhanced attachment unit 240 to reset the first USB port 1010. Once the reset is complete, the LAN computer 260 assigns an address to the USB device on the first USB port 1010 according to the USB protocol. The LAN computer 260 issues a get description command to the USB device. The USB device connected to the first USB port identifies itself as a communications manager virtual device (CMD) 1020 with three endpoints (having the same characteristics as the endpoints in the attachment unit 110 previously described). The host software in the LAN computer 260 informs client software running on the LAN computer 260 of the communications manager virtual device 1020.

The LAN computer 260 interacts with the communications manager virtual device (CMD) 1020 using this client software (and the host software). The client software communicates with the communicators manager virtual device (CMD) 1020 with IP packets according to the Internet (IP) protocol. As discussed in more detail later, since each IP packet is typically larger than each USB packet, the host software fragments each IP packets into a plurality of USB packets which are sent to the CMD 1020 using the USB protocol. At the CMD 1020, each IP packet is reconstructed from the USB packets. Similarly, the CMD 1020 fragments each IP packet destined to the LAN computer 260 into a plurality of USB packets. The client software reconstructs each IP packet from the USB packets.

The LAN computer 260 interacts with the communications manager virtual device (CMD) 1020 using the client software and the host software to determine what USB devices 100, 180 are available on the LAN hub 10 to "virtually" connect to the LAN computer 260. The client software sends a device directory command to the communications manager virtual device (CMD) 1020. In particular, the device directory command is intercepted by the host software. The host software sends the device directory command to the communications manager virtual device 1020. The communications manager virtual device 1020 forwards the device directory command to the LAN hub 10. In response to the device directory command, the LAN hub 10 sends to the communications manager virtual device 1020 a device listing of all the available USB devices 100 and 180 and their USB device addresses and end points that are connected to the end hubs 80 and composite end hubs 160 (e.g. FIG. 20). The communications manager virtual device 1020 forwards the device listing to the LAN computer 260 over multiple USB packets. A user of the LAN computer 260 selects a USB device 100 or 180 from the listing and the client software informs the USB host software. The USB host software sends a command to the communications device 1020 indicating the USB device 100 or 180 to be "virtually" connected to the LAN computer 260. The enhanced attachment unit 240 informs the LAN hub 10 of the USB device 100 or 180 to be virtually connected to the enhanced attachment unit 240. If the USB device 100 or 180 is still available, the LAN hub 10 informs the enhanced attachment unit 240 that the USB device 100 or 180 has been attached. The LAN hub 10 also informs the enhanced attachment unit 240 whether the USB device is a low speed USB device or a high speed device. Upon regular polling of the enhanced attachment by the LAN computer 260, the enhanced attachment unit 240 will respond with a status change to a previously disconnected USB port 1010 on the enhanced attachment unit 260 (or virtual hub device) (i.e. a USB device is now attached to one of the virtual USB ports 1010). The LAN computer 260 will then send a reset command to the USB device 100, 180 by sending a USB port reset command to the enhanced attachment unit 240 (or the virtual hub) using USB device address 0. The enhanced attachment unit forwards the reset command to the LAN hub 10. The LAN hub 10 forwards the reset command to the USB device 100, 180. Once the USB device 100, 180 has been reset, the LAN computer 260 will send a set-up packet and a data packet containing a first unique USB device address for the USB device 100, 180 to place the USB device 100, 180 in the addressed state. The set-up packet and the data packet are forwarded to the LAN hub 10 using the variant of the USB protocol. It is important to note that the LAN hub 10 typically assigns a second unique (non-zero) USB device address to the USB device 100, 180. (The second USB device address may be different than the first USB address since the first USB device address assigned by the LAN computer 260 may have already been assigned by the LAN hub 10 to another USB device 100 or 180). The LAN computer 260 sends a configuration command for an end point 0 of the USB device 100, 180 to be configured. The enhanced attachment unit 240 forwards the configuration command to the LAN hub 10 using the second USB device address. The LAN hub 10 forwards the configuration command to the USB device 100, 180 using the second USB device address. The LAN hub 10 will also issue setup commands to the enhanced attachment unit 240 to emulate the end point characteristics for that chosen configuration. Referring in particular to FIG. 15I, the LAN hub 10 sends a set-up LAN packet 2500 to the enhanced attachment unit 240. The set-up LAN packet 2500 has a plurality of fields. A first field 2510 indicates the type of packet—a set-up packet in this case. A second field 2520 contains a set-up token which contains the USB device address of the USB device 100, 180 and the endpoint number of the endpoint being configured. A third field 2530 indicates the maximum length of data that can be transferred to or from the endpoint of the USB device. A fourth field 2540 indicates the type of endpoint—In or Out. A fifth field 2550 indicates whether the endpoint is isochronous or asynchronous. A sixth field 2560 holds the frame number of a future packet on which the specified endpoint will become operational. The set-up packet 2500 also has a CRC 2570 for error checking.

Once the set-up packet 2500 has been received by the enhanced attachment unit 240, the enhanced attachment unit 240 computes a CRC for the set-up LAN packet 2500 and compares the computed CRC with the CRC 2570 carried in the set-up LAN packet 2500. If the computed CRC and the CRC 2570 match, the enhanced attachment unit 240 sends an acknowledgment LAN packet 9010 to the LAN hub 10. The enhanced attachment unit 240 also sets up a buffer in its memory of sufficient size to hold the maximum length of data to be transferred to or from the endpoint. The buffer in the memory of the enhanced attachment unit 240 is sometimes called a virtual endpoint. If the computed CRC and the CRC 2570 do not match, the enhanced attachment unit does not send a response to the LAN hub 10. If the LAN hub 10 does not receive an acknowledgment LAN packet 9010, the LAN hub 10 sends a clear LAN packet 2600 to the enhanced attachment unit 240. The clear LAN packet 2600 has a token which indicates the USB device address and the endpoint number being cleared (i.e. the endpoint number in the previous set-up LAN packet 2500). The clear LAN packet 2600 informs the enhanced attachment unit 240 to stop simulating the endpoint (i.e. closed the virtual endpoint). The LAN hub 10 then resends the set-up LAN packet 2500 to the enhance attachment unit 240.

Once the USB device has been configured, any USB packets sent by the LAN computer 260 to the first USB device address will be forwarded to the LAN hub 10 via the enhanced attachment unit 240. The LAN hub 10 forwards the USB packets to the USB device 100, 180 using the second USB device address. Any response from the USB device will be forwarded to the enhanced attachment unit via the LAN hub 10 using the first USB device address. It should be noted that for isochronous transactions, the LAN hub 10 knows the precise schedule of the isochronous transactions, and thus the LAN hub 10 can have data ready for immediate response to an In LAN packet issued by the enhanced attachment unit. For bulk/control/interrupt transactions, the first LAN computer 260 issued IN token packet will by met with a NAK handshake packet; however, the In token packet will be forwarded to the USB device via the LAN hub 10 (using an In LAN packet) and any returned data will be stored in the enhanced attachment unit 240 when the next In token packet is sent (or retried) by the LAN computer 260. Optionally, the LAN hub 10 could poll the appropriate device end points of the USB device with In LAN packets periodically to have data ready for any In LAN packets issued by the enhanced attachment unit. This approach would minimize the number of NAK handshake packets that the LAN computer 260 would encounter in response to In token packets issued by the LAN computer 260.

Once the USB device has been configured, the enhanced attachment unit 240 works very much in a similar way as the attachment unit 110. Data from the client software in the LAN computer 260 intended for a USB device is intercepted by the USB host software in the LAN computer 260. The USB host software creates USB packets containing the data according to the USB protocol. Similarly, USB packets containing data from a USB device are received by the LAN computer 260. The USB host software in the LAN computer 260 extracts data and sends the data to the client software.

When an endpoint of a USB device 100 or 180 is no longer needed, the LAN computer 260 sends a de-configuration command to the enhanced attachment unit 240 according to the USB protocol. The enhanced attachment unit sends a LAN packet containing the de-configuration command to the LAN hub 10 using the first USB device address. The LAN hub 10 forwards the de-configuration command to the outer hub device servicing the USB device using the second USB device address. Once the endpoint has been de-configured, the outer hub device sends the LAN hub 10 an acknowledgment LAN packet 9010.

Upon receipt of the acknowledgment LAN packet 9010, the LAN hub 10 sends a clear LAN packet 2600 to the enhanced attachment unit 240 informing the enhanced attachment unit 240 to stop simulating the endpoint (i.e. the virtual endpoint). The clear packet 2600 has a plurality of fields (see FIG. 15J). A first field 2610 indicates that the packet is a clear LAN packet. A second field 2620 contains a token which indicates the USB device address and the endpoint number to be cleared. (If the endpoint number in the token is 0, then all the endpoints associated with the USB device address are cleared; otherwise, only the specified endpoint is cleared.) A third field 2630 holds the frame number of a future packet on which the endpoint number will be cleared. The clear LAN packet 2600 also has a CRC 2640 for error checking purposes.

If the enhanced attachment unit 240 receives the clear LAN packet 2600 error free, the enhanced attachment unit 240 sends an acknowledgment LAN packet 9010 to the LAN hub 10. The enhanced attachment unit 240 also frees up the memory used for the virtual endpoint so that the memory can be used for other virtual endpoints in the future or for other purposes. If the LAN hub 10 does not receive the acknowledgment LAN packet 9010, the LAN hub 10 will retry (i.e. will resend) the clear LAN packet 2600 at a future time until the LAN hub 10 receives an acknowledgment LAN packet 9010. If the enhanced attachment unit 240 receives a clear LAN packet 2600 for an endpoint which has already been cleared or for an endpoint which has never been set-up, the enhanced attachment unit 240 will nonetheless send an acknowledgment LAN packet 9010 to the LAN hub 10.

Since the client software in the LAN computer 260 generates IP packets according to the IP protocol, the LAN computer 260 can easily communicate with another LAN computer 260 or with a LAN computer 130, 190, 215 or network device 40 (such as a remote computer). (Other protocols, such as the higher layers of Ethernet, can be used). Referring to FIG. 11F, since each IP packet is typically greater than 64 bytes, the USB host software fragments the IP packet 8000 into a plurality of USB packets 8010. The USB packets 8010 are sent via the enhanced attachment unit 240. Similarly, referring to FIG. 11G, when the LAN computer 260 receives USB packets 8020 sent from another LAN computer 260, a LAN computer 130, 215 or 190 or a network device 40 (such as remote computer), the USB host software reconstructs the IP packet 8030 from the USB packets 8020. To allow communication between the LAN computer 260 and a LAN computer 130, 190 or 215 or another LAN computer 260 or a network device 40, the LAN hub 10 will present to the communications manager virtual device (CMD) 1020 (in response to a device directory command) the ability to attach a "virtual modem" device which will work identically as the attachment unit 110. Alternatively, the CMD 1020 will perform the function of a virtual modem since all the packets between the CMD 1020 and the LAN computer 260 are IP packets as previously described.

Figure 15D:
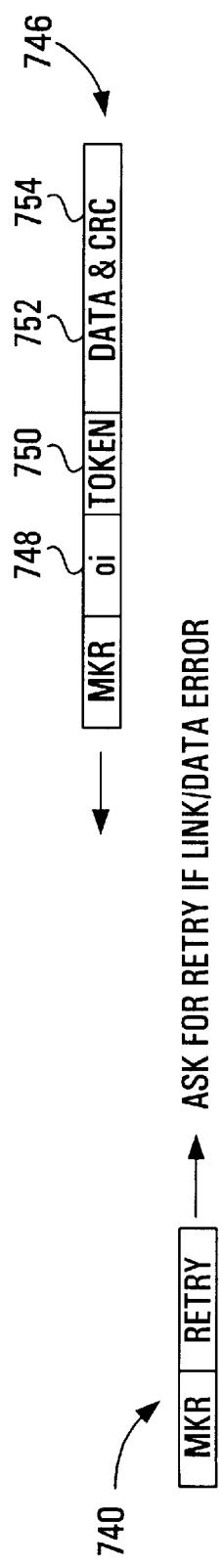
FIG. 15D is a diagram showing an Out Isochronous LAN transaction according to the preferred variant of the USB protocol used for communications between the LAN hub and the enhanced attachment unit.

Referring to FIGS. 15A, 15B, 15C, 15D, 15E, 15F, 15G, and 15H, the preferred protocol used for communications on each LAN link 250 between the LAN hub 10 and each enhanced attachment unit 240 is a variant of the USB protocol. Information is sent within LAN packets. The LAN packets are sent within frames. Referring in particular to FIG. 15A, the preferred variant of the USB protocol provides for start of frame LAN packets 730. Since the LAN computer 260 acts as a host computer (according to the USB protocol), the enhanced attachment unit 240 sends each start of frame packet received from the LAN computer 260 within a start of frame LAN packet 730 to the LAN hub 10 every one millisecond (the "framing time"). The start of frame LAN packet 730 provide framing markers at the beginning of each frame. Each start of frame LAN packet 730 consists of the packet identifier (PID) 732, a frame number 734 and a CRC 736. The LAN hub 10 receives each start of frame LAN packet 730, computes the CRC for each start of frame LAN packet 730 and compares the computed CRC with the CRC 736 carried in each start of frame LAN packet 730. If the computed CRC and the CRC 736 do not match, a framing marker error has occurred and the LAN hub 10 sends the retry LAN packet 740 to the attachment unit 110. The attachment unit 110 will not retry the start of frame LAN packet 730 but will issue a new start of frame LAN packet 730 at the next framing time. Since a retry of the start of frame LAN packet 730 will not be attempted until the next framing time, redundant fields and special physical layer signalling may be used to help prevent start of frame errors depending on the physical attributes of the LAN link 250.

Referring to FIG. 15B, whenever the LAN computer 260 sends a USB reset command to the enhanced attachment unit 240 or to a USB device 100 or 180 (on a virtual USB port), the enhanced attachment unit 240 sends a reset LAN packet 9200 to the LAN hub 10 using the preferred variant of the USB protocol. The reset LAN packet typically consists of a reset ID 9210 and a field 9220 indicating the port number to which the USB device 100 or 180 is virtually connected. If the port number is 0, an overall reset for the LAN link 250 and all the virtually connected USB devices occurs. If the LAN hub 10 receives a corrupted reset LAN packet 9200, the LAN hub 10 sends the retry LAN packet 740 to the enhanced attachment unit 240. Once the LAN hub 10 receives the reset LAN packet 9200 without errors, the LAN hub 10 sends the reset LAN packet 9200 to the respective outer hub device. The respective outer hub device then resets the respective USB device. In addition, once the LAN hub 10 receives the reset LAN packet 9200 without errors, the LAN hub 10 sends the reset LAN packet 9200 back to the enhanced attachment unit 240. Until the enhanced attachment unit 240 receives the reset LAN packet 9200 from the LAN hub 10, the enhanced attachment unit 240 periodically sends the reset LAN packet 9200. Furthermore, until the enhanced attachment unit 240 receives the reset LAN packet 9200 from the LAN hub 10, the enhanced attachment unit 240 only replies to USB packets from the LAN computer 260 addressed to the enhanced attachment unit 240 or to the USB device 100 or 180 on a virtual USB port (depending on what was reset) with Stall packets. Once the enhanced attachment unit 240 or the USB device 100, 180 is reset, the enhanced attachment unit 240 or the USB device 100, 180 respectively will respond to USB packets from the LAN computer 260 with the USB device address 0.

Referring to FIG. 15C, if there is a system error (e.g. the LAN hub 10 is not functioning properly) the LAN hub 10 will send a stall LAN packet 774 to the enhanced attachment unit 240 in response to any LAN packet sent by the enhanced attachment unit 240. Once the enhanced attachment unit 240 receives a stall LAN packet 774 from the LAN hub 10, the enhanced attachment unit 240 will send a stall packet to the LAN computer 260 in response to any USB packet from the LAN computer 260 addressed to the enhanced attachment unit 240 or to any of the USB devices 100, 180 that are "virtually" connected to the enhanced attachment unit 240. The USB host software in the LAN computer 260 typically informs the client software of the Stall condition.

The LAN computer 260 communicates with the enhanced attachment unit 240 either using asynchronous communications or isochronous communications according to the USB protocol. Similarly, the enhanced attachment unit 240 communicates with the LAN hub 10 either using asynchronous communications or isochronous communications.

If the virtual buffer associated with an endpoint in the enhanced attachment unit 240 is not full, the enhanced attachment unit 240 can receive an Out token packet and a data packet addressed to the endpoint from the LAN computer 260 according to the USB protocol. Referring to FIGS. 15D and 15F, upon receipt of the Out token packet and the data packet, the enhanced attachment unit 240 sends an Out LAN packet 746 to the LAN hub 10. As mentioned earlier, each Out LAN packet 746 typically consists of a field indicating the type of transaction (i.e. asynchronous or isochronous), an Out token 750, data 752 and a CRC 754. The Out token 750 typically contains a USB device address and the end point number of the USB device to which the Out LAN transaction is directed.

The LAN hub 10 computes the CRC for each Out LAN packet 746 received and compares the computed CRC with the CRC 754. If the type of transaction is isochronous and the computed CRC and the CRC 754 do not match, the LAN hub 10 sends the retry LAN packet 740 to the enhanced attachment unit 240 only if there is time within the same framing time to resend the Out LAN packet 746. If the type of transaction is asynchronous, the computed CRC and the CRC 754 match and the LAN hub 10 is ready to receive the data, the LAN hub 10 sends the handshake LAN packet 780 containing an acknowledgement (ACK). If the computed CRC and the CRC 754 match but the LAN hub 10 is not ready to receive the data, the LAN hub 10 sends the handshake LAN packet 780 containing a NAK. If the computed CRC does not match the CRC 754, the LAN hub 10 sends the retry LAN packet 740 to the enhanced attachment unit 240. If the enhanced attachment unit 240 receives the retry LAN packet 740 or the handshake LAN packet 780 containing a NAK, the enhanced attachment unit 240 resends the Out LAN packet 746 to the LAN hub 10 up to 3 times until it receives the handshake LAN packet 780 containing an ACK. (Retries are not guaranteed for isochronous transactions). If there is a problem regarding the LAN hub 10 or the virtually connected USB device, the LAN hub 10 sends the handshake LAN packet containing a stall to the enhanced attachment unit 240.

For asynchronous communications, if the LAN hub 10 receives two subsequent Out LAN packets, both with the same PID (i.e. both with data 0 or data 1 PID), the LAN hub 10 assumes that the enhanced attachment unit 240 did not receive the last LAN hub 10 generated handshake LAN packet 780 containing an ACK, and issues another handshake LAN packet 780 with an ACK until the next proper data sequence is received and discards the duplicate data. For asynchronous communications, if the enhanced attachment unit 240 begins sending a new LAN transaction on the LAN link 250 before the USB transaction (to be encapsulated within the new LAN transaction) was complete on the USB link 270, it is possible that the received and computed CRC's at the LAN hub 10 do not match due to errors on the USB link 270. In such a situation, the LAN hub 10 sends a retry packet 740. If there were errors on the USB link 270, the packet will be retried; otherwise, the enhanced attachment unit 240 will send a nil LAN packet 777 to the LAN hub 10 to inform the LAN hub 10 that the previous LAN packet had errors and should be ignored.

Whenever the LAN computer 260 wishes to obtain data, the LAN computer 260 sends an In token to the enhanced attachment unit 240 according to the USB protocol. If the enhanced attachment unit 240 receives the In token packet correctly, the enhanced attachment unit 240 sends data in a data packet if it has data to send. If the enhanced attachment unit 240 does not have any data to send and the type of transaction is isochronous, the enhanced attachment unit sends no data.

Figure 15E:
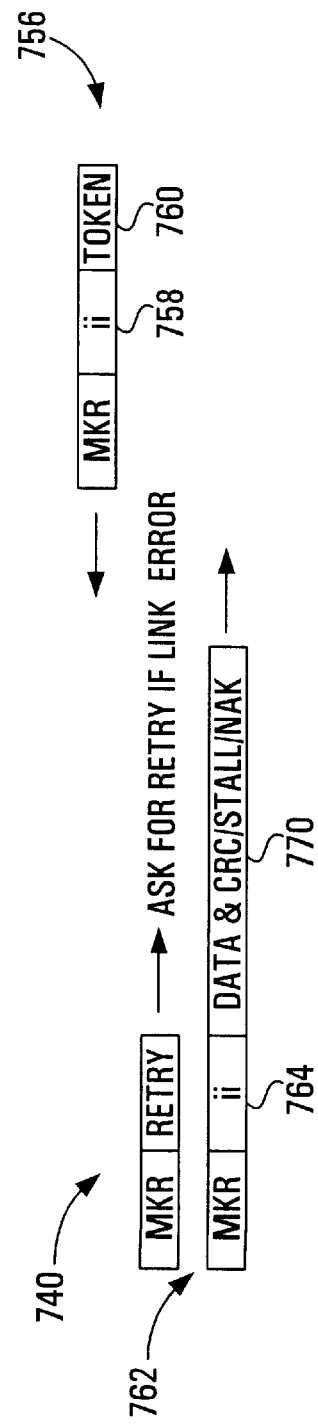
FIG. 15E is a diagram showing an In isochronous LAN transaction according to the preferred variant of the USB protocol used for communications between the LAN hub and the enhanced attachment unit.
Figure 15F:
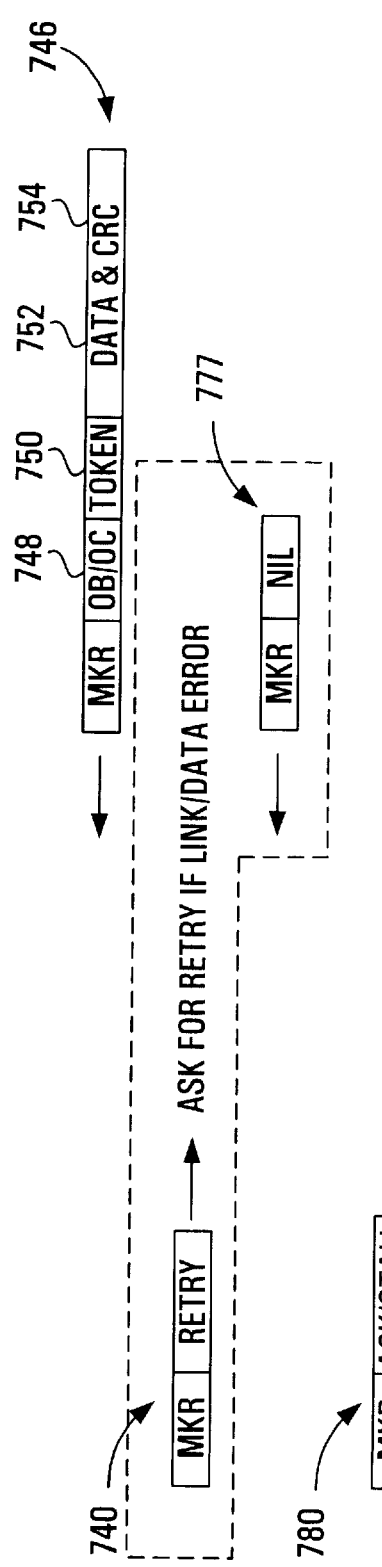
FIG. 15F is a diagram showing an Out bulk/control LAN transaction according to the preferred variant of the USB protocol used for communications between the LAN hub and the enhanced attachment unit.
Figure 15G:
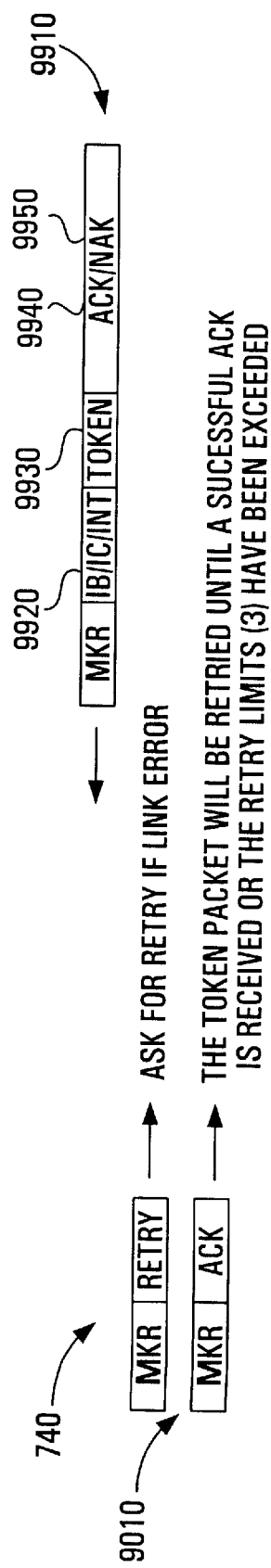
FIG. 15G is a diagram showing an In bulk/control/interrupt LAN transaction according to the preferred variant of the USB protocol used for communications between the LAN hub and the enhanced attachment unit.

Referring to FIG. 15E, whenever the LAN computer 260 wishes to obtain data using isochronous communications, the LAN computer 260 sends an In token packet (containing an In token) to the enhanced attachment unit 240 according to the USB protocol. The In token contains the first USB address of the USB device 100 or 180. Upon receipt of the In token packet, the enhanced attachment unit 240 sends a In LAN packet 756 to the LAN hub 10. The In LAN packet 756 contains the fields 758 indicating the type of transaction (i.e. isochronous in this case) and the In token 760. If the LAN hub 10 does not receive the In LAN packet 756 error free, the LAN hub 10 sends the retry LAN packet 740 to the enhanced attachment unit 240. Upon receipt of the retry LAN packet 740, the enhanced attachment unit 240 resends the In LAN packet 756. Upon error free reception of the In LAN packet 756, the LAN hub 10 sends a response LAN packet 762 to the enhanced attachment unit 240. If the LAN hub 10 has any data to send to the enhanced attachment unit 240, the response LAN packet 762 will contain data. If the LAN hub 10 does not have any data to send to the enhanced attachment unit 240, the response LAN packet 762 will contain a NAK. If the LAN hub 10 is in a condition that prevents it from sending data or if the USB device is in a condition that prevents it from sending data, the response LAN packet 762 will contain a stall. If the response LAN packet 762 contains data, the enhanced attachment unit 240 computes the CRC for the response LAN packet 762. The enhanced attachment unit 240 compares the computed CRC with the CRC 770 carried within the response LAN packet 762. If the computed CRC and the CRC 770 do not match and if there is time to resend the response LAN packet 762 within the same frame, the enhanced attachment unit 240 sends the retry LAN packet 740 to the LAN hub 10. Upon receipt of the retry LAN packet 740, the LAN hub 10 resends the In LAN packet 756. It should be noted that the LAN hub 10 will typically send a response LAN packet 762 containing data to the enhanced attachment unit 240 since data should be normally available at the LAN hub 10. The LAN hub 10 typically obtains data from an outer hub device according to the isochronous schedule. (Unless the USB device is disconnected or stalled).

Figure 15H:
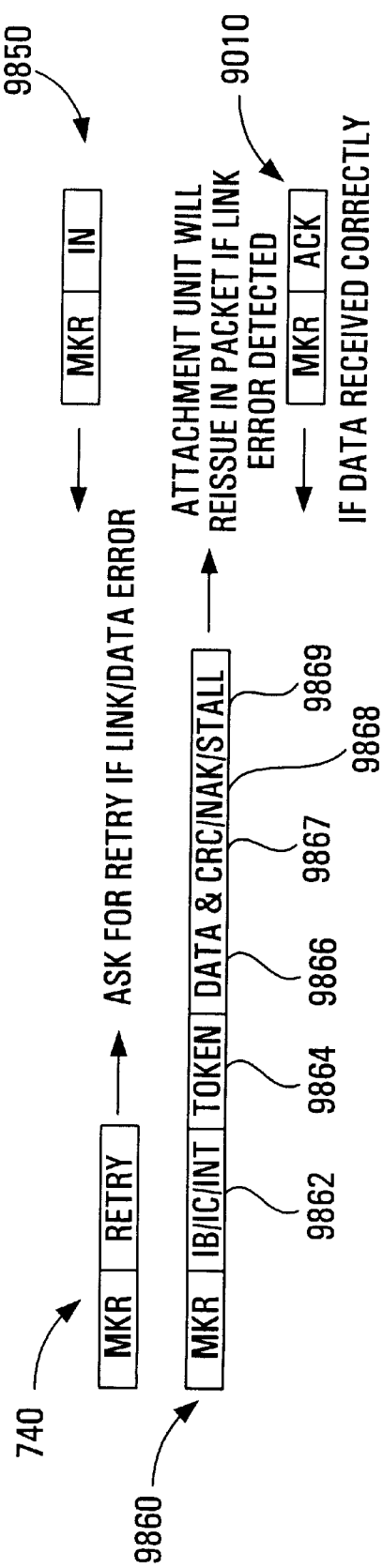
FIG. 15H is a diagram showing an In LAN transaction not initiated by a LAN computer according to the preferred variant of the USB protocol used for communications between the LAN hub and the enhanced attachment unit.
Figure 15I:
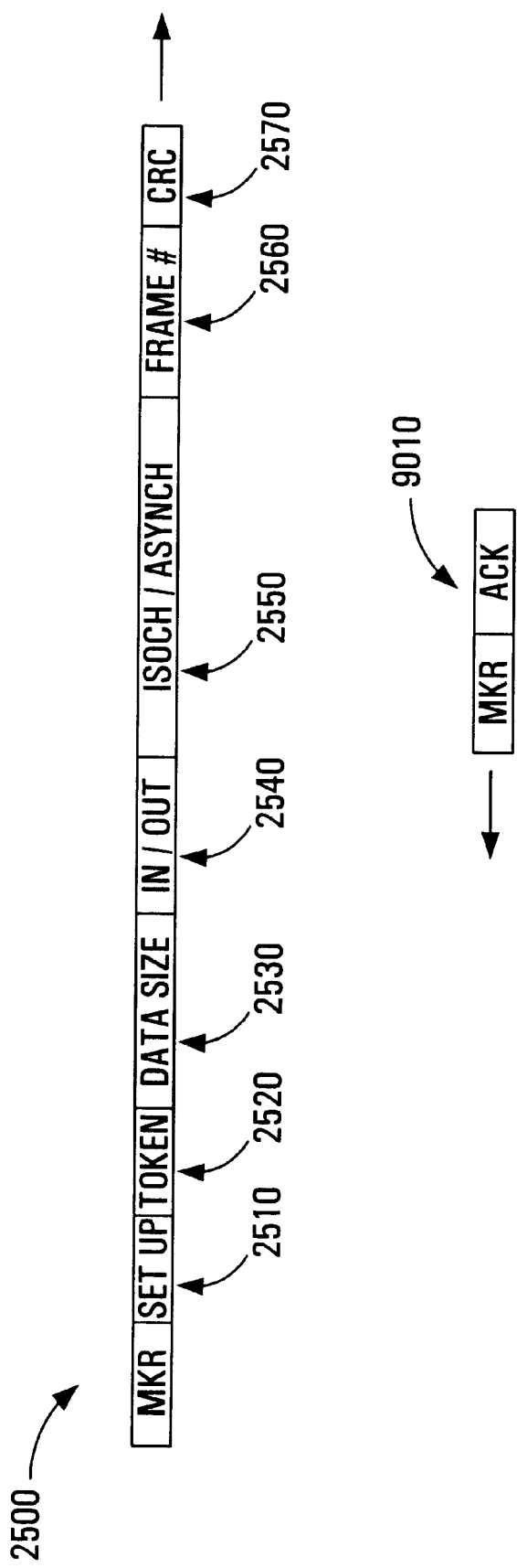
FIG. 15I is a diagram showing a set up LAN packet and an associated packet for setting up a virtual endpoint in an enhanced attachment unit.
Figure 15J:
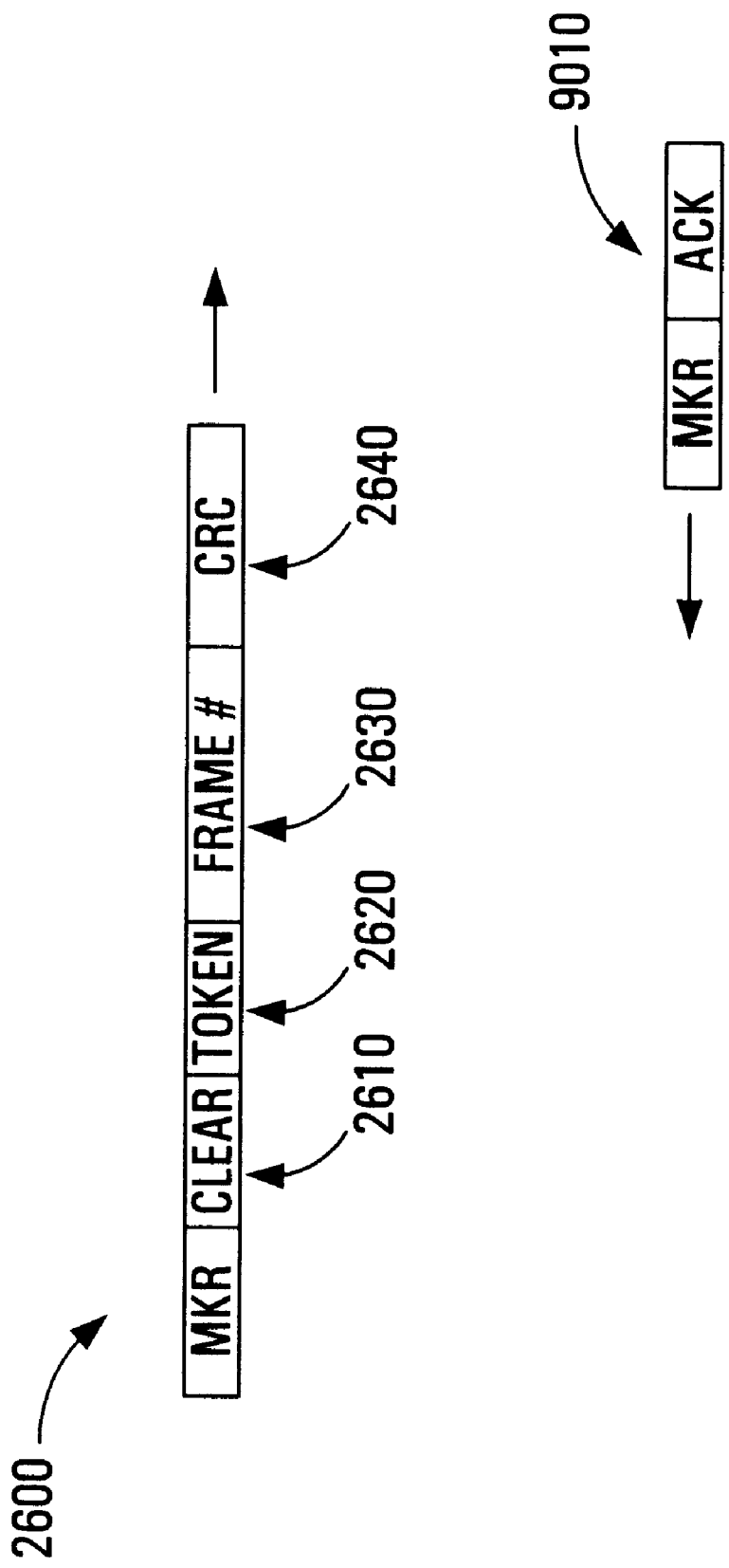
FIG. 15J is a diagram showing a clear LAN packet and an associated packet for clearing a virtual endpoint in an enhanced attachment unit.

Referring to FIG. 15H, the enhanced attachment unit 240 continually sends an In LAN packet 9850 to the LAN hub 10 when no LAN computer 260 initiated transactions are pending. The In LAN packet 9850 is used to obtain data for the enhanced attachment unit 240 to reply to future In tokens (bulk/interrupt/control, etc.) received over the USB link 270 or to obtain set-up packets and clear packets. If the LAN hub 10 does not receive the In LAN packet 9850 error free, the LAN hub 10 sends the retry LAN packet 740 to the enhanced attachment unit 240 whereupon the enhanced attachment unit 240 resends the In LAN packet 9850. Upon error free reception of the In LAN packet 9850, the LAN hub 10 sends a response LAN packet 9860, a set-up packet 2500 or a clear packet 2600 to the enhanced attachment unit 240. The response LAN packet 9860 typically consists-of a field 9862 indicating the type of transaction (bulk, control, interrupt) an In token 9864, data 9866 and a CRC 9867. The In token 9864 is used to specify which USB device and end point the data is associated with. If the LAN hub 10 does not have any data to send, the LAN hub 10 sends a response LAN packet 9860 with a NAK 9868. If the USB device or the LAN hub 10 is in a condition that prevents normal operation, the LAN hub 10 sends a response LAN packet 9860 with a stall 9869. Upon error free reception of the response LAN packet 9860, the enhanced attachment unit 240 sends an ACK handshake packet 9010 to the LAN hub 10. Upon error free reception of the ACK handshake LAN packet 9010, the LAN hub 10 clears its transmit buffer 480.

Referring to FIG. 15G, whenever the LAN computer 260 wishes to obtain data using asynchronous communications, the LAN computer 260 sends an In token packet to the enhanced attachment unit 240 according to the USB protocol. The In token packet contains an In token with the first USB device address for the USB device 100 or 180. Upon error free reception of the In token packet, the enhanced attachment unit 240 sends data to the LAN computer 260 if the enhanced attachment unit has data to send (associated with the specific USB device address and endpoint) otherwise the attachment unit replies with NAK. If the LAN computer 260 receives the data packet error free, the LAN computer sends an ACK. The enhanced attachment unit also sends a In LAN packet 9910 to the LAN hub 10 containing an In token 9930 and either an ACK 9940 or a NAK 9950 depending on the handshake packet received/sent by the enhanced attachment unit 240 from/to the LAN computer 260. (ACK received or NAK sent).

If the LAN hub 10 receives a corrupted In LAN packet 9910, the LAN hub 10 sends the retry LAN packet 740 to the enhanced attachment unit 240. Upon reception of the retry LAN packet 740, the enhanced attachment unit 240 resends the In LAN packet 9910. Upon error free reception of the In LAN packet 9910, the LAN hub 10 sends an ACK handshake packet 9010 to the enhanced attachment unit 240. Upon error free reception of a In LAN packet 9910 containing an ACK 9940, the LAN hub 10 clears its transmit buffer 480 and attempts to obtain more data from the same end point of the same USB device 100 or 180.

In response to an In token packet from the LAN computer 260, the enhanced attachment unit sends a NAK packet to the LAN computer 260 if the enhanced attachment unit does not have any appropriate data to send. In addition, the enhanced attachment unit sends an In LAN packet 9910 containing a NAK 9950 to the LAN hub 10. Upon error free reception of the In LAN packet 9910 containing the NAK 9950, the LAN hub 10 attempts to obtain data for the end point of the USB device associated with in the In token 9930.

Figure 16:
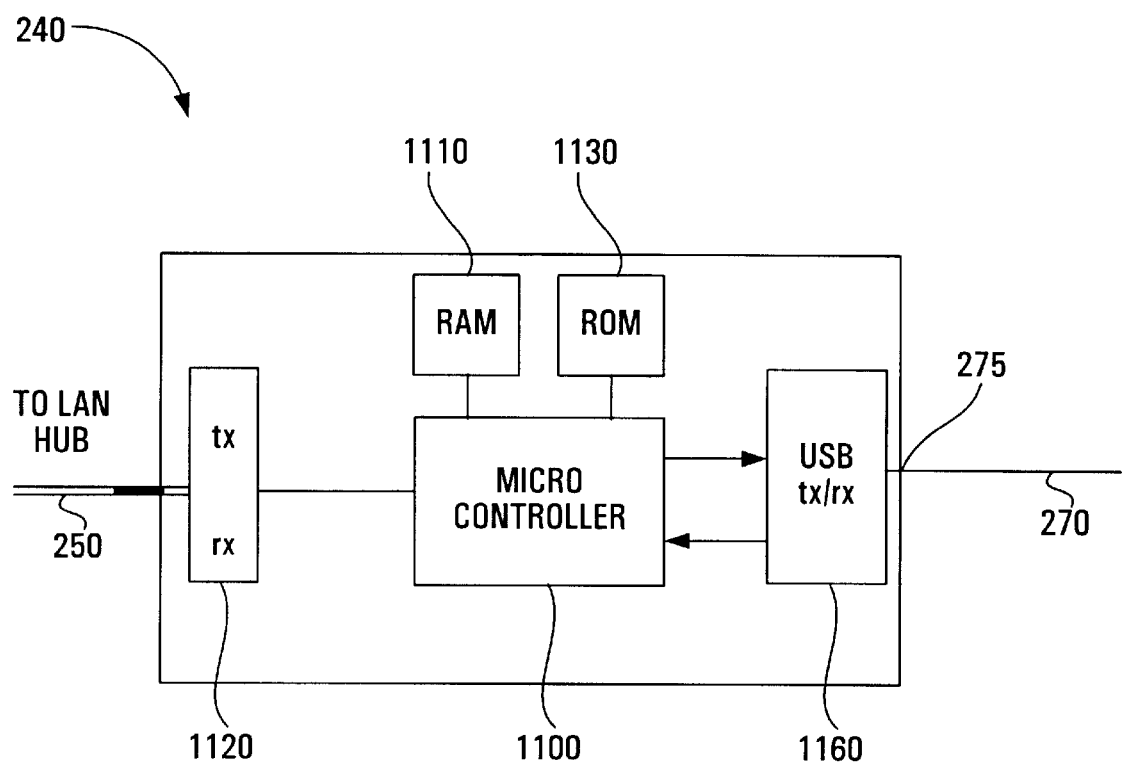
FIG. 16 is a block diagram of an enhanced attachment unit shown in FIG. 7.

FIG. 16 shows a block diagram of the enhanced attachment unit 240. The enhanced attachment unit 240 typically comprise LAN hub communication means for communicating with the LAN hub, USB computer communication means for communicating with the LAN computer 260 and control logic means connected to the LAN hub communication means and to the USB computer communication means. The LAN hub communication means comprise a LAN transceiver 1120. The USB computer communication means comprise a USB transceiver 1160. Since the enhanced attachment unit must be able to simulate a hub device, a communications manager virtual device (CMD) 1020 and one or more remote USB devices of unspecified characteristics, the preferred embodiment of the control logic means comprises a micro controller 1100 connected to the LAN transceiver 1120 and to the USB transceiver 1160, a RAM unit 1110 connected to the micro controller 1100 and a ROM unit 1130 connected to the micro controller 1100. The LAN transceiver 1120 is connected to the LAN hub 10 via LAN link 250. The USB transceiver 1160 is connected to the LAN computer 260 via USB link 270. In particular, the USB link 270 is connected to a USB port 275 of the USB transceiver 1160.

Amongst other things, the RAM unit 1110 stores data structures for every simulated USB device which contain: an address for the USB device assigned by the LAN computer 260, a number for all the end points, memory locations (or buffers) for each end point, a register describing the nature of each end point (bulk/control transfer, isochronous, etc.) and a register for each buffer indicating its status (full/empty, etc.).

The enhanced attachment unit 240 communicates with the LAN computer 260 in the following way: The LAN computer 260 sends token packets to devices connected to it. The USB transceiver 1160 receives each token packet from the LAN computer 260 and carries each token packet to the micro controller 1100. The micro controller 1100 examines its data structures and determines whether the device address in the token packet corresponds with any of the device addresses in the data structures in the RAM unit 1110. If so, the micro controller 1100 examines the end point number and the type of transaction contained within the token packet. If the type of transaction is an Out transaction, a data packet should follow the token packet within a specific period of time (i.e. the USB time limit) according to the USB protocol. The data packet will be received by the transceiver 1160 and carried to the micro controller 1100. If the buffer associated with the end point is empty (empty under LAN hub 10 control), the micro controller 1100 will write the data into the buffer and set the status of the buffer to full. If the type of transaction is an asynchronous transaction and the data packet was received error-free, the micro controller will send an ACK or acknowledgment packet to the USB transceiver 1160 within the USB time limit after receiving the data packet. The USB transceiver 1160 will transmit the acknowledgement packet to the LAN computer 260. If the buffer associated with the end point was not empty and the transaction is an asynchronous transaction, the data would not be transferred into the buffer and the micro controller 1100 would send a NAK packet to the USB transceiver 1160. The USB transceiver 1160 would transmit the NAK handshake packet to the LAN computer 260. (The LAN computer 260 would retry the Out token and the data in the future and would succeed when the LAN hub 10 has emptied the buffer).

If the buffer associated with the endpoint is not empty and the type of transaction is isochronous, the micro controller 1100 will over-write any data in the buffer with the data in the data packet and the buffer is set to ready/full. When the buffer is set to ready/full, the data in the buffer is sent to the LAN hub 10 in an Out LAN packet.

If the type of transaction is an In transaction (as indicated by the token packet sent by the LAN computer 260), and the type of transaction is not an isochronous transaction, and the buffer associated with the end point is empty (because the LAN hub 10 has not filled it yet), the micro controller 1100 sends a NAK packet to the USB transceiver 1160. The USB transceiver 1160 carries the NAK handshake packet to the LAN computer 260. If the In transaction is an isochronous transaction, and the attachment unit 110 is in a condition that prevents normal operation, no response is generated and sent. On the other hand, for all types of transactions, if the buffer is full, the micro controller sends the data from the buffer in a data packet to the USB transceiver 1160. The USB transceiver 1160 transmits the data packet to the LAN computer 260. After the data packet is sent to the LAN computer 260, if the transaction is an isochronous type of transaction, the buffer is cleared. However, if a transaction is a non-asynchronous type of transaction, the buffer is only cleared if the enhanced attachment unit 240 receives an ACK handshake packet from the LAN computer 260. (The ACK handshake packet is received by the USB transceiver 1160 and carried to the micro controller 1100).

Similarly, communications between the LAN hub 10 and the enhanced attachment unit 240 over the LAN link 250 take place as follows:

The micro controller creates LAN packets in response to USB transactions over the USB link 270 which are carried to the LAN transceiver 1120 for transmission back to the LAN hub 10 according to the variant of the USB protocol. LAN packets from the LAN hub 10 which are received by the LAN transceiver 1120 are carried to the micro controller 1100. The micro controller analyses each LAN packet. If the LAN packet received by the enhanced attachment unit 240 contains data for an end point of a USB device, the data is placed in a buffer associated with that end point in the RAM unit 1110 only if the buffer is empty unless the transaction is isochronous in which case any previous data in the buffer is over-written. Otherwise, the data is ignored. In addition, if the type of LAN transaction is an asynchronous transaction and the data is placed in a buffer in RAM unit 1110, the micro controller 1100 creates a response LAN packet containing an ACK. If the type of LAN transaction is an asynchronous transaction and the data is not placed in a buffer in RAM unit 1110 (since the buffer is not empty), the Micro controller 1100 creates a response LAN packet containing a NAK. The response LAN packet is carried to the transceiver 1120 for transmission to the LAN hub 10. If the enhanced attachment unit 240 is in a condition that prevents normal operation, the micro controller 1100 creates a response LAN packet containing a stall. The response LAN packet containing the stall is carried to the LAN transceiver 1120 for transmission back to the LAN hub 10.

The LAN hub 10 ensures that isochronous buffers and end points are filled and emptied according to their defined requirements (understood through the end point description data with the USB device only simulated if the LAN hub 10 has the capacity to accommodate such a simulated attachment). For the rate of filling/emptying the non-isochronous buffer/end points, different algorithms can apply. The LAN hub could either choose to access these at a fixed rate or variable rates. The LAN hub 10 could have a look up table which specifies what is the best assess rate for each type of USB device or end point. Alternatively, a user could interact with the communications manager virtual device 1020 to select a certain access rate for the USB device when it is initially attached (simulated). The specification of such algorithms are not part of this invention. It should be known that one of the simulated devices that can be attached using the enhanced attachment unit 240 is the virtual modem.

In another aspect of this invention, there is a virtual modem bridge which can be used to two USB host devices. A USB host device is a device with at least one USB host port controlled by USB host software. (e.g. A host computer, an end hub 80 connected to a LAN hub 10 or a composite end hub 160 connected to a LAN hub 10). A USB host port is a USB port to which a USB device is typically connected. (The end hub 80 has at least one USB host port 82; the composite end hub 160 has at least one USB host port 182). For example, the virtual modem bridge 200 can join or bridge two individual host computers using the USB protocol or can be used to bridge a host computer to a USB end hub 80 (or to a composite hub 160) connected to a LAN hub 10.

Figure 17:
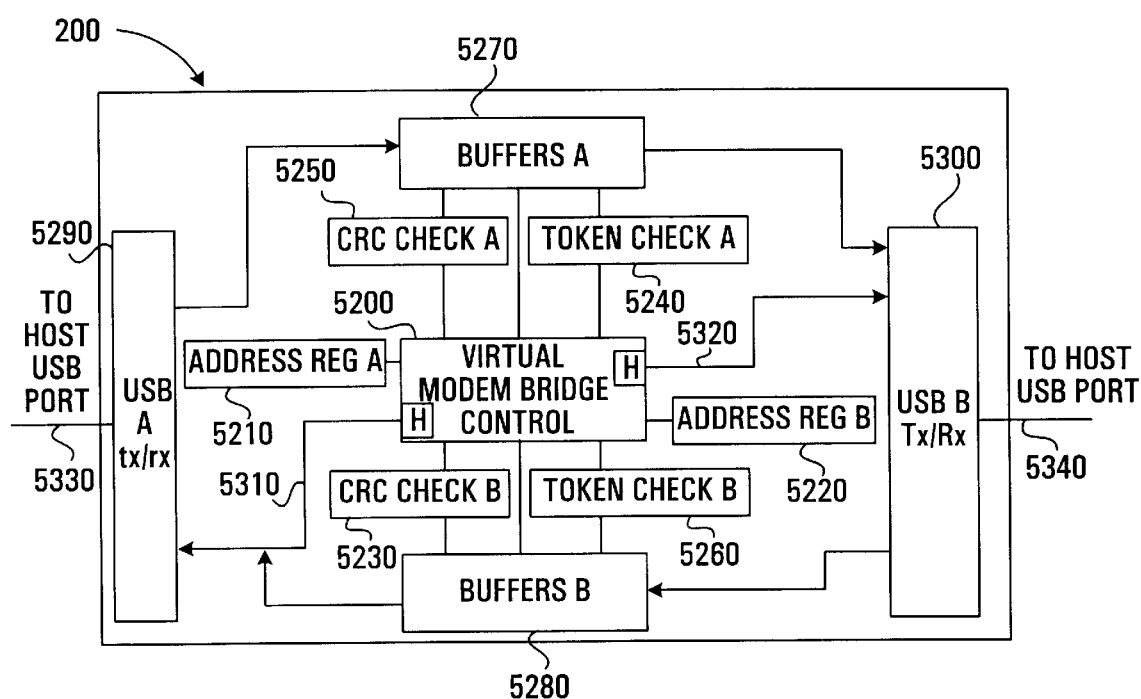
FIG. 17 is a block diagram of a virtual modem bridge shown in FIG. 7.

Referring to FIG. 17, the virtual modem bridge 200 typically comprises a first USB host device communication means for communicating with a first USB host device, a second USB host device communication means for communicating with a second USB host device and control logic means connected to the first USB host device communication means and to the second USB host device communication means. The first USB host device communication means comprises a USB transceiver A 5290. The second USB host device communication means comprise a USB transceiver B 5300. The USB transceiver A 5290 and the USB transceiver B 5300 have USB ports 5330 and 5340 respectively. The control logic means typically comprise a virtual modem bridge control unit 5200, an address register A 5210, an address register B 5220, a CRC check unit A 5240, a CRC check unit B 5230, a token check unit A 5250, a token check unit B 5260, buffers A 5270, and buffers B 5280. The address register A 5210, the address register B 5220, the CRC check unit A 5240, the CRC check unit B 5230, the token check unit A 5250, the token check unit B 5260 are connected to the virtual modem bridge control unit 5200. The buffers A 5270 are connected to the virtual modem bridge control unit 5200, to the CRC check unit A 5240, to the token check unit A 5250, the USB transceiver A 5290 and to the USB transceiver B 5300. A handshake line A 5310 is also connected from the virtual modem bridge control unit 5200 to the USB transceiver A 5290. A handshake line B 5320 is also connected from the virtual modem bridge control unit 5200 to the USB transceiver 5300. The buffers B 5280 are connected to the virtual modem bridge control unit 5200, to the CRC check unit B 5230, to the token check unit B 5260, to the USB transceiver A 5290 and to the USB transceiver B 5300.

Buffers A 5270 typically comprise a temporary buffer A0, a transmit buffer A2, a receive buffer A1, a receive control buffer A1 and a transmit control buffer A2. Similarly, buffers B 5280 typically comprise a temporary buffer B0, a receive buffer B1, a transmit buffer B2, a transmit control buffer B2 and a receive control buffer B1. From the perspective of USB port A 5330, the virtual modem bridge 200 has three end points: control end point 0, end point 1 and end point 2. USB packets are sent to end point 1. USB packets are read from end point 2. To avoid confusion, control end point 0, end point 1 and end point 2 will be called control end point A0, end point A1, and end point A2 respectively. Similarly, from the perspective of USB port B 5340, the virtual modem bridge 200 also has three end points: control end point 0, end point 1 and end point 2. To avoid confusion, control end point 0, end point 1 and end point 2 will be called control end point B0, end point B1, and end point B2 respectively. Each end point A1, A2 has a corresponding buffer—receive buffer A1 and transmit buffer A2 respectively. Similarly, each end point B1, B2 has a corresponding buffer—receive buffer B1 and transmit buffer B2 respectively. Control end point A0 uses two buffers—receive control buffer A1 and transmit control buffer A2. Similarly, control end point B0 uses two buffers receive control buffer B1 and transmit control buffer B2.

Shortly after a USB host device is connected to the USB port A 5330, the host software in the host computer or the device will detect the connection of the virtual modem bridge 200 during one of its regular polls. The USB host software will send a reset command to the virtual modem bridge 200. Once the virtual modem bridge 200 is reset, the USB host software will begin addressing the virtual modem bridge 200 using USB device address 0 and control end point A0. The USB host software will typically issue a set device address command to control end point A0 of the virtual modem bridge 200 to assign a unique USB device address to the virtual modem bridge 200. The set device address command typically comprises a setup token packet and a data packet containing the address. The setup token packet and the data packet are received by the USB transceiver A 5290 through the USB port A 5330. The setup token packet and the data packet are carried from the USB transceiver A 5290 to the receive control buffer A1 in buffers A 5270. The virtual modem bridge control unit 5200 carries the setup token packet to the token check unit A 5250. The virtual modem bridge control unit 5200 also carries the data packet to the CRC check unit A 5240. The token check unit A 5250 determines whether the token packet received is valid. The CRC check unit A 5240 computes the CRC for the data packet and compares the computed CRC with the CRC carried with the data packet. If the token packet is valid and if the CRC's match, the virtual modem bridge control unit 5200 carries the data to the address register A 5210. In addition, the virtual modem bridge control unit 5200 creates an ACK handshake packet and sends it to the USB transceiver A 5290 via the handshake line A 5310. The USB transceiver A 5330 sends the ACK handshake packet to the USB host software. If the token packet is invalid or if the check sums do not match, the virtual modem bridge 200 does not send any response to the USB host software. If the USB host software does not receive an ACK handshake packet or receives a corrupted ACK handshake packet, the USB host software will resend the token packet and the data packet containing the new USB device address.

Next, the USB host software will typically issue a get description command via the USB host device to the control end point A0 of the virtual modem bridge 200 using the new USB device address. The virtual modem bridge 200 will respond with a USB standard device description which identifies it as a virtual modem bridge. Upon recognition of the attached virtual modem bridge 200, the USB host software will communicate with the corresponding client software to set up communications with the virtual modem bridge 200. The client software will know the attributes of the virtual modem bridge 200 and will inform the USB host software. The USB host software will send a configuration command to control end point A0 of the virtual modem bridge 200 to configure the virtual modem bridge 200 for use (i.e. setting up appropriate data buffers in the LAN computer for each of its endpoint).

Similarly, whenever a USB host device is connected to USB port 5340, the USB host software sets up the virtual modem bridge 200 in the same way. i.e. the virtual modem bridge 200 is reset, is given a new unique USB device address which is stored in the address register B 5220, and the client software in the USB host software places the virtual modem bridge 200 in a configured state.

Whenever the USB host device connected to the USB port A 5330 wishes to send information to the USB host device connected to USB port B 5340, the host computer or the USB host device connected to USB port A 5330 sends an Out token packet and a data packet to end point A1. The Out token packet and the data packet are received by the USB transceiver A 5290. The Out token packet and the data packet are carried from the USB transceiver A 5290 to the temporary buffer A0 in buffers A 5270. If the receive buffer A1 is empty, the In token packet and the data packet is carried to the receive buffer A1. If the receive buffer A1 is not empty and the type of transaction is asynchronous, the token packet and the data packet are ignored. In addition, the control unit 5200 creates a NAK handshake packet which is carried to the USB transceiver A 5290 for transmission to the host computer or USB host device. If the receive buffer A1 is not empty and the type of transaction is isochronous, the token packet and the data packet overwrites any packets in the receive buffer A1.

Once the receive buffer A1 contains the token packet and the data packet, the virtual modem bridge control unit 5200 carries the token packet to the token check unit A 5250 and carries the data packet to the CRC check unit A 5240. The token check unit A 5270 determines whether the token packet is valid. The CRC check unit A 5240 computes a CRC for the data packet and compares the computed CRC with the CRC carried in the data packet. If the CRC in the data packet matches the computed CRC and if the type of transaction is asynchronous, the virtual modem bridge control unit 5200 creates an ACK handshake packet and carries the ACK handshake packet to the USB transceiver A 5290.

If the type of transaction is isochronous and if the Out token packet is valid and the CRC in the data packet matches the computed CRC, the virtual modem control unit 5200 carries the data packet to the transmit buffer B2 in buffers B 5280 and clears the receive buffer A1. If the type of transaction is asynchronous, if the transmit buffer B2 is empty and if the Out token packet is valid and the CRC in the data packet matches the computed CRC, the virtual modem control unit 5200 carries the data packet to the transmit buffer B2 in buffers B 5280 and clears the receive buffer A1. If the type of transaction is asynchronous and the transmit buffer B2 is not empty, the virtual modem bridge control unit 200 waits until the transmit buffer B2 is empty before placing the data packet in the transmit buffer B2 and clearing the receive buffer A1. If the token packet is invalid or the CRC's do not match or both, the virtual modem bridge 200 does not send any response back to the host computer or the USB host device connected to the USB port A 5330.

When the host computer or the USB host device connected to USB port 5340 wishes to obtain this data the USB host software in the host computer or the USB host device sends an In token packet. The In token packet is received by USB transceiver B 5300. The In token packet is carried from the USB transceiver B 5300 to the temporary buffer 2 in buffers B 5280. If the receive buffer B1 is empty, the In token packet is carried to the receive buffer B1. If the receive buffer B1 is not empty and the type of transaction is asynchronous, the token packet is ignored. In addition, the control unit 5200 creates a NAK handshake packet which is carried to the USB transceiver B 5300 for transmission to the host computer or USB host device connected to the USB port B 5340. If the receive buffer B1 is not empty and the type of transaction is isochronous, token packet overwrites any packet in the receive buffer B1.

Once the receive buffer B1 contains the In token packet, the In token packet is carried to the token check unit B 5260. The token check unit B 5260 determines whether the In token packet is valid. If the In token packet is valid, the virtual modem bridge control unit 5200 determines whether there is any data in transmit buffer B2. If there is data in transmit buffer B2, the virtual modem bridge control unit 5200 moves the data packet to the USB transceiver B 5300 for transmission to the host computer or the USB host device connected to the USB port B 5340. If there is no data in transmit buffer B2 and if the type of transaction is asynchronous, the virtual modem bridge control unit 5200 creates a NAK handshake packet which is carried to the USB transceiver B 5300 via handshake line B 5320.

If the USB transceiver 5300 sends data from buffer B2 to the host computer or USB host device connected to the USB port 5340 and the type of transaction is isochronous, the transmit buffer B2 is cleared by the virtual modem bridge control unit 5200. If the USB transceiver 5300 sends data from buffer B2 to the host computer or USB host device connected to the USB port 5340 and the type of transaction is asynchronous, the transmit buffer B2 is only cleared by the virtual modem bridge control unit 5200 if the virtual modem bridge 200 receives an ACK handshake packet from the host computer or USB host device connected to the USB port B 5340.

A similar process occurs when the host computer or the USB host device connected to USB port 5340 wishes to send data to the host computer or the USB host device connected to USB port 5330.

In another aspect of the invention, there is provided a composite end hub 160. Essentially a composite end hub 160 is a combination of the enhanced attachment unit 240 and the end hub 80 with one significant change. A USB device related communications signal for the USB devices 180 and a computer related communications signal for the LAN computer 190 are multiplexed onto a single LAN link 170. In general, the LAN link 170 should handle the combined capacity of the USB device related communications signal and the computer related communications signal. The multiplexing used may be symbol by symbol, LAN packet by LAN packet or the USB device related signals and the computer related communications signals can be transmitted on separate carriers or in separate time intervals on a time division multiplexed link.

Figure 18:
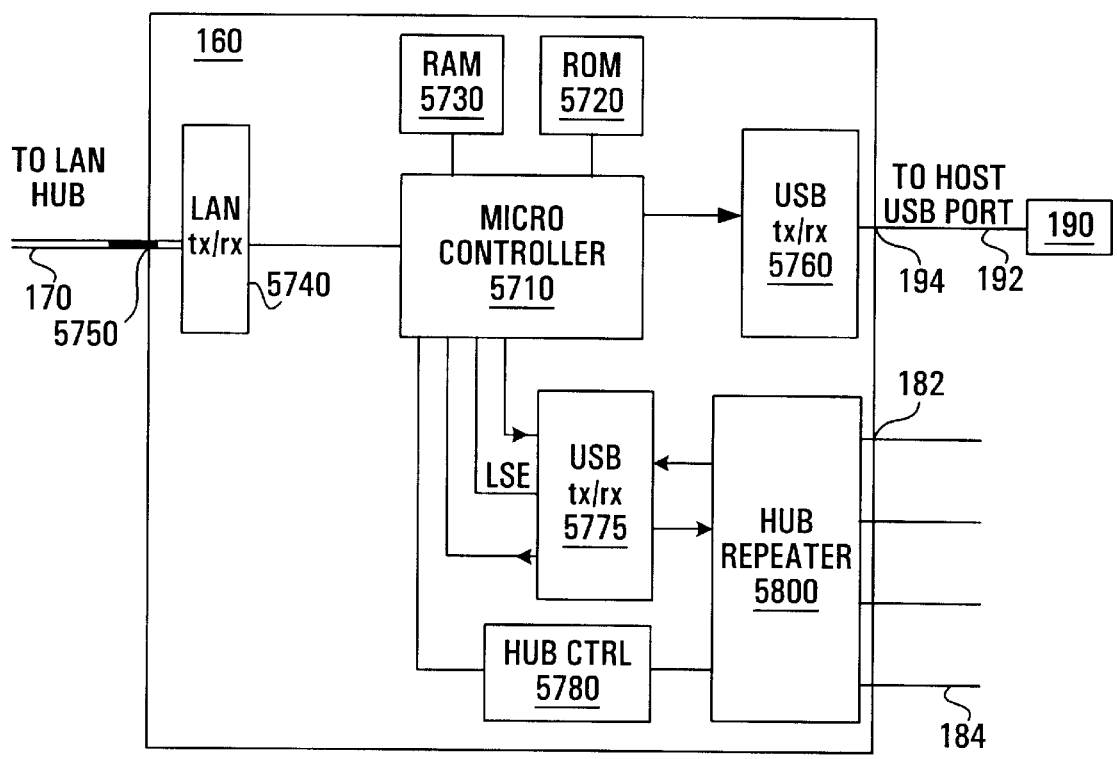
FIG. 18 is a block diagram of a composite end hub shown in FIG. 7.

Referring to FIG. 18, the composite end hub 160 typically comprises LAN hub communication means for communicating with the LAN hub, USB device communication means for communicating with the USB devices 180, USB computer communication means for communicating with the LAN computer 190 and control logic means connected to the LAN hub communication means, to the USB device communication means and to the USB computer communication means. The LAN hub communication means comprise a LAN transceiver 5740. The LAN transceiver has a LAN port 5750. The LAN link 170 is connected to the LAN port 5750. The USB device communication means comprise a first USB transceiver 5775 and a hub repeater 5800 connected to the USB transceiver 5775. The USB computer communication means comprise a second USB transceiver 5760. The hub repeater 5800 has a plurality of USB ports

182. The second USB transceiver has a USB port 194. The control logic means typically comprise a micro controller 5710 connected to the LAN transceiver 5740, to the first USB transceiver 5775 and to the second USB transceiver 5760, a ROM unit 5720 connected to the micro controller 5710, a RAM unit 5730 connected to the micro controller 5710 and a hub control unit 5780 connected to the micro controller 5710 and to the first USB transceiver 5775. In addition, a low speed enable line is also connected to the micro controller 5710 and to the first USB transceiver 5775.

The multiplexed communications signal is received by the LAN transceiver 5740 over the LAN link 170. The multiplexed communications signal is carried from the LAN transceiver 5740 to the micro controller 5710. The micro controller 5710 demultiplexes the multiplexed communications signal. In particular, the micro controller 5710 has a real time operating capability that allows the interleaving of processing for the USB device related communications signal with the computer related communications signal.

With respect to the computer related communications signal, the LAN transceiver 5740, the micro controller 5710, the RAM unit 5730, the ROM unit 5720, and the second USB transceiver 5760 function the same way as the transceiver 1120, the micro controller 1100, the RAM unit 1110, the ROM unit 1130 and the USB transceiver 1160 in the enhanced attachment unit 240.

With respect to the USB device related communications signal, the composite end hub functions as follows: The RAM unit 5730 has buffers that emulate the function of the token and data buffer 620 and the data and handshake buffer 630 found in the end hub 80. The micro controller 5710 performs the function of the CRC check unit 685 and the end hub control unit 600 found in the end hub 80. The micro controller passes not only data packets but also handshake packets directly to the first USB transceiver 5775. Consequently, a separate handshake line is not required. The micro controller 5710 is programmed with instructions in the ROM unit 5270 to handle the LAN and USB protocols as previously described.

Other variations of the invention are possible. For example, the attachment unit 110, the enhanced attachment unit 240 or the composite end hub 160 could use Ethernet or IEEE 1394 (sometimes called Firewire) as the protocol between the attachment unit 110, the enhanced attachment unit 240 or the composite end hub 160 and the respective LAN computer.

Another variation would allow control endpoint 0 of the composite hub 160 to be enhanced to allow USB devices 180 to be either virtually attached to another LAN computer 130, 215 or 260 or network device 40 via the LAN hub 10 or be attached to the immediately attached LAN computer 190. The hub repeater 5800 would be enhanced to switch certain ports directly to the USB line 192 and the remaining ports remain controlled from the LAN hub 10. In this way, USB devices 180 can be optionally locally or networked attached as applications warrant. In terms of contention for attached USB devices 180, the control endpoint 0 would likely give preference to the immediately attached LAN computer 190 since a person at that LAN computer 190 would have closer knowledge of the intended application.

We claim:

1. A computer network comprising:
   a LAN hub;
   at least one network device connected to the LAN hub;
   at least one outer hub device connected to the LAN hub via a respective LAN link; and,
   at least one USB device or at least one LAN computer connected to the outer hub device via a respective USB link;
   wherein the USB device or the LAN computer communicates with the outer hub device using a USB protocol;
   wherein the outer hub device communicates with the LAN hub using a LAN protocol;
   wherein the network device communicates with the LAN hub using the LAN protocol or a network protocol;
   wherein, for asynchronous communications, the outer hub device examines USB packets from the USB device or the LAN computer, generates handshake packets in response to the USB packets according to the USB protocol and ensures that the handshake packets are generated within a USB time limit prescribed by the USB protocol after receiving the USB packets;
   wherein the outer hub device buffers data received from the LAN hub to be sent to the USB device in a data packet and ensures that the data packet follows an Out token packet within the USB time limit prescribed by the USB protocol;
   and wherein the outer hub device buffers data received from the LAN hub to be sent to the LAN computer in a data packet and ensures that the data packet is sent to the LAN computer within the USB time limit prescribed by the USB protocol after receiving an In token packet from the LAN computer.

2. A computer network according to claim 1 wherein the LAN hub communicates with the outer hub device using a variant of the USB protocol.

3. A computer network according to claim 2 wherein the outer hub device is an end hub or a composite end hub and wherein the USB device is connected to the end hub or the composite end hub.

4. A computer network according to claim 2 wherein the outer hub device is an attachment unit or an enhanced attachment unit and wherein the LAN computer is connected to the attachment unit or the enhanced attachment unit.

5. A computer network according to claim 2 wherein the outer hub device is a composite end hub.

6. A computer network according to claim 5 wherein the USB device and the LAN computer are connected to the composite end hub.

7. A computer network according to claim 3 wherein the network device is connected to the LAN hub via a dedicated link.

8. A computer network according to claim 3 wherein the network device is connected to the LAN hub via at least one network.

9. A computer network according to claim 8 wherein the network device communicates with the LAN hub using the Internet Protocol (IP).

10. A computer network according to claim 4 wherein the network device is connected to the LAN hub via a dedicated link.

11. A computer network according to claim 4 wherein the network device is connected to the LAN hub via at least one network.

12. A computer network according to claim 11 wherein the network device communicates with the LAN hub using the Internet Protocol (IP).

13. A computer network according to claim 5 wherein the network device is connected to the LAN hub via a dedicated link.

14. A computer network according to claim 5 wherein the network device is connected to the LAN hub via at least one network.

15. A computer network according to claim 14 wherein the network device communicates with the LAN hub using the Internet Protocol (IP).

16. A computer network according to claim 6 wherein the network device is connected to the LAN hub via a dedicated link.

17. A computer network according to claim 6 wherein the network device is connected to the LAN hub via at least one network.

18. A computer network according to claim 17 wherein the network device communicates with the LAN hub using the Internet Protocol (IP).

19. A computer network comprising:
   a LAN hub;
   a first outer hub device connected to the LAN hub via a respective LAN link;
   a second hub device connected to the LAN hub via a respective LAN link;
   at least one USB device or at least one LAN computer connected to the first outer hub device via a respective USB link; and,
   at least one other LAN computer connected to the second outer hub device via a respective USB link;
   wherein the USB device and the LAN computer communicates with the first outer hub device using a USB protocol;
   wherein the other LAN computer communicates with the second outer hub device using a USB protocol;
   wherein the first outer hub device and the second outer hub device communicates with the LAN hub using a LAN protocol;
   wherein, for asynchronous communications, the first outer hub device examines USB packets from the USB device or the LAN computer, generates handshake packets in response to the USB packets according to the USB protocol and ensures that the handshake packets are generated within a USB time limit prescribed by the USB protocol after receiving the USB packets;
   wherein the first outer hub device buffers data received from the LAN hub to be sent to the USB device in a data packet and ensures that the data packet follows an Out token packet within the USB time limit prescribed by the USB protocol;
   wherein the first outer hub device buffers data received from the LAN hub to be sent to the LAN computer in a data packet and ensures that the data packet is sent to the LAN computer within the USB time limit prescribed by the USB protocol after receiving an In token packet from the LAN computer;
   wherein, for asynchronous communications, the second outer hub device examines USB packets from the other LAN computer, generates handshake packets in response to the USB packets according to the USB protocol and ensures that the handshake packets are generated within the USB time limit prescribed by the USB protocol after receiving the USB packets;
   and wherein the second outer hub device buffers data received from the LAN hub to be sent to the other LAN computer in a data packet and ensures that the data packet is sent to the other LAN computer within the USB time limit prescribed by the USB protocol after receiving an In token packet from the other LAN computer.

20. A computer network according to claim 19 wherein the LAN hub communicates with the first outer hub device and the LAN hub communicates with the second outer hub device using a variant of the USB protocol.

21. A computer network according to claim 20 wherein the first outer hub device is an end hub or a composite end hub, wherein the USB device is connected to the first outer hub device, wherein the second outer hub device is an attachment unit, an enhanced attachment unit or a composite end hub and wherein the other LAN computer is connected to the second outer hub device.

22. A computer network according to claim 20 wherein the first outer hub device is an attachment unit, a composite end hub or an enhanced attachment unit, wherein the LAN computer is connected to the first outer hub device, wherein the second outer hub device is an attachment unit, an enhanced attachment unit or a composite end hub and wherein the other LAN computer is connected to the second outer hub device.

23. A computer network according to claim 21 further comprising at least one network device connected to the LAN hub and wherein the network device communicates with the LAN hub using the LAN protocol or a network protocol.

24. A computer network according to claim 23 wherein the network device is connected to the LAN hub via a dedicated link.

25. A computer network according to claim 23 wherein the network device is connected to the LAN hub via at least one network.

26. A computer network according to claim 25 wherein the network device communicates with the network using the Internet Protocol (IP).

27. A computer network according to claim 22 further comprising at least one network device connected to the LAN hub and wherein the network device communicates with the LAN hub using the LAN protocol or a network protocol.

28. A computer network according to claim 27 wherein the network device is connected to the LAN hub via a dedicated link.

29. A computer network according to claim 27 wherein the network device is connected to the LAN hub via at least one network.

30. A computer network according to claim 29 wherein the network device communicates with the network using the Internet Protocol (IP).

31. An end hub for use in a computer network in which the end hub communicates with at least one USB device using a USB protocol and in which the end hub communicates with a LAN hub using a LAN protocol, said end hub comprising:
   LAN hub communication means for communicating with the LAN hub;
   USB device communication means for communicating with the USB device; and,
   control logic means connected to the LAN hub communication means and to the USB device communication means;
   wherein, for asynchronous communications, the control logic means examines USB packets from the USB device, generates handshake packets in response to the USB packets according to the USB protocol and ensures that the handshake packets are generated within a USB time limit prescribed by the USB protocol after receiving the USB packets;
   and wherein the control logic means buffers data received from the LAN hub to be sent to the USB device in a data packet and ensures that the data packet follows an Out token packet within the USB time limit prescribed by the USB protocol.

32. An end hub according to claim 31 wherein the LAN protocol is a variant of the USB protocol.

33. An end hub according to claim 32 wherein the LAN hub communication means comprise a LAN transceiver, the USB device communication means comprise a USB transceiver and a hub repeater connected to the USB transceiver and wherein the control logic means comprise:

an end hub control unit connected to the LAN transceiver;

a token and data buffer connected to the end hub control unit, to the LAN transceiver and to the USB transceiver;

a CRC check unit connected to the end hub control unit;

a data and handshake buffer connected to the end hub control unit, to the CRC check unit, to the LAN transceiver and to the USB transceiver; and, a hub control unit connected to the end hub control unit and to the hub repeater.

34. An attachment unit for use in a computer network in which the attachment unit communicates with at least one LAN computer using a USB protocol and in which the attachment unit communicates with a LAN hub using a LAN protocol, said attachment unit comprising:

LAN hub communication means for communicating with the LAN hub;

USB computer communication means for communicating with the LAN computer; and, control logic means connected to the LAN hub communication means and to the USB computer communication means;

wherein, for asynchronous communications, the control logic means examines US Packets from the LAN computer, generates handshake packets in response to the USB packets according to the USB protocol and ensures that the handshake packets are generated within a USB time limit prescribed by the USB protocol after receiving the USB packets;

and wherein the control logic means buffers data received from the LAN hub to be sent to the LAN computer in a data packet and ensures that the data packet is sent to the LAN computer within the USB time limit prescribed by the USB protocol after receiving an In token from the LAN computer.

35. An attachment unit according to claim 34 wherein the LAN protocol is a variant of the USB protocol.

36. An attachment unit according to claim 35 wherein the LAN hub communication means comprise a LAN transceiver, the USB computer communication means comprise a USB transceiver and wherein the control logic means comprise:

an attachment control unit connected to the LAN transceiver and to the USB transceiver;

endpoint 0 and 2 buffers connected to the LAN transceiver, to the USB transceiver and to the attachment control unit;

a CRC check unit connected to the attachment control unit;

A token check unit connected to the attachment control unit;

Endpoint 0 and 1 buffers connected to the LAN transceiver, to the USB transceiver, to the CRC check unit, to the token check unit and to the attachment control unit; and, an address register connected to the attachment control unit.

37. An enhanced attachment unit for use in a computer network in which the enhanced attachment unit communicates with at least one LAN computer using a USB protocol and in which the attachment unit communicates with a LAN hub using a LAN protocol, said attachment unit comprising:

LAN hub communication means for communicating with the LAN hub;

USB computer communication means for communicating with the LAN computer; and,

Control logic means connected to the LAN hub communication means and to the USB computer communication means;

wherein the control logic means contains logic to virtually connect at least one USB device;

wherein, for asynchronous communications, the control logic means examines USB packets from the LAN computer, generates handshake packets in response to the USB packets according to the USB protocol and ensures that the handshake packets are generated within a USB time limit prescribed by the USB protocol after receiving the USB packets;

and wherein the control logic means buffers data received from the LAN hub to be sent to the LAN computer in a data packet and ensures that the data packet is sent to the LAN computer within the USB time limit prescribed by the USB protocol after receiving an In token packet from the LAN computer.

38. An enhancement attachment unit according to claim 37 wherein the LAN protocol is a variant of the USB protocol.

39. An attachment unit according to claim 38 wherein the LAN hub communication means comprise a LAN transceiver, the USB computer communication means comprise a USB transceiver and wherein the control logic means comprise:

a micro controller connected to the LAN transceiver and to the USB transceiver;

a RAM unit connected to the micro controller; and, a ROM unit connected to the micro controller.

40. A composite end hub for use in a computer network in which the composite end hub communicates with a LAN computer and with at least one USB device using USB protocol and in which an attachment unit communicates with a LAN hub using a LAN protocol, said composite end hub comprising:

LAN hub communication means for communicating with the LAN hub;

USB device communication means for communicating with the at least one USB device;

USB computer communication means for communicating with the LAN computer; and,

Control logic means connected to the LAN hub communication means, to the USB device communication means and to the USB computer communication means;

wherein, for asynchronous communications, the control logic means examines USB packets from the USB device or the LAN computer, generates handshake packets in response to the USB packets according to the USB protocol and ensures that the handshake packets are generated within a USB time limit prescribed by the USB protocol after receiving the USB packets;

wherein the control logic means buffers data received from the LAN hub to be sent to the USB device in a data packet and ensures that the data packet follows an Out token packet within the USB time limit prescribed by the USB protocol;

and wherein the control logic means buffers data received from the LAN hub to be sent to the LAN computer in a data packet and ensures that the data packet is sent to the LAN computer within the USB time limit prescribed by the USB protocol after receiving an In token packet.

41. A composite end hub according to claim 40 wherein the LAN protocol is a variant of the USB protocol.

42. A composite end hub according to claim 41 wherein the LAN hub communication means comprise a LAN transceiver, the USB device communication means comprise a first USB transceiver and a hub repeater connected to the first USB transceiver, the USB computer communications means comprise a second USB transceiver and wherein the control logic means comprise:

a micro controller connected to the LAN transceiver, to the first USB transceiver and to the second USB transceiver;

a RAM unit connected to the micro controller;

a ROM unit connected to the micro controller; and, a hub control unit connected to the micro controller and to the hub repeater.

43. A virtual modem bridge for use with a first USB host device and a second USB host device in which the virtual modem bridge communicates with the first USB host device and the second USB host device using a USB protocol, said virtual modem bridge comprising:

first USB host device communication means for communicating with the first USB host device;

second USB host device communication means for communicating with the second USB host device; and, control logic means connected to the first USB host device communication means and to the second USB host device communication means;

wherein, for asynchronous communications, the control logic means examines USB packets from the first USB host device or the second USB host device, generates handshake packets in response to the USB packets according to the USB protocol and ensures that the handshake packets are generated within a USB time limit prescribed by the USB protocol after receiving the USB packets;

wherein the control logic means buffers data received from the first USB host device to be sent to the second USB host device in a data packet and ensures that the data packet is sent to the second USB host device within the USB time limit prescribed by the USB protocol after receiving an In token packet from the second USB host device;

and wherein the control logic means buffers data received from the second USB host device to be sent to the first USB host device in a data packet and ensures that the data packet is sent to the first USB host device within the USB time limit prescribed by the USB protocol after receiving an In token packet from the first USB host device.

44. The combination of a virtual modem bridge according to claim 43, a first computer connected to the virtual modem bridge and a second computer connected to the virtual modem bridge wherein the first computer and the second computer communicate with the virtual modem bridge using the USB protocol.

45. The combination of the virtual modem bridge of claim 43 and a computer network comprising a LAN hub; at least one network device connected to the LAN hub; at least one outer hub device connected to the LAN hub via a respective LAN link; and, at least one USB device or at least one LAN computer connected to the outer hub device via a respective USB link; wherein the USB device or the LAN computer communicates with the outer hub device using a USB protocol;

wherein the network device communicate with the LAN hub using the LAN protocol or a network protocol;

wherein, for asynchronous communications, the outer hub device examines USB packets from the USB device or the LAN computer, generates handshake packets in response to the USB packets according to the USB protocol and ensures that the handshake packets are generated within a USB time limit prescribed by the USB protocol after receiving the USB packets;

wherein the outer hub device buffer data received from the LAN hub to be sent to the USB device in a data packet and ensures that the data packet follows an out token packet within the USB time limit prescribed by the USB protocol;

and wherein the outer hub device buffers data received from the LAN hub to the sent to the LAN computer in a data packet and ensures that the data packet is sent to the LAN computer within the USB time limit prescribed by the USB protocol after receiving an In token packet from the LAN computer, wherein said computer network includes at least one end hub as the at least one outer hub device, and said virtual modem bridge is connected to the end hub, and a computer connected to the virtual modem bridge wherein the end hub and the computer communicates with the virtual modem bridge using the USB protocol.

46. A method of increasing the distance between a host computer and a USB device where the host computer communicates with the USB device using a USB protocol, said method for sending data from the host computer to the USB device comprising:

(A) Transmitting an Out token packet and a data packet (collectively the "USB packets") from the host computer to a first outer hub device using the USB protocol;

(B) For asynchronous communications, examining the USB packets at the first outer hub device, generating an appropriate handshake packet at the first outer hub device according to the USB protocol and transmitting the handshake packet from the first outer hub device to the host computer within a USB time limit prescribed by the USB protocol after receiving the USB packets;

(C) For asynchronous communications, re-transmitting the USB packets from the host computer to the first outer hub device using the USB protocol if a NAK handshake packet is received by the host computer or if no handshake packet was received by the host computer within the USB time limit prescribed by the USB protocol;

(D) Converting the USB packets into at least one LAN packet according to a LAN protocol at the first outer hub device;

(E) Transmitting the LAN packet from the first outer hub device to a second outer hub device using the LAN protocol;

(F) Reconstructing the USB packets from the LAN packet at the second outer hub device;

(G) Transmitting the USB packets from the second outer hub device to the USB device using the USB protocol ensuring that the data packet follows the token packet within the USB time limit prescribed by the USB protocol;

(H) For asynchronous communications, examining the USB packets at the USB device, generating an appropriate handshake packet at the USB device according to the USB protocol and transmitting the handshake packet from the USB device to the second outer hub device within the USB time limit prescribed by the USB protocol after receiving the USB packets;

(I) For asynchronous communications, re-transmitting the USB packets using the USB protocol from the second outer hub device to the USB device ensuring that the data packet follows the token packet within the USB time limit prescribed by the USB protocol if a NAK handshake packet is received by the second outer hub device or if no handshake packet was received by the second outer hub device within the USB time limit prescribed by the USB protocol;

And said method for obtaining data from the USB device for the host computer comprising:

(A) Transmitting an In token packet from the host computer to the first outer hub device using the USB protocol;

(B) If the first outer hub device has data responsive to the In token packet performing the following steps:
  (a) Transmitting a data packet from the first outer hub device to the host computer using the USB protocol; and
  (b) For asynchronous communications, examining the USB data packet at the host according to the USB protocol, generating an appropriate handshake packet at the host computer according to the USB protocol and transmitting the handshake packet from the host computer to the first outer hub device using the USB protocol within a USB time limit prescribed by the USB protocol after receiving the USB data packet;

(C) If the first outer hub device does not have data response to the In token packet, transmitting a NAK handshake packet from the first outer hub device to the host computer;

(D) If the first outer hub device has received a LAN packet indicating a stall, transmitting a stall handshake packet from the first outer hub device to the host computer;

(E) Converting the In packet into at least one LAN packet according to the LAN protocol at the first outer hub device;

(F) Transmitting the LAN packet from the first outer hub device to a second outer hub device using the LAN protocol;

(G) Reconstructing the In token packet from the LAN packet at the second outer hub device;

(H) Transmitting the In token packet from the second outer hub device to the USB device using the USB protocol;

(I) If the USB device has data responsive to the In token packet, performing the following steps:
  (a) transmitting the data in a data packet from the USB device to the second outer hub device using the USB protocol;
  (b) For asynchronous communications, examining the data packet at the second outer hub device, generating an appropriate handshake packet at the second outer hub device according to the USB protocol and transmitting the handshake packet from the second outer hub device to the USB device using the USB protocol within the USB time limit prescribed by the USB protocol after receiving the data USB packet; and,
  (c) Converting the data packet to at least one LAN packet according to the LAN protocol at the second outer hub device;

(J) If the USB device does not have data responsive to the IN token packet, transmitting a NAK handshake packet from the USB device to the second outer hub device using the USB protocol and converting the NAK handshake packet into at least one LAN packet according to the LAN protocol;

(K) If the USB device is in a stalled condition, transmitting a Stall handshake packet from the USB device to the second outer hub device using the USB protocol and converting the Stall handshake packet into at least one LAN packet according to the LAN protocol;

(L) Transmitting the LAN packet from the second outer hub device to the first outer hub device using the LAN protocol;

(M) Reconstructing the data packet, the NAK handshake packet or the Stall handshake packet from the LAN packet at the first outer hub device; and, (N) Storing the data packet, the NAK handshake packet or the stall handshake packet in the first outer hub device.

47. The method according to claim 46 wherein the LAN protocol is a variant of the USB protocol.

48. The method according to claim 47 wherein the first outer hub device is an enhanced attachment unit and the second outer hub device is an end hub or a composite end hub.

49. A method of increasing the distances in a computer network between a host computer and a USB device where the host computer communicates with the USB device using USB protocol, said method for sending data from the host computer to the USB device comprising:

(A) Transmitting an Out token packet and a data packet (collectively the "USB packets") from the host computer to a first outer hub device using the USB protocol;

(B) For asynchronous communications, examining the USB packets at the first outer hub device, generating an appropriate handshake packet at the first outer hub device according to the USB protocol and transmitting the handshake packet from the first outer hub device to the host computer using the USB protocol within the USB time limit prescribed by the USB protocol after receiving the USB packets;

(C) For asynchronous communications, re-transmitting the USB packets from the host computer to the first outer hub device using the USB protocol if a NAK handshake packet is received by the host computer or if no handshake packet was received by the host computer within the USB time limit prescribed by the USB protocol;

(D) Converting the USB packets into at least one LAN packet according to a LAN protocol at the first outer hub device;

(E) Transmitting the LAN packet from the first outer hub device to a LAN hub using the LAN protocol;

(F) Re-transmitting the LAN packet from the LAN hub to a second outer hub device using the LAN protocol;

(G) Reconstructing the USB packets from the LAN packet at the second outer hub device;

(H) Transmitting the USB packets from the second outer hub device to the USB device using the USB protocol ensuring that the data packet follows the Out token packet within the USB time limit prescribed by the USB protocol;

(I) For asynchronous communications, examining the USB packets at the USB device, generating an appropriate handshake packet at the USB device according to the USB protocol and transmitting the handshake packet from the USB device to the second outer hub device using the USB protocol within the USB time limit prescribed by the USB protocol after receiving the USB packets; and, (J) For asynchronous communications, retransmitting the USB packets from the second outer hub device to the USB device using the USB protocol ensuring that the data packet follows the token packet within the USB time limit prescribed by the USB protocol if a NAK handshake packet is received by the second outer hub device or if no handshake packet was received by the second outer hub device within the USB time limit prescribed by the USB protocol;

And said method for obtaining data from the USB device for the host computer comprising:

(A) Transmitting an In token packet from the host computer to the first outer hub device using the USB protocol;

(B) If the first outer hub device has data responsive to the In token packet performing the following steps:
  (a) Transmitting a data packet from the first outer hub device to the host computer using the USB protocol; and
  (b) For asynchronous communications, examining the USB data packet at the host computer, generating an appropriate handshake packet at the host computer according to the USB protocol and transmitting the handshake packet from the host computer to the first outer hub device using the USB protocol within a USB time limit prescribed by the USB protocol after receiving the USB data packet;

(C) Converting the In token packet into at least one LAN packet according to the LAN protocol at the first outer hub device;

(D) Transmitting the LAN packet from the first outer hub device to the LAN hub using the LAN protocol;

(E) Re-transmitting the LAN packet from the LAN hub to the second outer hub device using the LAN protocol;

(F) Reconstructing the In token packet from the LAN packet at the second outer hub device;

(G) Transmitting the In token packet from the second outer hub device to the USB device using the USB packet;

(H) If the USB device has data responsive to the In token packet, performing the following steps:
  (a) transmitting the data in a data packet from the USB device to the second outer hub device using the USB protocol;
  (b) For asynchronous communications, examining the data packet at the second outer hub device, generating an appropriate handshake packet at the second outer hub device according to the USB protocol and transmitting the handshake packet from the second outer hub device to the USB device using the USB protocol within the USB time limit prescribed by the USB protocol after receiving the data USB packet; and,
  (c) Converting the data packet to at least one LAN packet at the second outer hub device;

(I) If the USB device does not have data responsive to the IN token packet, transmitting a NAK handshake packet from the USB device to the second outer hub device using the USB protocol and converting the NAK handshake packet into at least one LAN packet according to the LAN protocol;

(J) If the USB device is in a stalled condition, transmitting a Stall handshake packet from the USB device to the second outer hub device using the USB protocol and converting the Stall handshake packet into at least one LAN packet according to the LAN protocol;

(K) Transmitting the LAN packet from the second outer hub device to the LAN hub using the LAN protocol;

(L) Re-transmitting the LAN packet from the LAN hub to the first outer hub device using the LAN protocol;

(M) Reconstructing the data packet, the NAK handshake packet or the Stall handshake packet from the LAN packet at the first outer hub device; and, (N) Storing the data packet, the NAK handshake packet or the stall handshake packet in the first outer hub device.

50. The method according to claim 49 wherein the LAN protocol is a variant of the USB protocol.

51. The method according to claim 50 wherein the first outer hub device is an enhanced attachment unit and the second outer hub device is an end hub or a composite end hub.

52. A method of increasing the distances in a computer network between a first host computer and a second host computer where the first host computer communicates with the second host computer using a USB protocol, said method for sending data from the first host computer to the second host computer comprising:

(A) Transmitting a token packet and a data packet (collectively the "USB packets") from the first host computer to a first outer hub device using the USB protocol;

(B) For asynchronous communications, examining the USB packets at the first outer hub device, generating an appropriate handshake packet at the first outer hub device according to the USB protocol and transmitting the handshake packet from the first outer hub device to the first host computer using the USB protocol within a USB time limit prescribed by the USB protocol after receiving the USB packets;

(C) For asynchronous communications, re-transmitting the USB packets from the first host computer to the first outer hub device using the USB protocol if a NAK handshake packet is received by the first host computer or if no handshake packet was received by the first host computer within the USB time limit prescribed by the USB protocol;

(D) Converting the USB packets into at least one LAN packet according to a LAN protocol at the first outer hub device;

(E) Transmitting the LAN packet from the first outer hub device to a LAN hub using the LAN protocol;

(F) Re-transmitting the LAN packet from the LAN hub to a second outer hub device using the LAN protocol;

(G) Reconstructing the USB packets from the LAN packet at the second outer hub device;

(H) In response to an In token packet sent from the second host computer to the second outer hub device using the USB protocol, transmitting the USB data packet from the second outer hub device to the second host computer using the USB protocol within the USB time limit prescribed by the USB protocol after receiving the In token packet; and, (I) For asynchronous communications, examining the USB data packet at the second host computer, generating an appropriate handshake packet at the second host computer according to the USB protocol and transmitting the handshake packet from the second host computer to the second outer hub device using the USB protocol within the USB time limit prescribed by the USB protocol after receiving the USB data packet.

53. The method according to claim 52 wherein the LAN protocol is a variant of the USB protocol.

54. The method according to claim 53 wherein the first outer hub device and the second outer hub device is an attachment unit, an enhanced attachment unit or a composite end hub.

55. A method for allowing a first USB host device and a second USB host device to communicate with each other using USB protocol, said method for sending data from the first USB host device to the second USB host device comprising:

(A) Transmitting a token packet and a data packet (collectively the "USB packets") from the first USB host device to a virtual modem bridge using the USB protocol;

(B) For asynchronous communications, examining the USB packets at the virtual modem bridge, generating an appropriate handshake packet at the virtual modem bridge according to the USB protocol and transmitting the handshake packet from the virtual modem bridge to the first USB host device using the USB protocol within a USB time limit prescribed by the USB protocol after receiving the USB packets;

(C) For asynchronous communications, re-transmitting the USB packets from the first USB host computer to the virtual modem bridge using the USB protocol if a NAK handshake packet is received by the first USB host device or if no handshake packet was received by the first USB host device within the USB time limit prescribed by the USB protocol;

(D) In response to an In token packet sent from the second USB host device to the virtual modem bridge using the USB protocol, transmitting the USB data packet from the virtual modem bridge to the second USB host device using the USB protocol within the USB time limit prescribed by the USB protocol after receiving the In token packet; and, (E) For asynchronous communications, examining the USB data packet at the second USB host device, generating an appropriate handshake packet at the second USB host device according to the USB protocol and transmitting the handshake packet from the second USB host device to the virtual modem bridge using the USB protocol within the USB time limit prescribed by the USB protocol after receiving the USB data packet.

56. The method according to claim 55 wherein the first USB host device and the second USB host device are computers.

57. The method according to claim 56 wherein the first USB host device is an end hub or a composite end hub connected to a computer network and the second USB host device is a computer.

* * * * *